US010221848B2

(12) United States Patent
Bayyouk et al.

(10) Patent No.: US 10,221,848 B2
(45) Date of Patent: Mar. 5, 2019

(54) VALVE FOR RECIPROCATING PUMP ASSEMBLY

(71) Applicant: S.P.M. Flow Control, Inc., Fort Worth, TX (US)

(72) Inventors: Jacob A. Bayyouk, Richardson, TX (US); Charles Hensley, Burleson, TX (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 207 days.

(21) Appl. No.: 15/200,913

(22) Filed: Jul. 1, 2016

(65) Prior Publication Data

US 2017/0002947 A1 Jan. 5, 2017

Related U.S. Application Data

(63) Continuation-in-part of application No. 29/556,055, filed on Feb. 26, 2016, now Pat. No. Des. 796,632.
(Continued)

(51) Int. Cl.
*F16K 15/14* (2006.01)
*F04B 53/10* (2006.01)
(Continued)

(52) U.S. Cl.
CPC ........ *F04B 53/1087* (2013.01); *F16K 15/026* (2013.01); *F16K 17/162* (2013.01)

(58) Field of Classification Search
CPC . F16K 17/403; F16K 1/12; F16K 1/36; F04B 53/1087
(Continued)

(56) References Cited

U.S. PATENT DOCUMENTS 1,571,022 A * 1/1926 Obert ...................... F16K 17/16
137/71
3,037,460 A 6/1962 Guest et al.
(Continued)

FOREIGN PATENT DOCUMENTS

CN 201425021 Y 3/2010
CN 201621057 U 11/2010
(Continued)

OTHER PUBLICATIONS

International Search Report and Written Opinion re related application PCT/US16/40802, dated Dec. 28, 2016, 12 pages.
(Continued)

*Primary Examiner* — Minh Le
(74) *Attorney, Agent, or Firm* — Haynes and Boone LLP

(57) ABSTRACT

The valve member includes a valve body and a seal. The valve body defines a first frusto-conical surface and an outside annular cavity. The seal extends within the outside annular cavity and includes a first tapered and circumferentially-extending surface adapted to sealingly engage the tapered surface of the valve seat. In another aspect, the seal includes an annular bulbous protrusion from which the first tapered and circumferentially-extending surface angularly extends, the first tapered and circumferentially-extending surface extending between the annular bulbous protrusion and the first frusto-conical surface of the valve body. In another aspect, an offset distance is defined between the first frusto-conical surface of the valve body and at least a portion of the first tapered and circumferentially-extending surface of the seal, the offset distance extending in a direction that is perpendicular to at least the first frusto-conical surface of the valve body.

20 Claims, 24 Drawing Sheets

Related U.S. Application Data

(60) Provisional application No. 62/300,343, filed on Feb. 26, 2016, provisional application No. 62/188,248, filed on Jul. 2, 2015.

(51) Int. Cl.
 *F16K 15/02* (2006.01)
 *F16K 17/16* (2006.01)

(58) Field of Classification Search
 USPC ........ 137/68.23, 543.23; 251/359, 262, 365;
 417/454, 510, 559, 563, 415
 See application file for complete search history.

(56) References Cited

U.S. PATENT DOCUMENTS

| | | | |
|---|---|---|---|
| 3,092,139 A * | 6/1963 | Rodgers | F16K 1/385 137/533.29 |
| 3,191,617 A * | 6/1965 | Maddox | F04B 53/1025 137/516.29 |
| 3,666,382 A | 5/1972 | Robert | |
| 3,693,644 A * | 9/1972 | Dilorenzo | F16K 17/162 137/493.2 |
| 3,742,976 A * | 7/1973 | Bailey | F16K 1/46 137/516.11 |
| 3,765,690 A | 10/1973 | Sievenpiper | |
| 3,786,551 A | 1/1974 | Gregg et al. | |
| 4,009,515 A | 3/1977 | Racin | |
| 4,064,890 A * | 12/1977 | Collins, Jr. | G05D 16/0666 137/505.11 |
| 4,138,144 A | 2/1979 | Pierce, Jr. | |
| 4,180,097 A * | 12/1979 | Sjoberg | F16K 15/06 137/516.29 |
| 4,380,342 A | 4/1983 | Fling | |
| 4,589,180 A | 5/1986 | Vachon | |
| 4,860,995 A * | 8/1989 | Rogers | F04B 53/1027 137/516.29 |
| D309,938 S | 8/1990 | Schoepe | |
| 4,951,707 A * | 8/1990 | Johnson | F04B 53/1025 137/516.29 |
| D316,292 S | 4/1991 | Baker | |
| 5,003,681 A | 4/1991 | Schley | |
| 5,018,261 A | 5/1991 | Markous | |
| 5,088,521 A * | 2/1992 | Johnson | E21B 21/01 137/516.29 |
| 5,226,445 A | 7/1993 | Surjaatmadja | |
| 5,577,737 A | 11/1996 | Lacy | |
| D381,067 S | 7/1997 | Karmalm | |
| D382,943 S | 8/1997 | Doughty | |
| 5,921,418 A | 7/1999 | Pugh | |
| 6,195,863 B1 | 3/2001 | Blake | |
| D443,040 S | 5/2001 | Fabian | |
| 6,415,487 B1 | 7/2002 | Leimer | |
| D470,226 S | 2/2003 | Herbert | |
| 6,574,846 B1 | 6/2003 | Kang | |
| 6,712,362 B2 | 3/2004 | Krappmann et al. | |
| 6,755,099 B2 | 6/2004 | Huang et al. | |
| 6,758,478 B1 | 7/2004 | Moreno | |
| 6,869,079 B2 | 3/2005 | Zheng | |
| 7,070,166 B1 * | 7/2006 | Blume | F04B 53/102 251/359 |
| 7,194,948 B2 | 3/2007 | Liu | |
| 7,389,579 B2 | 6/2008 | Rode | |
| 7,425,120 B2 | 9/2008 | Hembree | |
| 7,513,483 B1 * | 4/2009 | Blume | F16K 1/34 137/516.29 |
| 7,641,175 B1 * | 1/2010 | Blume | F16K 1/385 137/516.29 |
| 7,748,095 B1 | 7/2010 | Phane | |
| D626,208 S | 10/2010 | Clements | |
| 8,317,498 B2 * | 11/2012 | Gambier | F04B 49/243 137/516.29 |
| 8,402,880 B2 | 3/2013 | Patel et al. | |
| 8,418,363 B2 | 4/2013 | Patel | |
| D692,534 S | 10/2013 | Fangmeier | |
| 9,249,797 B2 | 2/2016 | Byrne et al. | |
| 9,291,274 B1 * | 3/2016 | Blume | F16K 1/46 |
| D754,817 S | 4/2016 | Dille | |
| 9,631,739 B2 * | 4/2017 | Belshan | F16K 31/12 |
| 9,822,894 B2 * | 11/2017 | Bayyouk | F16K 25/005 |
| 9,897,220 B2 * | 2/2018 | Cohen | F16K 17/403 |
| 2002/0079332 A1 | 6/2002 | McIntire et al. | |
| 2003/0030228 A1 | 2/2003 | Graziani et al. | |
| 2004/0046330 A1 | 3/2004 | Wobben | |
| 2004/0170507 A1 | 9/2004 | Vicars | |
| 2004/0255445 A1 | 12/2004 | Ploeger et al. | |
| 2005/0201881 A1 | 9/2005 | Jensen et al. | |
| 2008/0136118 A1 | 6/2008 | Ando et al. | |
| 2009/0011225 A1 | 1/2009 | Moronuki et al. | |
| 2010/0143163 A1 | 6/2010 | Patel et al. | |
| 2010/0160710 A1 | 6/2010 | Strickland | |
| 2010/0325888 A1 | 12/2010 | Hawes | |
| 2012/0152111 A1 | 6/2012 | Byrne et al. | |
| 2013/0015385 A1 | 1/2013 | Marica | |
| 2013/0020521 A1 | 1/2013 | Byrne | |
| 2013/0036855 A1 | 2/2013 | Huang | |
| 2013/0202457 A1 * | 8/2013 | Bayyouk | B23P 6/00 417/279 |
| 2013/0202458 A1 * | 8/2013 | Byrne | F04B 7/02 417/279 |
| 2013/0232789 A1 | 9/2013 | Patel | |
| 2014/0070127 A1 * | 3/2014 | Blume | F16K 1/42 251/359 |
| 2015/0040991 A1 * | 2/2015 | Cohen | F16K 17/16 137/12.5 |
| 2016/0040796 A1 * | 2/2016 | Omesti | F16K 17/38 137/68.23 |

FOREIGN PATENT DOCUMENTS

| | | |
|---|---|---|
| CN | 201730815 U | 2/2011 |
| CN | 103370543 A | 10/2013 |
| JP | 7113426 B | 12/1995 |
| JP | 2002161982 A | 6/2002 |
| JP | 2003065439 A | 3/2003 |
| JP | 2008539364 A | 11/2008 |
| KR | 1019990079544 A | 11/1999 |
| KR | 100383826 B1 | 5/2003 |
| KR | 100402825 BI | 10/2003 |
| KR | 798807 B1 | 1/2008 |
| WO | 1999050578 A1 | 10/1999 |
| WO | 2008137515 A1 | 11/2008 |
| WO | 2011002902 A2 | 1/2011 |
| WO | 2011008763 A2 | 1/2011 |
| WO | 2012083179 A2 | 6/2012 |

OTHER PUBLICATIONS

International Search Report and Written Opinion issued by the US/RO regarding International Application No. PCT/US16/40802, dated Dec. 28, 2016, 10 pages.
Weir "SPM 2.0 Valve & Seat", https://www.global.weir/products/product-catalogue/spm-2.0-full-open-well-service-valves-and-seats. Dec. 21, 2016. shown in p. 1, Item # SPM2.0.
International Search Report and Written Opinion for Application No. PCT/US2010/040628 dated Jan. 27, 2011, 7 pages.
International Search Report and Written Opinion for Application No. PCT/US2010/041832 dated Feb. 1, 2011, 8 pages.
International Search Report and Written Opinion for Application No. PCT/US2011/065514 dated Aug. 24, 2012, 6 pages.
Notice of Allowance dated Dec. 17, 2012, by the USPTO, re U.S. Appl. No. 12/835,496, 13 pages.
Office Action dated Feb. 12, 2013, by the USPTO re U.S. Appl. No. 12/826,493, 12 pages.
Office Action dated Sep. 13, 2013, by the USPTO, re U.S. Appl. No. 13/863,070, 8 pages.
Restriction Requirement dated Nov. 5, 2012, by the USPTO, re U.S. Appl. No. 12/826,493, 5 pages.
Restriction Requirement dated Oct. 23, 2012, by the USPTO, re

(56) References Cited

OTHER PUBLICATIONS

U.S. Appl. No. 12/835,496, 6 pages.
Eurasia Office Action dated Jul. 22, 2016, by the Eurasian Patent Office re App No. 201390890/31, 4 pages.
Eurasia Office Action dated Jan. 29, 2016, by the Eurasian Patent Office re App No. 201390890/31, 6 pages.
Eurasia Office Action dated Apr. 29, 2015, by the Eurasian Patent Office re App No. 201390890/31, 2 pages.

* cited by examiner

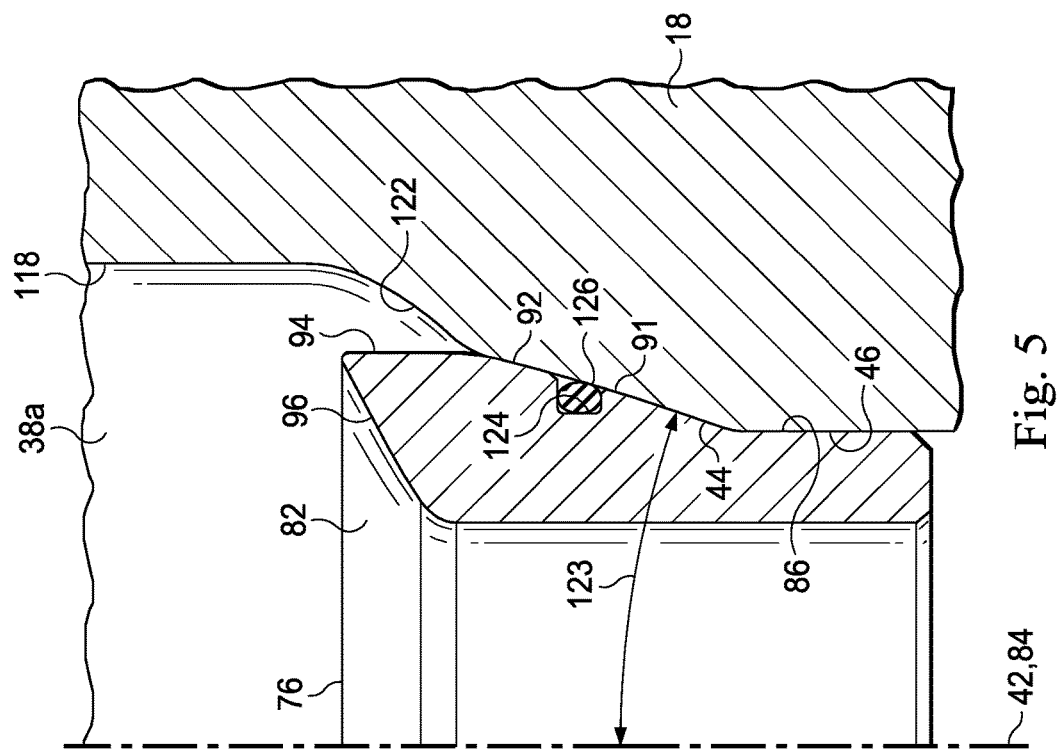
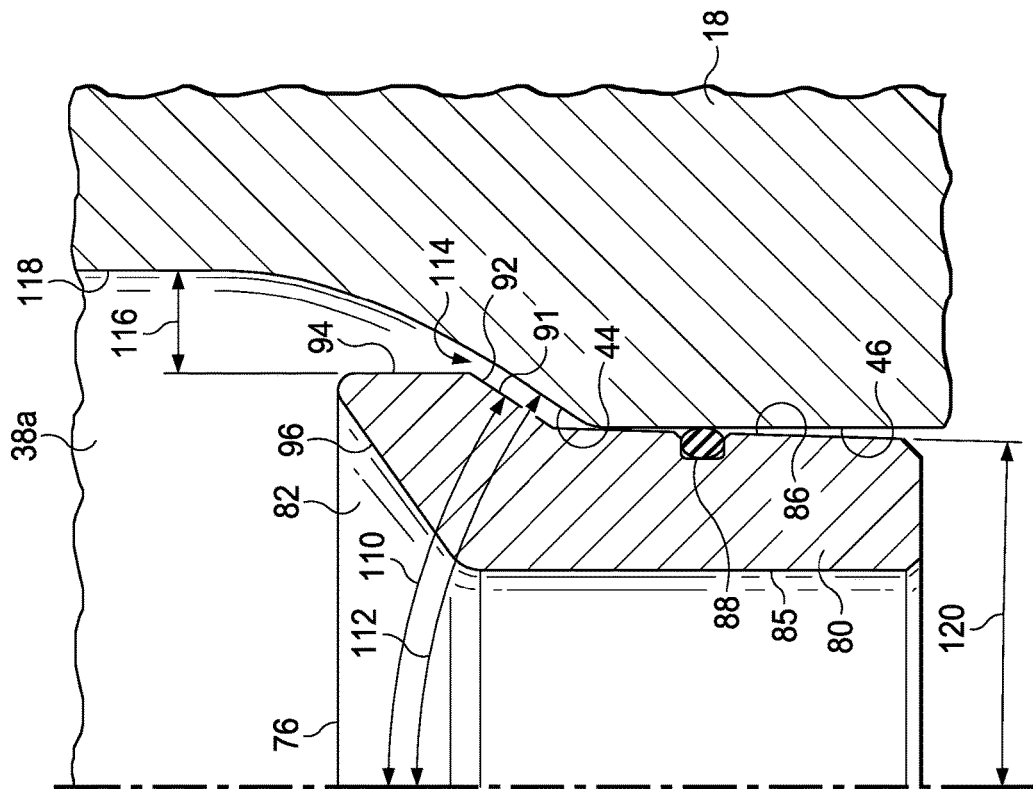
Fig. 5
Fig. 4

VALVE FOR RECIPROCATING PUMP ASSEMBLY

CROSS-REFERENCE TO RELATED APPLICATIONS

This application claims the benefit of the filing date of, and priority to, U.S. Application No. 62/188,248, filed Jul. 2, 2015, the entire disclosure of which is hereby incorporated herein by reference.

This application also claims the benefit of the filing date of, and priority to, U.S. Application No. 62/300,343, filed Feb. 26, 2016, the entire disclosure of which is hereby incorporated herein by reference.

This application is a continuation-in-part of U.S. application Ser. No. 29/556,055, filed Feb. 26, 2016, the entire disclosure of which is hereby incorporated herein by reference.

TECHNICAL FIELD

This disclosure relates in general to pump assemblies and, in particular, valves for reciprocating pump assemblies.

BACKGROUND OF THE DISCLOSURE

Reciprocating pump assemblies typically include fluid end blocks and inlet and outlet valves disposed therein. During operation, the inlet and outlet valves typically experience high loads and frequencies. In some cases, valve seats of the inlet and outlet valves, as well as the corresponding valve members adapted to be engaged therewith, may be subjected to highly concentrated cyclic loads and thus may suffer wear and damage, and fatigue to failure. Therefore, what is needed is an apparatus or method that addresses one or more of the foregoing issues, and/or other issue(s).

SUMMARY

In a first aspect, there is provided a valve member for an inlet or outlet valve of a reciprocating pump assembly. The valve member includes a valve body defining first and second frusto-conical surfaces; an outside annular cavity formed in the valve body; and a seal extending within the outside annular cavity, the seal defining a tapered and circumferentially-extending surface adapted to sealingly engage a tapered surface of a valve seat of the inlet or outlet valve; wherein the second frusto-conical surface defined by the valve body extends angularly between: the first frusto-conical surface defined by the valve body; and the tapered and circumferentially-extending surface of the seal.

In an exemplary embodiment, the seal further includes an annular bulbous protrusion from which the tapered and circumferentially-extending surface angularly extends, the extension ending at, or proximate, the second frusto-conical surface defined by the valve body.

In another exemplary embodiment, the valve body defines a top surface; wherein the seal further includes a channel formed in the exterior thereof; and wherein the channel is positioned between the top surface of the valve body and the annular bulbous protrusion.

In yet another exemplary embodiment, the outside annular cavity defines first and second angularly-extending surfaces; and wherein the valve member further includes: an annular groove formed in the valve body at the intersection of the first and second angularly-extending surfaces; and an annular element disposed in the annular groove and engaging the seal.

In certain exemplary embodiments, the valve member includes a base from which the valve body extends, wherein the first frusto-conical surface of the valve body extends angularly between the base and the second frusto-conical surface of the valve body; and a plurality of circumferentially-spaced legs extending from the base and away from the valve body, wherein the legs are adapted to slidably engage another surface of the valve seat.

In an exemplary embodiment, the base is a disk-shaped base that defines a circumferentially-extending convex surface.

In another exemplary embodiment, the valve member defines a first axis adapted to be coaxial with a second axis of the valve seat; wherein the first frusto-conical surface of the valve body defines a first angle from the first axis; and wherein the second frusto-conical surface of the valve body defines a second angle from the second axis.

In yet another exemplary embodiment, the first angle is greater than the second angle.

In certain exemplary embodiments, the second angle is adapted to be substantially equal to a taper angle defined by the tapered surface of the valve seat and measured from the second axis of the valve seat; and wherein the second angle is about 50 degrees.

In an exemplary embodiment, the valve body defines a first surface area adapted to contact the tapered surface of the valve seat; wherein the seal defines a second surface area adapted to contact the tapered surface of the valve seat; and wherein a ratio of the first surface area to the second surface ranges from about 0.9 to about 1.2.

In another exemplary embodiment, the ratio is about 1.

In another exemplary embodiment, an offset distance is defined between the second frusto-conical surface defined by the valve body, and at least a portion of the tapered and circumferentially-extending surface defined by the seal.

In yet another exemplary embodiment, the offset distance extends in a direction that is perpendicular to at least the second frusto-conical surface.

In certain exemplary embodiments, the offset distance ranges from greater than zero inches to about 0.1 inch.

In an exemplary embodiment, the second frusto-conical surface defined by the valve body and at least a portion of the tapered and circumferentially-extending surface defined by the seal are spaced in a parallel relation; wherein an offset distance is defined between the parallel spacing between the second frusto-conical surface defined by the valve body, and the at least a portion of the tapered and circumferentially-extending surface defined by the seal.

In another exemplary embodiment, the offset distance extends in a direction that is perpendicular to at least the second frusto-conical surface.

In yet another exemplary embodiment, the offset distance ranges from greater than zero inches to about 0.1 inch.

In certain exemplary embodiments, the valve member defines a first axis adapted to be coaxial with a second axis of the valve seat; wherein a first angle, as measured from the first axis, is defined by the second frusto-conical surface defined by the valve body; wherein a second angle, as measured from the first axis, is defined by at least a portion of the tapered and circumferentially-extending surface defined by the seal; wherein the first and second angles are substantially equal; and wherein each of the first and second angles is adapted to be substantially equal to a taper angle defined by the tapered surface of the valve seat and measured from the second axis of the valve seat.

In an exemplary embodiment, the seal further defines another tapered and circumferentially-extending surface, which angularly extends from the first-mentioned tapered and circumferentially-extending surface defined by the seal.

In another exemplary embodiment, the extension of the another tapered and circumferentially-extending surface of the seal ends at, or proximate, the second frusto-conical surface defined by the valve body.

In yet another exemplary embodiment, an annular contact portion of the seal is defined by the intersection between the first-mentioned and the another tapered and circumferentially-extending surfaces of the seal, the annular contact portion including at least a portion of the first-mentioned tapered and circumferentially-extending surface of the seal.

In certain exemplary embodiments, the valve member defines a first axis adapted to be coaxial with a second axis of the valve seat; wherein a first angle, as measured from the first axis, is defined by the second frusto-conical surface defined by the valve body; wherein a second angle, as measured from the first axis, is defined by the first-mentioned tapered and circumferentially-extending surface defined by the seal; wherein a third angle, as measured from the first axis, is defined by the another tapered and circumferentially-extending surface defined by the seal; wherein the first and second angles are substantially equal; and wherein the third angle is greater than each of the first and second angles.

In an exemplary embodiment, the valve member includes a rupture disc assembly engaged with the valve body.

In another exemplary embodiment, the valve member defines a first axis adapted to be coaxial with a second axis of the valve seat; wherein a counterbore is formed in the valve body and is generally coaxial with the first axis, the counterbore including an enlarged-diameter portion and a reduced-diameter portion, the reduced-diameter portion defining a fluid passage; wherein the counterbore defines an internal shoulder extending radially between the enlarged-diameter and reduced-diameter portions; and wherein the rupture disc assembly includes a rupture disc disposed in the enlarged-diameter portion and engaging the internal shoulder; and an annular seal sealingly engaging at least the rupture disc and the internal shoulder.

In yet another exemplary embodiment, the rupture disc includes an annular mounting portion disposed in the enlarged-diameter portion, an end of the annular mounting portion engaging the internal shoulder; a domed rupture portion about which the annular mounting portion circumferentially extends; and an annular channel formed in the end of the annular mounting portion engaging the internal shoulder; wherein the annular seal extends within the annular channel and sealingly engages at least the annular mounting portion and the internal shoulder.

In a second aspect, there is provided a valve member for an inlet or outlet valve of a reciprocating pump assembly, the valve member including a valve body; an outside annular cavity formed in the valve body; and a seal extending within the outside annular cavity, the seal defining a tapered and circumferentially-extending surface adapted to sealingly engage a tapered surface of a valve seat of the inlet or outlet valve; wherein the seal includes an annular bulbous protrusion from which the tapered and circumferentially-extending surface angularly extends.

In an exemplary embodiment, the valve body defines a top surface; wherein the seal further includes a channel formed in the exterior thereof; and wherein the channel is positioned between the top surface of the valve body and the annular bulbous protrusion.

In another exemplary embodiment, the outside annular cavity defines first and second angularly-extending surfaces; and wherein the valve member further includes: an annular groove formed in the valve body at the intersection of the first and second angularly-extending surfaces; and an annular element disposed in the annular groove and engaging the seal.

In yet another exemplary embodiment, the valve body defines first and second frusto-conical surfaces; wherein the second frusto-conical surface defined by the valve body extends angularly between: the first frusto-conical surface defined by the valve body; and the tapered and circumferentially-extending surface of the seal; and wherein the valve member further includes: a base from which the valve body extends, wherein the first frusto-conical surface of the valve body extends angularly between the base and the second frusto-conical surface of the valve body; and a plurality of circumferentially-spaced legs extending from the base and away from the valve body, wherein the legs are adapted to slidably engage another surface of the valve seat.

In certain exemplary embodiments, the base is a disk-shaped base that defines a circumferentially-extending convex surface.

In an exemplary embodiment, the valve member defines a first axis adapted to be coaxial with a second axis of the valve seat; wherein the first frusto-conical surface of the valve body defines a first angle from the first axis; and wherein the second frusto-conical surface of the valve body defines a second angle from the second axis.

In another exemplary embodiment, the first angle is greater than the second angle.

In yet another exemplary embodiment, the second angle is adapted to be substantially equal to a taper angle defined by the tapered surface of the valve seat and measured from the second axis of the valve seat; and wherein the second angle is 50 degrees.

In certain exemplary embodiments, the valve body defines a first surface area adapted to contact the tapered surface of the valve seat; wherein the seal defines a second surface area adapted to contact the tapered surface of the valve seat; and wherein a ratio of the first surface area to the second surface ranges from about 0.9 to about 1.2.

In an exemplary embodiment, the ratio is about 1.

In another exemplary embodiment, the valve body defines a frusto-conical surface; wherein the tapered and circumferentially-extending surface defined by the seal extends angularly between the annular bulbous protrusion and the frusto-conical surface defined by the valve body; wherein an offset distance is defined between the frusto-conical surface defined by the valve body, and at least a portion of the tapered and circumferentially-extending surface defined by the seal.

In yet another exemplary embodiment, the offset distance extends in a direction that is perpendicular to at least the frusto-conical surface.

In certain exemplary embodiments, the offset distance ranges from greater than zero inches to about 0.1 inch.

In an exemplary embodiment, the frusto-conical surface defined by the valve body and at least a portion of the tapered and circumferentially-extending surface defined by the seal are spaced in a parallel relation; wherein an offset distance is defined between the parallel spacing between the frusto-conical surface defined by the valve body, and the at least a portion of the tapered and circumferentially-extending surface defined by the seal.

In another exemplary embodiment, the offset distance extends in a direction that is perpendicular to at least the frusto-conical surface.

In yet another exemplary embodiment, the offset distance ranges from greater than zero inches to about 0.1 inch.

In certain exemplary embodiments, the valve member defines a first axis adapted to be coaxial with a second axis of the valve seat; wherein a first angle, as measured from the first axis, is defined by the frusto-conical surface defined by the valve body; wherein a second angle, as measured from the first axis, is defined by at least a portion of the tapered and circumferentially-extending surface defined by the seal; wherein the first and second angles are substantially equal; and wherein each of the first and second angles is adapted to be substantially equal to a taper angle defined by the tapered surface of the valve seat and measured from the second axis of the valve seat.

In an exemplary embodiment, the seal further defines another tapered and circumferentially-extending surface, which angularly extends from the first-mentioned tapered and circumferentially-extending surface defined by the seal.

In another exemplary embodiment, the extension of the another tapered and circumferentially-extending surface of the seal ends at, or proximate, the frusto-conical surface defined by the valve body.

In yet another exemplary embodiment, an annular contact portion of the seal is defined by the intersection between the first-mentioned and the another tapered and circumferentially-extending surfaces of the seal, the annular contact portion including at least a portion of the first-mentioned tapered and circumferentially-extending surface of the seal.

In certain exemplary embodiments, the valve member defines a first axis adapted to be coaxial with a second axis of the valve seat; wherein a first angle, as measured from the first axis, is defined by the frusto-conical surface defined by the valve body; wherein a second angle, as measured from the first axis, is defined by the first-mentioned tapered and circumferentially-extending surface defined by the seal; wherein a third angle, as measured from the first axis, is defined by the another tapered and circumferentially-extending surface defined by the seal; wherein the first and second angles are substantially equal; wherein the third angle is greater than each of the first and second angles.

In an exemplary embodiment, the valve member includes a rupture disc assembly engaged with the valve body.

In another exemplary embodiment, the valve member defines a first axis adapted to be coaxial with a second axis of the valve seat; wherein a counterbore is formed in the valve body and is generally coaxial with the first axis, the counterbore including an enlarged-diameter portion and a reduced-diameter portion, the reduced-diameter portion defining a fluid passage; wherein the counterbore defines an internal shoulder extending radially between the enlarged-diameter and reduced-diameter portions; and wherein the rupture disc assembly includes: a rupture disc disposed in the enlarged-diameter portion and engaging the internal shoulder; and an annular seal sealingly engaging at least the rupture disc and the internal shoulder.

In yet another exemplary embodiment, the rupture disc includes an annular mounting portion disposed in the enlarged-diameter portion, an end of the annular mounting portion engaging the internal shoulder; a domed rupture portion about which the annular mounting portion circumferentially extends; and an annular channel formed in the end of the annular mounting portion engaging the internal shoulder; wherein the annular seal extends within the annular channel and sealingly engages at least the annular mounting portion and the internal shoulder.

In a third aspect, there is provided an inlet or outlet valve for a reciprocating pump assembly, the inlet or outlet valve including a valve seat defining a first axis, the valve seat including a tapered surface; and a valve member adapted to be engaged with the valve seat, the valve member defining a second axis that is adapted to be coaxial with the first axis, the valve member including: a valve body defining a first surface area adapted to contact the tapered surface of the valve seat; an outside annular cavity formed in the valve body; and a seal extending within the outside annular cavity, the seal defining a second surface area adapted to contact the tapered surface of the valve seat; wherein the ratio of the first surface area to the second surface area ranges from about 0.9 to about 1.2.

In an exemplary embodiment, the valve body defines first and second frusto-conical surfaces; wherein the seal defines a tapered and circumferentially-extending surface adapted to sealingly engage the tapered surface of the valve seat; and wherein the second frusto-conical surface defined by the valve body extends angularly between: the first frusto-conical surface defined by the valve body; and the tapered and circumferentially-extending surface of the seal.

In another exemplary embodiment, the seal further includes an annular bulbous protrusion from which the tapered and circumferentially-extending surface angularly extends, the extension ending at, or proximate, the second frusto-conical surface defined by the valve body.

In yet another exemplary embodiment, the valve body defines a top surface; wherein the seal further includes a channel formed in the exterior thereof; and wherein the channel is positioned between the top surface of the valve body and the annular bulbous protrusion.

In certain exemplary embodiments, the valve member further includes: a base from which the valve body extends, wherein the first frusto-conical surface of the valve body extends angularly between the base and the second frusto-conical surface of the valve body; and a plurality of circumferentially-spaced legs extending from the base and away from the valve body, wherein the legs slidably engage another surface of the valve seat.

In an exemplary embodiment, the first frusto-conical surface of the valve body defines a first angle from the first axis; and wherein the second frusto-conical surface of the valve body defines a second angle from the second axis.

In another exemplary embodiment, the first angle is greater than the second angle.

In yet another exemplary embodiment, the second angle is adapted to be substantially equal to a taper angle defined by the tapered surface of the valve seat and measured from the second axis of the valve seat; and wherein the second angle is 50 degrees.

In certain exemplary embodiments, the outside annular cavity defines first and second angularly-extending surfaces; and wherein the valve member further includes: an annular groove formed in the valve body at the intersection of the first and second angularly-extending surfaces; and an annular element disposed in the annular groove and engaging the seal.

In an exemplary embodiment, the seal defines a tapered and circumferentially-extending surface adapted to sealingly engage the tapered surface of the valve seat; and wherein the seal includes an annular bulbous protrusion from which the tapered and circumferentially-extending surface angularly extends.

In a fourth aspect, there is provided a valve member for a reciprocating pump assembly, the valve member including a valve body including a first frusto-conical surface, the valve body defining an outside annular cavity formed therein; and a seal extending within the outside annular cavity, the seal including a first tapered and circumferentially-extending surface adapted to sealingly engage a tapered surface of a valve seat of the reciprocating pump assembly; and an annular bulbous protrusion from which the first tapered and circumferentially-extending surface angularly extends, the first tapered and circumferentially-extending surface extending between the annular bulbous protrusion and the first frusto-conical surface of the valve body.

In an exemplary embodiment, the seal further includes a channel formed in the exterior thereof, the channel being positioned between the annular bulbous protrusion of the seal and a top surface of the valve body.

In another exemplary embodiment, the valve member defines a first axis adapted to be coaxial with a second axis defined by the valve seat; the first frusto-conical surface of the valve body defines a first angle, as measured from the first axis; and the tapered surface of the valve seat defines a taper angle, as measured from the second axis, the taper angle being substantially equal to the first angle.

In yet another exemplary embodiment, the valve body further includes a second frusto-conical surface, the first frusto-conical surface of the valve body extending angularly between the second frusto-conical surface of the valve body and the first tapered and circumferentially-extending surface of the seal; and the second frusto-conical surface of the valve body defines a second angle, as measured from the first axis, the second angle being greater than the first angle.

In certain exemplary embodiments, the valve body and the seal define first and second surface areas, respectively, adapted to contact the tapered surface of the valve seat; and a ratio of the first surface area to the second surface area ranges from about 0.9 to about 1.2.

In an exemplary embodiment, an offset distance is defined between the first frusto-conical surface of the valve body and at least a portion of the first tapered and circumferentially-extending surface of the seal, the offset distance extending in a direction that is perpendicular to at least the first frusto-conical surface of the valve body.

In another exemplary embodiment, the first frusto-conical surface of the valve body defines a first angle, as measured from a first axis defined by the valve member, the first axis being adapted to be coaxial with a second axis defined by the valve seat; the at least a portion of the first tapered and circumferentially-extending surface of the seal defines a second angle, as measured from the first axis, the second angle being substantially equal to the first angle; and the first and second angles are substantially equal to a taper angle defined by the tapered surface of the valve seat and measured from the second axis.

In yet another exemplary embodiment, the seal further includes a second tapered and circumferentially-extending surface extending angularly between the first tapered and circumferentially-extending surface of the seal and the first frusto-conical surface of the valve body; and an annular contact portion defined by an intersection between the first and second tapered and circumferentially-extending surfaces, the annular contact portion including at least a portion of the first tapered and circumferentially-extending surface.

In certain exemplary embodiments, the first frusto-conical surface of the valve body defines a first angle, as measured from a first axis defined by the valve member, the first axis being adapted to be coaxial with a second axis defined by the valve seat; the first and second tapered and circumferentially-extending surfaces of the seal define second and third angles, respectively, as measured from the first axis, the second angle being less than the third angle and substantially equal to the first angle.

In an exemplary embodiment, the valve body further defines a counterbore formed along a first axis of the valve body, the first axis being adapted to be coaxial with a second axis defined by the valve seat, the counterbore defining an enlarged diameter portion, a reduced-diameter portion, and an internal shoulder in the valve body, the reduced-diameter portion defining a fluid passage; and the valve member further includes a rupture disc disposed in the enlarged-diameter portion of the counterbore and engaging the internal shoulder of the valve body.

In a fifth aspect, there is provided a valve member for a reciprocating pump assembly, the valve member including a valve body including a first frusto-conical surface, the valve body defining an outside annular cavity formed therein; and a seal extending within the outside annular cavity, the seal including a first tapered and circumferentially-extending surface adapted to sealingly engage a tapered surface of a valve seat of the reciprocating pump assembly; wherein an offset distance is defined between the first frusto-conical surface of the valve body and at least a portion of the first tapered and circumferentially-extending surface of the seal, the offset distance extending in a direction that is perpendicular to at least the first frusto-conical surface of the valve body.

In an exemplary embodiment, the first frusto-conical surface of the valve body defines a first angle, as measured from a first axis defined by the valve member, the first axis being adapted to be coaxial with a second axis defined by the valve seat; the at least a portion of the first tapered and circumferentially-extending surface of the seal defines a second angle, as measured from the first axis, the second angle being substantially equal to the first angle; and the first and second angles are substantially equal to a taper angle defined by the tapered surface of the valve seat and measured from the second axis.

In another exemplary embodiment, the seal further includes a second tapered and circumferentially-extending surface extending angularly between the first tapered and circumferentially-extending surface of the seal and the first frusto-conical surface of the valve body; and an annular contact portion defined by an intersection between the first and second tapered and circumferentially-extending surfaces, the annular contact portion including at least a portion of the first tapered and circumferentially-extending surface.

In yet another exemplary embodiment, the first frusto-conical surface of the valve body defines a first angle, as measured from a first axis defined by the valve member, the first axis being adapted to be coaxial with a second axis defined by the valve seat; the first and second tapered and circumferentially-extending surfaces of the seal define second and third angles, respectively, as measured from the first axis, the second angle being less than the third angle and substantially equal to the first angle.

In certain exemplary embodiments, the seal further includes an annular bulbous protrusion from which the first tapered and circumferentially-extending surface angularly extends, the first tapered and circumferentially-extending surface extending between the annular bulbous protrusion and the first frusto-conical surface of the valve body; and a channel formed in the exterior thereof, the channel being positioned between the annular bulbous protrusion of the seal and a top surface of the valve body.

In an exemplary embodiment, the valve member defines a first axis adapted to be coaxial with a second axis defined by the valve seat; the first frusto-conical surface of the valve body defines a first angle, as measured from the first axis; and the tapered surface of the valve seat defines a taper angle, as measured from the second axis, the taper angle being substantially equal to the first angle.

In another exemplary embodiment, the valve body further includes a second frusto-conical surface, the first frusto-conical surface of the valve body extending angularly between the second frusto-conical surface of the valve body and the first tapered and circumferentially-extending surface of the seal; and the second frusto-conical surface of the valve body defines a second angle, as measured from the first axis, the second angle being greater than the first angle.

In yet another exemplary embodiment, the valve body and the seal define first and second surface areas, respectively, adapted to contact the tapered surface of the valve seat; and a ratio of the first surface area to the second surface area ranges from about 0.9 to about 1.2.

In certain exemplary embodiments, the valve body further defines a counterbore formed along a first axis of the valve body, the first axis being adapted to be coaxial with a second axis defined by the valve seat, the counterbore defining an enlarged diameter portion, a reduced-diameter portion, and an internal shoulder in the valve body, the reduced-diameter portion defining a fluid passage.

In an exemplary embodiment, the valve member further includes a rupture disc disposed in the enlarged-diameter portion of the counterbore and engaging the internal shoulder of the valve body; and an annular seal sealingly engaging at least the rupture disc and the internal shoulder.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

FIG. 4 is a section view of respective portions of the valve seat and the fluid end block, according to another exemplary embodiment.

FIG. 5 is a section view of respective portions of the valve seat and fluid end block, according to yet another exemplary embodiment.

DETAILED DESCRIPTION

Figure 1:
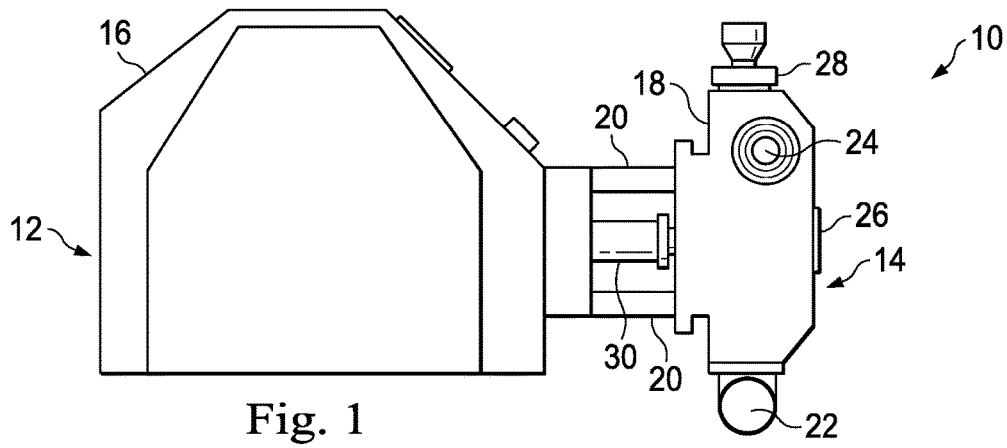
FIG. 1 is an elevational view of a reciprocating pump assembly according to an exemplary embodiment, the pump assembly includes a fluid end.

In an exemplary embodiment, as illustrated in FIG. 1, a reciprocating pump assembly is generally referred to by the reference numeral 10 and includes a power end portion 12 and a fluid end portion 14 operably coupled thereto. The power end portion 12 includes a housing 16 in which a crankshaft (not shown) is disposed, the crankshaft being operably coupled to an engine or motor (not shown), which is adapted to drive the crankshaft. The fluid end portion 14 includes a fluid end block 18, which is connected to the housing 16 via a plurality of stay rods 20. The fluid end block 18 includes a fluid inlet passage 22 and a fluid outlet passage 24, which are spaced in a parallel relation. A plurality of cover assemblies 26, one of which is shown in FIG. 1, is connected to the fluid end block 18 opposite the stay rods 20. A plurality of cover assemblies 28, one of which is shown in FIG. 1, is connected to the fluid end block 18 opposite the fluid inlet passage 22. A plunger rod assembly 30 extends out of the housing 16 and into the fluid end block 18. In several exemplary embodiments, the pump assembly 10 is freestanding on the ground, is mounted to a trailer that can be towed between operational sites, or is mounted to a skid.

Figure 2:
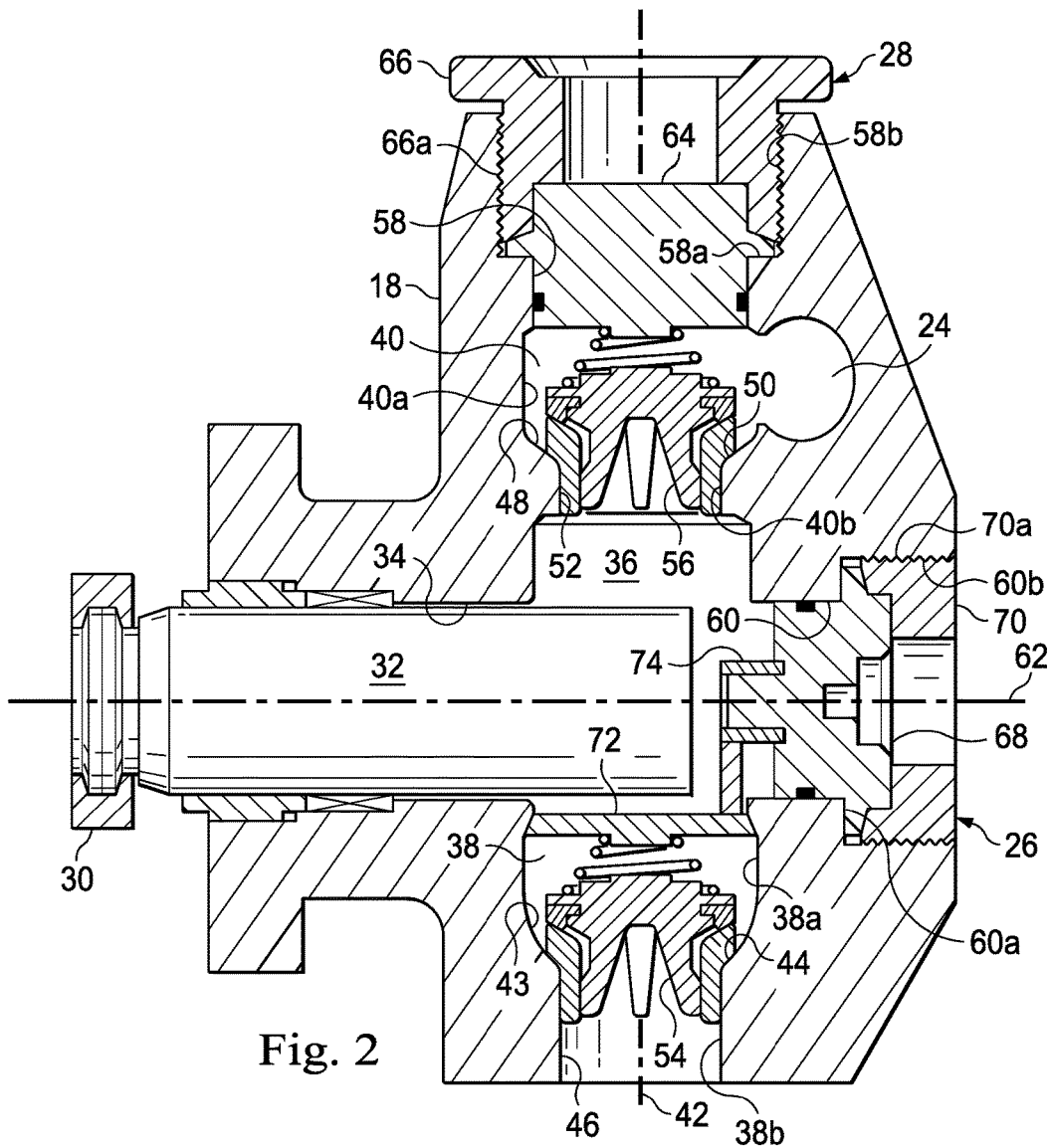
FIG. 2 is a section view of the fluid end of FIG. 1 according to an exemplary embodiment, the fluid end including a fluid end block and inlet and outlet valves, the inlet and outlet valves each including a valve seat.

In an exemplary embodiment, as illustrated in FIG. 2 with continuing reference to FIG. 1, the plunger rod assembly 30 includes a plunger 32, which extends through a bore 34 formed in the fluid end block 18, and into a pressure chamber 36 formed in the fluid end block 18. In several exemplary embodiments, a plurality of parallel-spaced bores may be formed in the fluid end block 18, with one of the bores being the bore 34, a plurality of pressure chambers may be formed in the fluid end block 18, with one of the pressure chambers being the pressure chamber 36, and a plurality of parallel-spaced plungers may extend through respective ones of the bores and into respective ones of the pressure chambers, with one of the plungers being the plunger 32. At least the bore 34, the pressure chamber 36, and the plunger 32 together may be characterized as a plunger throw. In several exemplary embodiments, the reciprocating pump assembly 10 includes three plunger throws (i.e., a triplex pump assembly), or includes four or more plunger throws.

As shown in FIG. 2, the fluid end block 18 includes inlet and outlet fluid passages 38 and 40 formed therein, which are generally coaxial along a fluid passage axis 42. Under conditions to be described below, fluid is adapted to flow through the inlet and outlet fluid passages 38 and 40 and along the fluid passage axis 42. The fluid inlet passage 22 is in fluid communication with the pressure chamber 36 via the inlet fluid passage 38. The pressure chamber 36 is in fluid communication with the fluid outlet passage 24 via the outlet fluid passage 40. The fluid inlet passage 38 includes an enlarged-diameter portion 38a and a reduced-diameter portion 38b extending downward therefrom. The enlarged-diameter portion 38a defines a tapered internal shoulder 43 and thus a frusto-conical surface 44 of the fluid end block 18. The reduced-diameter portion 38b defines an inside surface 46 of the fluid end block 18. Similarly, the fluid outlet passage 40 includes an enlarged-diameter portion 40a and a reduced-diameter portion 40b extending downward therefrom. The enlarged-diameter portion 40a defines a tapered internal shoulder 48 and thus a frusto-conical surface 50 of the fluid end block 18. The reduced-diameter portion 40b defines an inside surface 52 of the fluid end block 18.

An inlet valve 54 is disposed in the fluid passage 38, and engages at least the frusto-conical surface 44 and the inside surface 46. Similarly, an outlet valve 56 is disposed in the fluid passage 40, and engages at least the frusto-conical surface 50 and the inside surface 52. In an exemplary embodiment, each of valves 54 and 56 is a spring-loaded valve that is actuated by a predetermined differential pressure thereacross.

A counterbore 58 is formed in the fluid end block 18, and is generally coaxial with the fluid passage axis 42. The counterbore 58 defines an internal shoulder 58a and includes an internal threaded connection 58b adjacent the internal shoulder 58a. A counterbore 60 is formed in the fluid end block 18, and is generally coaxial with the bore 34 along an axis 62. The counterbore 60 defines an internal shoulder 60a and includes an internal threaded connection 60b adjacent the internal shoulder 60a. In several exemplary embodiments, the fluid end block 18 may include a plurality of parallel-spaced counterbores, one of which may be the counterbore 58, with the quantity of counterbores equaling the quantity of plunger throws included in the pump assembly 10. Similarly, in several exemplary embodiments, the fluid end block 18 may include another plurality of parallel-spaced counterbores, one of which may be the counterbore 60, with the quantity of counterbores equaling the quantity of plunger throws included in the pump assembly 10.

A plug 64 is disposed in the counterbore 58, engaging the internal shoulder 58a and sealingly engaging an inside cylindrical surface defined by the reduced-diameter portion of the counterbore 58. An external threaded connection 66a of a fastener 66 is threadably engaged with the internal threaded connection 58b of the counterbore 58 so that an end portion of the fastener 66 engages the plug 64. As a result, the fastener 66 sets or holds the plug 64 in place against the internal shoulder 58a defined by the counterbore 58, thereby maintaining the sealing engagement of the plug 64 against the inside cylindrical surface defined by the reduced-diameter portion of the counterbore 58. The cover assembly 28 shown in FIGS. 1 and 2 includes at least the plug 64 and the fastener 66. In an exemplary embodiment, the cover assembly 28 may be disconnected from the fluid end block 18 to provide access to, for example, the counterbore 58, the pressure chamber 36, the plunger 32, the fluid passage 40 or the outlet valve 56. The cover assembly 28 may then be reconnected to the fluid end block 18 in accordance with the foregoing. In several exemplary embodiments, the pump assembly 10 may include a plurality of plugs, one of which is the plug 64, and a plurality of fasteners, one of which is the fastener 66, with the respective quantities of plugs and fasteners equaling the quantity of plunger throws included in the pump assembly 10.

A plug 68 is disposed in the counterbore 60, engaging the internal shoulder 60a and sealingly engaging an inside cylindrical surface defined by the reduced-diameter portion of the counterbore 60. In an exemplary embodiment, the plug 68 may be characterized as a suction cover. An external threaded connection 70a of a fastener 70 is threadably engaged with the internal threaded connection 60b of the counterbore 60 so that an end portion of the fastener 70 engages the plug 68. As a result, the fastener 70 sets or holds the plug 68 in place against the internal shoulder 60a defined by the counterbore 60, thereby maintaining the sealing engagement of the plug 68 against the inside cylindrical surface defined by the reduced-diameter portion of the counterbore 60. The cover assembly 26 shown in FIGS. 1 and 2 includes at least the plug 68 and the fastener 70. In an exemplary embodiment, the cover assembly 26 may be disconnected from the fluid end block 18 to provide access to, for example, the counterbore 60, the pressure chamber 36, the plunger 32, the fluid passage 38, or the inlet valve 54. The cover assembly 26 may then be reconnected to the fluid end block in accordance with the foregoing. In several exemplary embodiments, the pump assembly 10 may include a plurality of plugs, one of which is the plug 68, and a plurality of fasteners, one of which is the fastener 70, with the respective quantities of plugs and fasteners equaling the quantity of plunger throws included in the pump assembly 10.

A valve spring retainer 72 is disposed in the enlarged-diameter portion 38a of the fluid passage 38. The valve spring retainer 72 is connected to the end portion of the plug 68 opposite the fastener 70. In an exemplary embodiment, and as shown in FIG. 2, the valve spring retainer 72 is connected to the plug 68 via a hub 74, which is generally coaxial with the axis 62.

Figure 3:
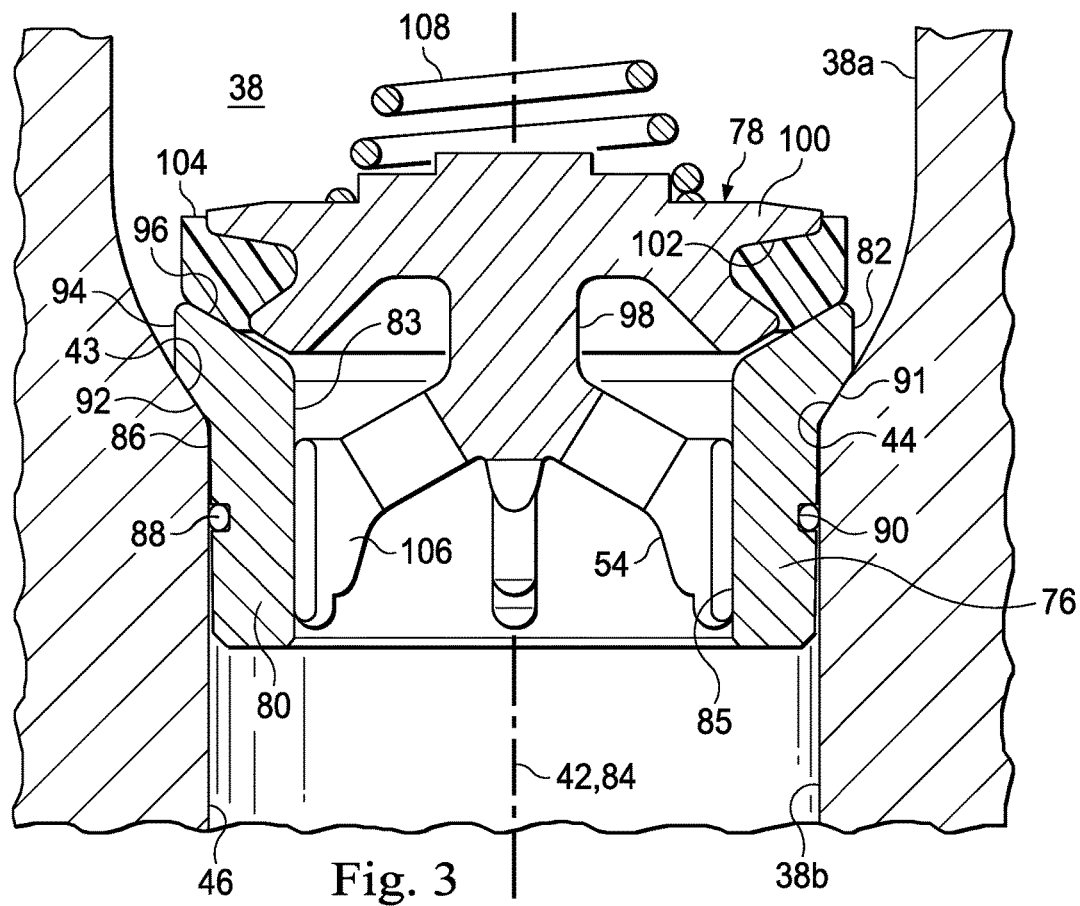
FIG. 3 is an enlarged view of a portion of the section view of FIG. 2, according to an exemplary embodiment.

In an exemplary embodiment, as illustrated in FIG. 3 with continuing reference to FIGS. 1 and 2, the inlet valve 54 includes a valve seat 76 and a valve member 78 engaged therewith. The valve seat 76 includes a seat body 80 having an enlarged-diameter portion 82 at one end thereof. The enlarged-diameter portion 82 of the seat body 80 is disposed in the enlarged-diameter portion 38a of the fluid passage 38. A bore 83 is formed through the seat body 80. The valve seat 76 has a valve seat axis 84, which is aligned with the fluid passage axis 42 when the inlet valve 54 is disposed in the fluid passage 38, as shown in FIG. 3. Under conditions to be described below, fluid flows through the bore 83 and along the valve seat axis 84. The bore 83 defines an inside surface 85 of the seat body 80. An outside surface 86 of the seat body 80 contacts the inside surface 46 defined by the fluid passage 38. A sealing element, such as an O-ring 88, is disposed in an annular groove 90 formed in the outside surface 86. The O-ring 88 sealingly engages the inside surface 46. The enlarged-diameter portion 82 includes a tapered external shoulder 91 and thus defines a frusto-conical surface 92, which extends angularly upward from the outside surface 86. The portion 82 further defines a cylindrical surface 94, which extends axially upward from the extent of the frusto-conical surface 92. The frusto-conical surface 92 is axially disposed between the outside surface 86 and the cylindrical surface 94. The portion 82 further defines a tapered surface 96, which extends angularly upward from the inside surface 85, as viewed in FIG. 3. In an exemplary embodiment, the tapered surface 96 extends at an angle from the valve seat axis 84. The seat body 80 of the valve seat 76 is disposed within the reduced-diameter portion 38b of the fluid passage 38 so that the outside surface 86 of the seat body 80 engages the inside surface 46 of the fluid end block 18. In an exemplary embodiment, the seat body 80 forms an interference fit, or is press fit, in the portion 38b of the fluid passage 38 so that the valve seat 76 is prevented from being dislodged from the fluid passage 38.

The valve member 78 includes a central stem 98, from which a valve body 100 extends radially outward. An outside annular cavity 102 is formed in the valve body 100. A seal 104 extends within the cavity 102, and is adapted to sealingly engage the tapered surface 96 of the valve seat 76, under conditions to be described below. A plurality of circumferentially-spaced legs 106 extend angularly downward from the central stem 98 (as viewed in FIG. 3), and slidably engage the inside surface 85 of the seat body 80. In several exemplary embodiments, the plurality of legs 106 may include two, three, four, five, or greater than five, legs 106. A lower end portion of a spring 108 is engaged with the top of the valve body 100 opposite the central stem 98. The valve member 78 is movable, relative to the valve seat 76 and thus the fluid end block 18, between a closed position (shown in FIG. 3) and an open position (not shown), under conditions to be described below.

In an exemplary embodiment, the seal 104 is molded in place in the valve body 100. In an exemplary embodiment, the seal 104 is preformed and then attached to the valve body 100. In several exemplary embodiments, the seal 104 is composed of one or more materials such as, for example, a deformable thermoplastic material, a urethane material, a fiber-reinforced material, carbon, glass, cotton, wire fibers, cloth, and/or any combination thereof. In an exemplary embodiment, the seal 104 is composed of a cloth which is disposed in a thermoplastic material, and the cloth may include carbon, glass, wire, cotton fibers, and/or any combination thereof. In several exemplary embodiments, the seal 104 is composed of at least a fiber-reinforced material, which prevents, or at least reduces, delamination. In an exemplary embodiment, the seal 104 has a hardness of 95 A durometer or greater, or a hardness of 69 D durometer or greater. In several exemplary embodiments, the valve body 100 is much harder and/or more rigid than the seal 104.

The outlet valve 56 is identical to the inlet valve 54 and therefore will not be described in further detail. Features of the outlet valve 56 that are identical to corresponding features of the inlet valve 54 will be given the same reference numerals as that of the inlet valve 54. The valve seat axis 84 of the outlet valve 56 is aligned with each of the fluid passage axis 42 and the valve seat axis 84 of the inlet valve 54. The outlet valve 56 is disposed in the fluid passage 40, and engages the fluid end block 18, in a manner that is identical to the manner in which the inlet valve 54 is disposed in the fluid passage 38, and engages the fluid end block 18, with one exception. This one exception involves the spring 108 of the outlet valve 56; more particularly, the upper portion of the spring 108 of the outlet valve 56 is compressed against the bottom of the plug 64, rather than being compressed against a component that corresponds to the valve spring retainer 72, against which the upper portion of the spring 108 of the inlet valve 54 is compressed.

In operation, in an exemplary embodiment, with continuing reference to FIGS. 1-3, the plunger 32 reciprocates within the bore 34, reciprocating in and out of the pressure chamber 36. That is, the plunger 32 moves back and forth horizontally, as viewed in FIG. 2, away from and towards the fluid passage axis 42. In an exemplary embodiment, the engine or motor (not shown) drives the crankshaft (not shown) enclosed within the housing 16, thereby causing the plunger 32 to reciprocate within the bore 34 and thus in and out of the pressure chamber 36.

As the plunger 32 reciprocates out of the pressure chamber 36, the inlet valve 54 is opened. More particularly, as the plunger 32 moves away from the fluid passage axis 42, the pressure inside the pressure chamber 36 decreases, creating a differential pressure across the inlet valve 54 and causing the valve member 78 to move upward, as viewed in FIGS. 2 and 3, relative to the valve seat 76 and the fluid end block 18. As a result of the upward movement of the valve member 78, the spring 108 is compressed between the valve body 100 and the valve spring retainer 72, the seal 104 disengages from the tapered surface 96, and the inlet valve 54 is thus placed in its open position. Fluid in the fluid inlet passage 22 flows along the fluid passage axis 42 and through the fluid passage 38 and the inlet valve 54, being drawn into the pressure chamber 36. To flow through the inlet valve 54, the fluid flows through the bore 83 of the valve seat 76 and along the valve seat axis 84. During the fluid flow through the inlet valve 54 and into the pressure chamber 36, the outlet valve 56 is in its closed position, with the seal 104 of the valve member 78 of the outlet valve 56 engaging the tapered surface 96 of the valve seat 76 of the outlet valve 56. Fluid continues to be drawn into the pressure chamber 36 until the plunger 32 is at the end of its stroke away from the fluid passage axis 42. At this point, the differential pressure across the inlet valve 54 is such that the spring 108 of the inlet valve 54 is not further compressed, or begins to decompress and extend, forcing the valve member 78 of the inlet valve 54 to move downward, as viewed in FIGS. 2 and 3, relative to the valve seat 76 and the fluid end block 18. As a result, the inlet valve 54 is placed in, or begins to be placed in, its closed position, with the seal 104 sealingly engaging, or at least moving towards, the tapered surface 96.

As the plunger 32 moves into the pressure chamber 36 and thus towards the fluid passage axis 42, the pressure within the pressure chamber 36 begins to increase. The pressure within the pressure chamber 36 continues to increase until the differential pressure across the outlet valve 56 exceeds a predetermined set point, at which point the outlet valve 56 opens and permits fluid to flow out of the pressure chamber 36, along the fluid passage axis 42 and through the fluid passage 40 and the outlet valve 56, and into the fluid outlet passage 24. As the plunger 32 reaches the end of its stroke towards the fluid passage axis 42 (i.e., its discharge stroke), the inlet valve 54 is in, or is placed in, its closed position, with the seal 104 sealingly engaging the tapered surface 96.

The foregoing is repeated, with the reciprocating pump assembly 10 pressurizing the fluid as the fluid flows from the fluid inlet passage 22 to the fluid outlet passage 24 via the pressure chamber 36. In an exemplary embodiment, the pump assembly 10 is a single-acting reciprocating pump, with fluid being pumped across only one side of the plunger 32.

In an exemplary embodiment, during the above-described operation of the reciprocating pump assembly 10, the taper of each of the surfaces 44 and 92 balances the loading forces applied thereagainst. In an exemplary embodiment, the loading is distributed across the surface 44 and 92, reducing stress concentrations. In an exemplary embodiment, the stresses in the valve seat 76, in the vicinity of the fillet interface between the surfaces 86 and the 92, are balanced with the stresses in the fluid end block 18, in the vicinity of the round interface between the surfaces 46 and 44. As a result, these stresses are reduced. In an exemplary embodiment, the taper of each of the surfaces 44 and 92 permits the outside diameter of the seat body 80 of the inlet valve 54 to be reduced, thereby also permitting a relatively smaller service port, as well as relatively smaller cross-bore diameters within the fluid end block 18. In an exemplary embodiment, the taper of each of the surfaces 44 and 92 reduces the extraction force necessary to remove the valve seat 76 from the fluid passage 38.

In an exemplary embodiment, as illustrated in FIG. 4 with continuing reference to FIGS. 1-3, a taper angle 110 is defined by the tapered external shoulder 91 and thus the frusto-conical surface 92. A taper angle 112 is defined by the tapered internal shoulder 43 and thus the frusto-conical surface 44. Each of the taper angles 110 and 112 may be measured from the fluid passage axis 42 and the valve seat axis 84 aligned therewith. In an exemplary embodiment, the taper angles 110 and 112 are equal, and range from about 10 degrees to about 45 degrees measured from the fluid passage axis 42 and the valve seat axis 84 aligned therewith. In an exemplary embodiment, the taper angles 110 and 112 range from about 20 degrees to 40 degrees measured from the fluid passage axis 42 and the valve seat axis 84 aligned therewith. In an exemplary embodiment, the taper angles 110 and 112 range from about 25 to 35 degrees measured from the fluid passage axis 42 and the valve seat axis 84 aligned therewith. In an exemplary embodiment, the taper angles 110 and 112 are equal, and each of the taper angles 110 and 112 is about 30 degrees measured from the fluid passage axis 42 and the valve seat axis 84 aligned therewith. In an exemplary embodiment, the taper angles 110 and 112 are not equal. As shown in FIG. 4, a frusto-conical gap or region 114 may be defined between the surfaces 44 and 92. Moreover, a radial clearance 116 is defined between the outside cylindrical surface 94 of the valve seat 76 and an inside surface 118 of the fluid end block 18, the surface 118 being defined by the enlarged-diameter portion 38a of the fluid passage 38. In an exemplary embodiment, the region 114 may be omitted and the surface 92 may abut the surface 44. In an exemplary embodiment, material may be disposed in the region 114 to absorb, transfer and/or distribute loads between the surfaces 44 and 92.

As shown in FIG. 4, at least the end portion of the body 80 opposite the enlarged-diameter portion 82 is tapered at a taper angle 120 from the fluid passage axis 42 and the valve seat axis 84 aligned therewith. In an exemplary embodiment, the taper angle 120 ranges from about 0 degrees to about 5 degrees measured from the fluid passage axis 42 and the valve seat axis 84 aligned therewith. In an exemplary embodiment, the taper angle 120 ranges from about 1 degree to about 4 degrees measured from the fluid passage axis 42 and the valve seat axis 84 aligned therewith. In an exemplary embodiment, the taper angle 120 ranges from about 1 degree to about 3 degrees measured from the fluid passage axis 42 and the valve seat axis 84 aligned therewith. In an exemplary embodiment, the taper angle 120 is about 2 degrees measured from the fluid passage axis 42 and the valve seat axis 84 aligned therewith. In an exemplary embodiment, the taper angle 120 is about 1.8 degrees measured from the fluid passage axis 42 and the valve seat axis 84 aligned therewith. In an exemplary embodiment, instead of, or in addition to the end portion of the body 80 opposite the enlarged-diameter portion 82 being tapered, the inside surface 46 of the fluid end block 18 is tapered at the taper angle 120. In an exemplary embodiment, an interference fit may be formed between the body 80 and the inside surface 46, thereby holding the valve seat 76 in place in the fluid end block. In several exemplary embodiments, instead of using an interference fit in the fluid passage 38, a threaded connection, a threaded nut, and/or a snap-fit mechanism may be used to hold the valve seat 76 in place in the fluid end block 18.

In an exemplary embodiment, during the operation of the pump assembly 10 using the embodiment of the inlet valve 54 illustrated in FIG. 4, the surfaces 92 and 44 provide load balancing, with loading on the enlarged-diameter portion 82 of the valve seat 76 being distributed and transferred to the surface 44 of the fluid end block 18, via either the pressing of the surface 92 against the surface 44 or intermediate material(s) disposed therebetween.

In an exemplary embodiment, as illustrated in FIG. 5 with continuing reference to FIGS. 1-4, a fillet surface 122 of the fluid end block 18 is defined by the enlarged-diameter portion 38a of the fluid passage 38. The fillet surface 122 extends between the frusto-conical surface 44 and the inside surface 118. As shown in FIG. 5, each of the frusto-conical surfaces 92 and 44 is tapered at a taper angle 123, which may be measured from the fluid passage axis 42 and the valve seat axis 84 aligned therewith. In an exemplary embodiment, the taper angle 123 ranges from about 10 degrees to about 45 degrees measured from the fluid passage axis 42 and the valve seat axis 84 aligned therewith. In an exemplary embodiment, the taper angle 123 ranges from about greater than 10 degrees to about 30 degrees measured from the fluid passage axis 42 and the valve seat axis 84 aligned therewith. In an exemplary embodiment, the taper angle 123 ranges from about 12 degrees to about 20 degrees measured from the fluid passage axis 42 and the valve seat axis 84 aligned therewith. In an exemplary embodiment, the taper angle 123 is about 14 degrees measured from the fluid passage axis 42 and the valve seat axis 84 aligned therewith. In an exemplary embodiment, the surface 92 and 44 may be tapered at respective angles that are not equal. The surface 92 abuts the surface 44. As shown in FIG. 5, the groove 90 and the O-ring 88 are omitted in favor of an annular groove 124 and an O-ring 126, respectively. The annular groove 124 is formed in the frusto-conical surface 92, and the O-ring 126 is disposed in the annular groove 124. The O-ring 126 sealingly engages the frusto-conical surface 44.

In an exemplary embodiment, during the operation of the pump assembly 10 using the embodiment of the inlet valve 54 illustrated in FIG. 5, loads applied to the valve seat 76 are distributed and transferred to the fluid end block 18 via, at least in part, the load balancing provided by the abutment of the surface 92 against the surface 44.

In an exemplary embodiment, during the operation of the pump assembly 10 using any of the foregoing embodiments of the inlet valve 54, downwardly directed axial loads along the fluid passage axis 42 are applied against the top of the valve body 100. This loading is usually greatest as the plunger 32 moves towards the fluid passage axis 42 and the outlet valve 56 opens and permits fluid to flow out of the pressure chamber 36, through the fluid passage 40 and the outlet valve 56, and into the fluid outlet passage 24. As the plunger 32 reaches the end of its stroke towards the fluid passage axis 42 (its discharge stroke), the inlet valve 54 is in, or is placed in, its closed position, and the loading applied to the top of the valve body 100 is transferred to the seal 104 via the valve body 100. The loading is then transferred to the valve seat 76 via the seal 104, and then is distributed and transferred to the tapered internal shoulder 43 of the fluid end block 18 via either the engagement of the surface 92 against the surface 44 or intermediate material(s) disposed therebetween. The tapering of the surfaces 92 and 44 facilitates this distribution and transfer of the downwardly directed axial loading to the fluid end block 18 in a balanced manner, thereby reducing stress concentrations in the fluid end block 18 and the valve seat 76.

Figure 6:
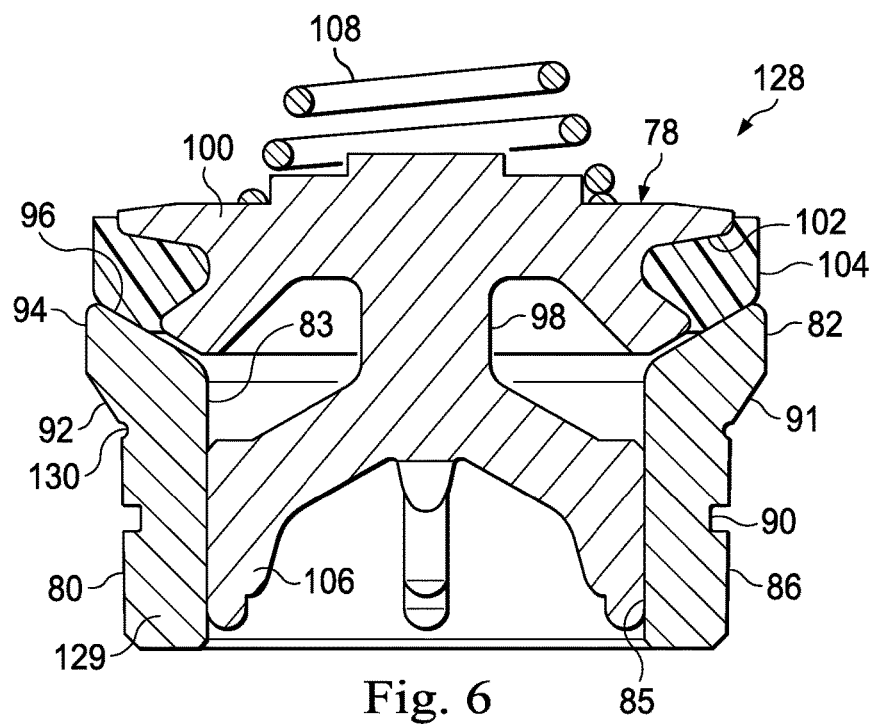
FIG. 6 is a section view of a valve according to another exemplary embodiment, the valve including a valve seat.
Figure 8:
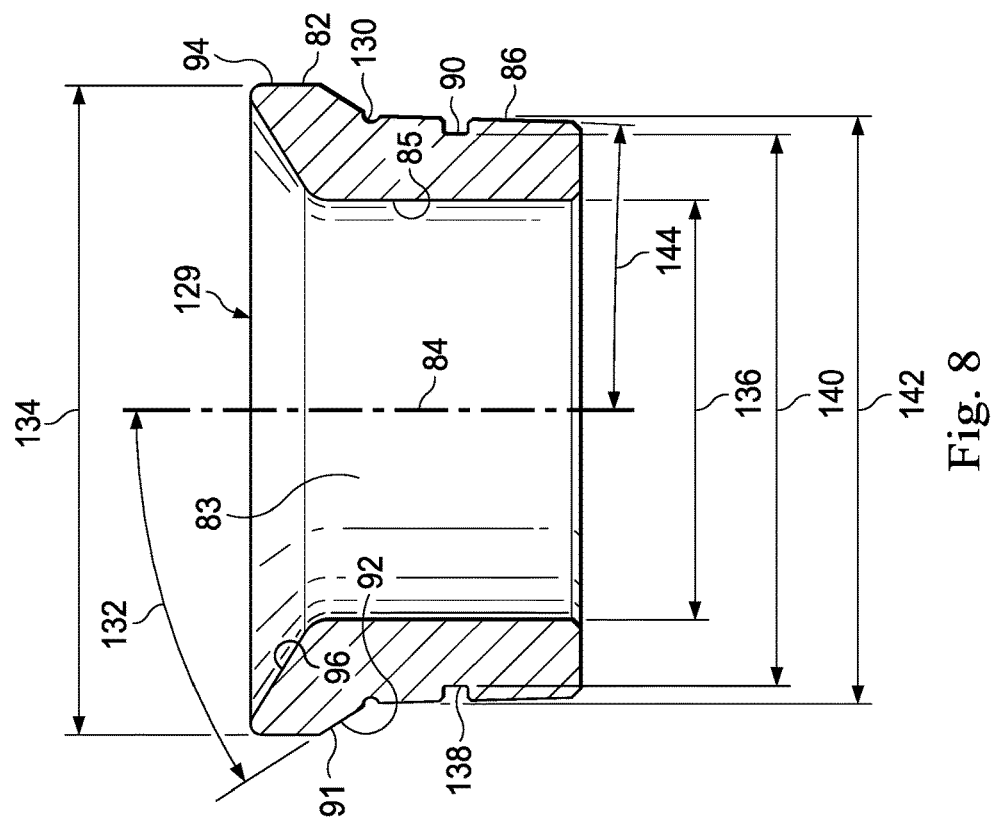
FIG. 8 is a sectional view of the valve seat of FIGS. 6 and 7, according to an exemplary embodiment.
Figure 7:
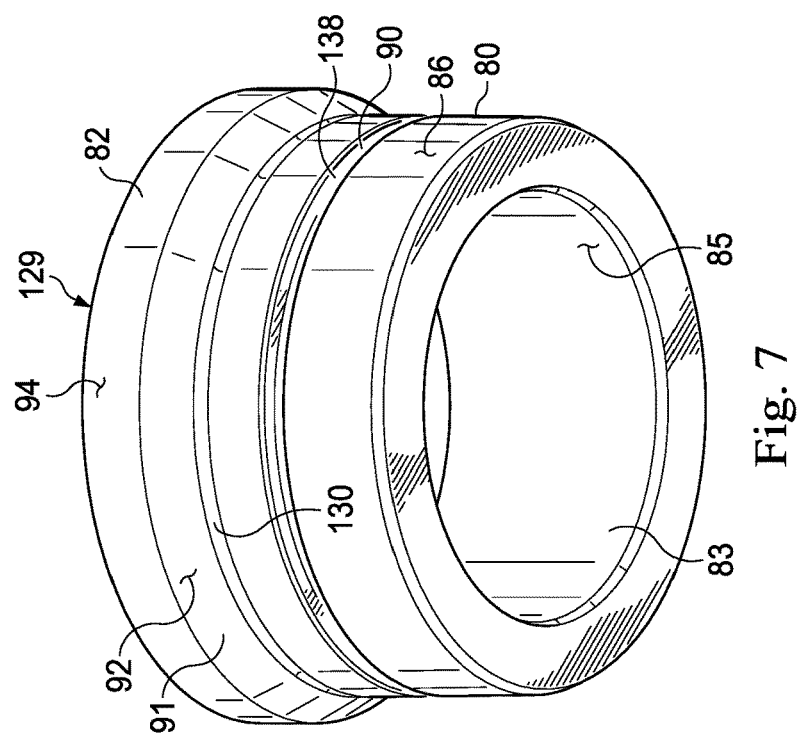
FIG. 7 is a perspective view of the valve seat of FIG. 6, according to an exemplary embodiment.

In an exemplary embodiment, as illustrated in FIGS. 6-8 with continuing reference to FIGS. 1-5, an inlet valve is generally referred to by the reference numeral 128 and includes several parts that are identical to corresponding parts of the inlet valve 54, which identical parts are given the same reference numerals. The inlet valve 128 includes a valve seat 129. The valve seat 129 includes several features that are identical to corresponding features of the valve seat 76, which identical features are given the same reference numerals. An annular notch 130 is formed in the valve seat 128 at the intersection of the surfaces 86 and 92.

As shown in FIG. 8, a taper angle 132 is defined by the external tapered shoulder 91 and thus the frusto-conical surface 92. The taper angle 132 may be measured from the valve seat axis 84. In an exemplary embodiment, the taper angle 132 is about 30 degrees measured from the valve seat axis 84. In an exemplary embodiment, the taper angle 132 ranges from about 10 degrees to about 45 degrees measured from the valve seat axis 84. In an exemplary embodiment, the taper angle 132 ranges from about 20 degrees to about 40 degrees measured from the valve seat axis 84. In an exemplary embodiment, the taper angle 132 ranges from about 25 to about 35 degrees measured from the valve seat axis 84. The cylindrical surface 94 defined by the enlarged-diameter portion 82 of the valve seat 129 defines an outside diameter 134. In an exemplary embodiment, the outside diameter 134 is about 5 inches. In an exemplary embodiment, the outside diameter 134 is about 5.06 inches. The inside surface 85 of the seat body 80 defined by the bore 83 formed therethrough defines an inside diameter 136. In an exemplary embodiment, the inside diameter 136 ranges from about 3 inches to about 3.5 inches. In an exemplary embodiment, the inside diameter 136 is about 3.27 inches. An annular surface 138 of the seat body 80 is defined by the annular groove 90. A groove diameter 140 is defined by the annular surface 138. In an exemplary embodiment, the groove diameter 140 ranges from about 4 inches to about 4.5 inches. In an exemplary embodiment, the groove diameter 140 is about 4.292 inches. In an exemplary embodiment, an outside diameter 142 is defined by the outside surface 86 of the seat body 80 at an axial location therealong adjacent the annular notch 130, or at least in the vicinity of the intersection between the surfaces 86 and 92. In an exemplary embodiment, the outside diameter 142 ranges from about 4 inches to about 5 inches. In an exemplary embodiment, the outside diameter 142 ranges from about 4.5 inches to about 5 inches. In an exemplary embodiment, the outside diameter 142 ranges from about 4.5 inches to about 4.6 inches. In an exemplary embodiment, the outside diameter 142 is about 4.565 inches. The outside surface 86 is tapered radially inward beginning at the axial location of the outside diameter 142 and ending at the end of the body 80 opposite the enlarged-diameter portion 82, thereby defining a taper angle 144 from the valve seat axis 84. In an exemplary embodiment, the taper angle 144 ranges from about 0 degrees to about 5 degrees measured from the valve seat axis 84. In an exemplary embodiment, the taper angle 144 ranges from greater than 0 degrees to about 5 degrees measured from the valve seat axis 84. In an exemplary embodiment, the taper angle 144 is about 2 degrees measured from the valve seat axis 84. In an exemplary embodiment, the taper angle 144 is about 1.8 degrees measured from the valve seat axis 84.

Figure 9:
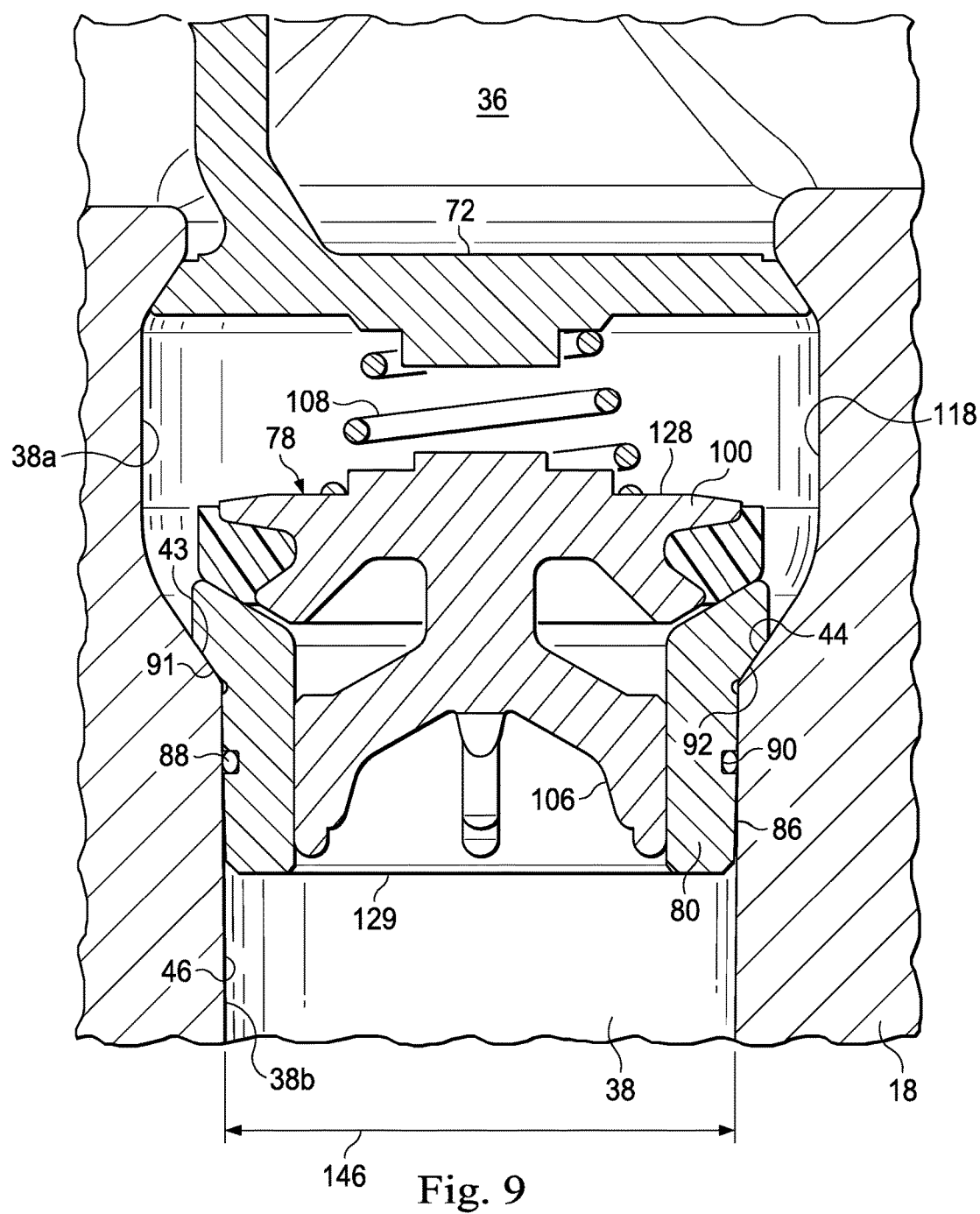
FIG. 9 is a sectional view of the valve of FIG. 6 disposed within the fluid end block of FIG. 2, according to an exemplary embodiment.

In an exemplary embodiment, as illustrated in FIG. 9 with continuing reference to FIGS. 1-8, the inlet valve 54 is omitted from the pump assembly 10 in favor of the inlet valve 128, which is disposed in the fluid passage 38. The tapered external shoulder 91 of the valve seat 129 engages the tapered internal shoulder 43 of the fluid end block 18. Thus, the frusto-conical surface 92 engages the frusto-conical surface 44. In an exemplary embodiment, the tapered internal shoulder 43 defines a taper angle from the fluid passage axis 42 that is equal to the taper angle 132. In an exemplary embodiment, the tapered internal shoulder 43 defines a taper angle that is equal to the taper angle 132, and the taper angle 132 ranges from about 10 degrees to about 45 degrees measured from the valve seat axis 84. In an exemplary embodiment, the tapered angle 132 ranges from about 20 degrees to 45 degrees measured from the valve seat axis 84. In an exemplary embodiment, the tapered angle 132 ranges from about 25 degrees to 35 degrees measured from the valve seat axis 84. In an exemplary embodiment, the tapered internal shoulder 43 defines a taper angle that is equal to the taper angle 132, and the taper angle 132 is about 30 degrees measured from the valve seat axis 84. The O-ring 88 sealingly engages the inside surface 46 of the fluid end block 18. The outside surface 86 of the body 80 of the valve seat 129 of the inlet valve 128 engages the inside surface 46 of the fluid end block 18. In an exemplary embodiment, at least the reduced-diameter portion 38*b* of the fluid passage 38 is tapered such that an inside diameter 146 defined by the portion 38*b* decreases along the fluid passage axis 42 in an axial direction away from the enlarged-diameter portion 38*a*. In an exemplary embodiment, at an axial location corresponding to the intersection between the surfaces 46 and 44, the inside diameter 146 ranges from about 4 inches to about 5 inches. In an exemplary embodiment, at an axial location corresponding to the intersection between the surfaces 46 and 44, the inside diameter 146 ranges from about 4.5 inches to about 5 inches. In an exemplary embodiment, at an axial location corresponding to the intersection between the surfaces 46 and 44, the inside diameter 146 ranges from about 4.5 inches to about 4.6 inches. In an exemplary embodiment, at an axial location corresponding to the intersection between the surfaces 46 and 44, the inside diameter 146 is about 4.553 inches. In an exemplary embodiment, an interference fit is formed between the outside surface 86 and the inside surface 46, thereby preventing the valve seat 129 from being dislodged from the fluid passage 38.

In an exemplary embodiment, the operation of the inlet valve 129 during the operation of the pump assembly 10 is identical to the operation of the inlet valve 54. Therefore, the operation of the inlet valve 129 during the operation of the pump assembly 10 will not be described in detail.

In an exemplary embodiment, the inlet valve 54 may be omitted from the pump assembly 10 in favor of the inlet valve 128, and the outlet valve 56 may be omitted from the pump assembly 10 in favor of an outlet valve that is identical to the inlet valve 128. In an exemplary embodiment, the operation of the pump assembly 10 using the inlet valve 128, and an outlet valve that is identical to the inlet valve 128, is identical to the above-described operation of the pump assembly 10 using the inlet valve 54 and the outlet valve 56.

Figure 10:
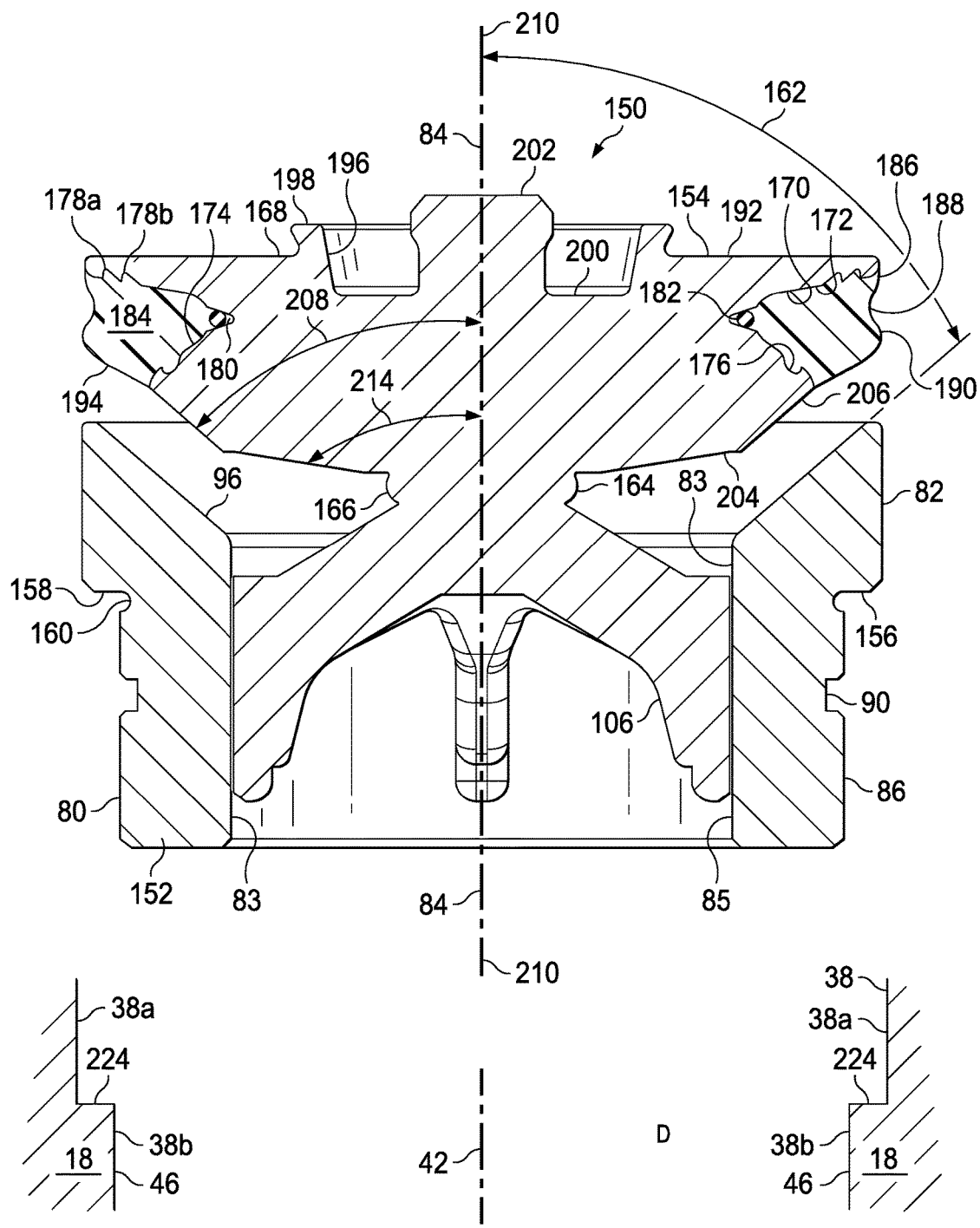
FIG. 10 is a sectional view of a valve according to an exemplary embodiment, the valve including a valve seat and a valve member.
Figure 11:
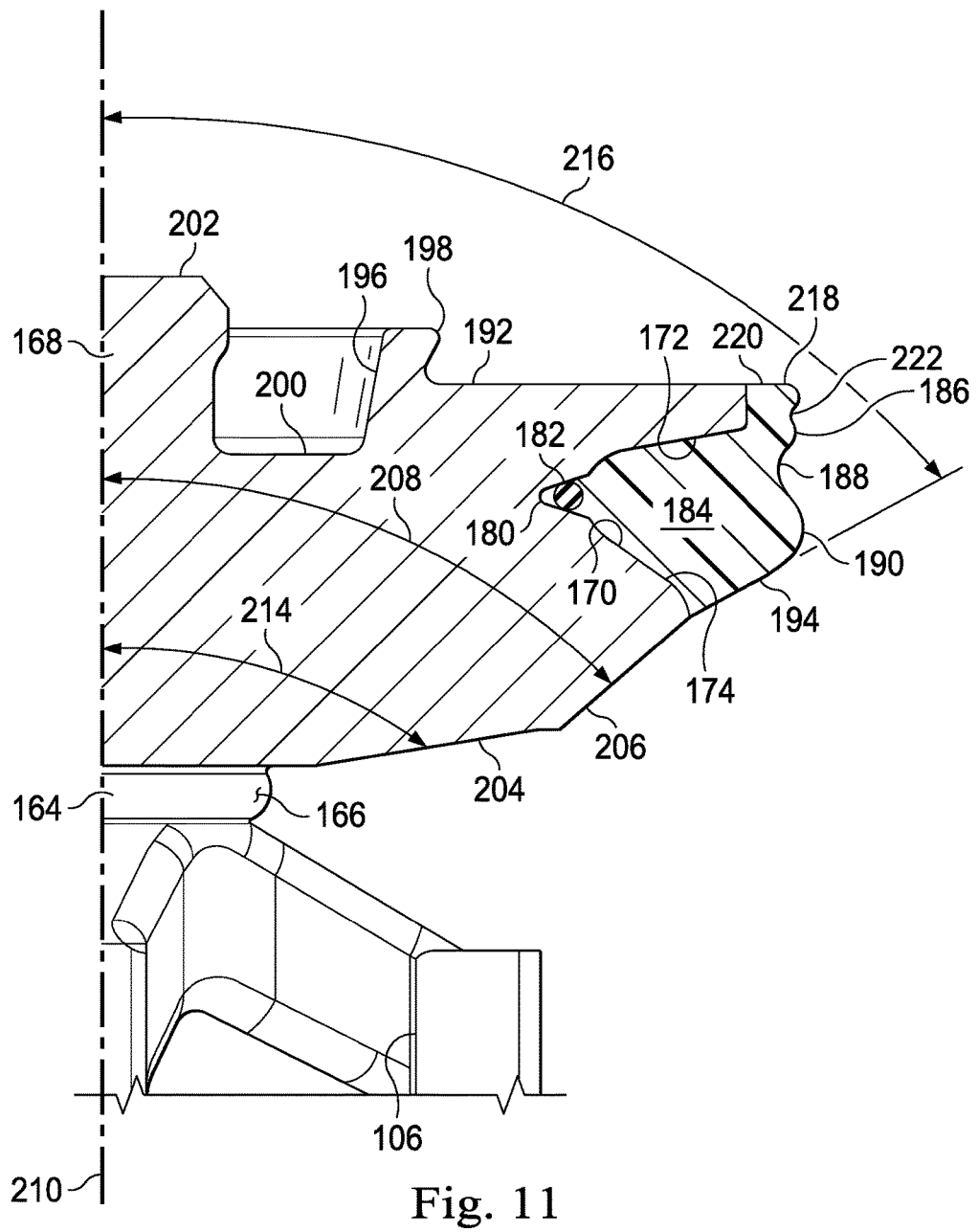
FIG. 11 is an enlarged view of a portion of the valve member of FIG. 10, according to another exemplary embodiment.

In an exemplary embodiment, as illustrated in FIGS. 10 and 11 with continuing reference to FIGS. 1-9, an inlet valve is generally referred to by the reference numeral 150 and includes several parts that are identical to corresponding parts of the inlet valve 54, which identical parts are given the same reference numerals. The inlet valve 150 includes a valve seat 152 and a valve member 154.

The valve seat 152 includes several features that are identical to corresponding features of the valve seat 76, which identical features are given the same reference numerals. In contrast to the valve seat 76, however, and as shown in FIG. 10, the valve seat 152 does not include the external tapered shoulder 91 and thus does not include the frusto-conical surface 92. Instead, the valve seat 152 includes an external shoulder 156, which defines an axially-facing and circumferentially-extending surface 158. Alternatively, in several exemplary embodiments, the valve seat 152 may be described as having the external tapered shoulder 91, but the value of the taper angle 132 defined by the external tapered shoulder 91 is 90 degrees. Moreover, the surface area of the tapered surface 96 is increased; in particular, the portion of the surface area of the tapered surface 96 that is adapted to undergo steel-to-steel contact is about doubled (2× to 2.2×).

An annular notch 160 is formed in the valve seat 152 at the intersection of the surfaces 86 and 158. A taper angle 162 is defined by the tapered surface 96. The taper angle 162 may be measured from the valve seat axis 84. In an exemplary embodiment, the taper angle 162 is about 50 degrees measured from the vertically-extending valve seat axis 84 (40 degrees from any horizontal line as viewed in FIG. 10). In an exemplary embodiment, the taper angle 162 ranges from about 40 degrees to about 60 degrees measured from the valve seat axis 84 (50 degrees to about 30 degrees from any horizontal line as viewed in FIG. 10). In an exemplary embodiment, the taper angle 162 ranges from about 45 degrees to about 55 degrees measured from the valve seat axis 84 (45 degrees to about 35 degrees from any horizontal line as viewed in FIG. 10).

The valve member 154 includes a central disk-shaped central base 164, which defines an outside circumferentially-extending convex surface 166. A valve body 168 extends axially upwards from the base 164, along the valve seat axis 84. The valve body 168 also extends radially outward from the valve seat axis 84. An outside annular cavity 170 is formed in the valve body 168. A generally tapered and circumferentially-extending surface 172, which extends angularly downward, is defined by the outside annular cavity 170. A generally tapered and circumferentially-extending surface 174, which extends angularly upward, is also defined by the outside annular cavity. A lower circumferentially-extending channel 176 is formed in the surface 174. Upper circumferentially-extending channels 178a and 178b are formed in the surface 172. An annular groove 180 is formed in the valve body 168 at the intersection between the surfaces 172 and 174. An annular element, such as an O-ring 182, is disposed in the annular groove 180.

A seal 184 extends within the outside annular cavity 170, and is adapted to sealingly engage the tapered surface 96 of the valve seat 152. The seal 184 extends within the channels 176, 178a, and 178b. The O-ring 182 engages the seal 184. In an exemplary embodiment, the seal 184 is composed of urethane. In an exemplary embodiment, the extension of the seal 184 within the channels 176, 178a, and 178b facilitates in securing the seal 184 to the valve body 168. In an exemplary embodiment, the combination of the O-ring 182, and the extension of the seal 184 within the channels 176, 178a, and 178b, facilitates in securing the seal 184 to the valve body 168. The seal 184 defines an outside circumferentially-extending exterior 186. An annular channel 188 is formed in the exterior 186. The seal 184 further includes an annular bulbous protrusion 190. The channel 188 is positioned vertically between a top surface 192 of the valve body 168 and the bulbous protrusion 190. In an exemplary embodiment, the bulbous protrusion 190 is adjacent the channel 188. In an exemplary embodiment, as shown in FIG. 10, the channel 188 is positioned vertically between the top surface 192 and the bulbous protrusion 190, and the bulbous protrusion 190 is adjacent the channel 188. A tapered and circumferentially-extending surface 194 extends angularly downward from the bulbous protrusion 190, the extension of the surface 194 ending at, or proximate, the valve body 168.

In several exemplary embodiments, the seal 184 is a unitary structure and thus the surface 186, the channel 188, the bulbous protrusion 190, and the surface 194, as well as the respective portions of the seal 184 extending within the channels 176, 178a, and 178b, are integrally formed.

In several exemplary embodiments, the seal 184 is a unitary structure of urethane, and thus the surface 186, the channel 188, the bulbous protrusion 190, and the surface 194, as well as the respective portions of the seal 184 extending within the channels 176, 178a, and 178b, are integrally formed using urethane.

As shown in FIGS. 10 and 11, the valve body 168 includes an annular channel 196, about which the top surface 192 circumferentially extends. An annular ridge 198 is formed in the valve body 168 adjacent the channel 196, and is radially positioned between the channel 196 and the top surface 192. An axially-facing surface 200 is defined by the channel 196, and a protrusion 202 extends axially upwards from the surface 200 and out of the channel 196. The lower end portion of the spring 108 (not shown in FIGS. 10 and 11) is engaged with the surface 200. The protrusion 202 extends within the lower end portion of the spring 108.

The valve body 168 defines a frusto-conical surface 204, which extends angularly upwardly from the base 164. A frusto-conical surface 206 is also defined by the valve body 168, the frusto-conical surface 206 extending angularly between the frusto-conical surface 204 of the valve body 168 and the tapered and circumferentially-extending surface 194 of the seal 184.

The plurality of circumferentially-spaced legs 106 extend angularly downward from the base 164, and slidably engage the inside surface 85 of the seat body 80 of the valve seat 152. In several exemplary embodiments, the plurality of legs 106 may include two, three, four, five, or greater than five, legs 106.

An angle 208 is defined by the frusto-conical surface 206. The angle 208 may be measured from a valve member axis 210. The valve member axis 210 is aligned, or coaxial, with valve seat axis 84 when the inlet valve 150 is disposed in the fluid passage 38 of the fluid end block 18. Thus, the axes 210, 84, and 42 are aligned, or coaxial, with each other when the inlet valve 150 is disposed in the first fluid passage 38 of the fluid end block 18.

In an exemplary embodiment, the angle 208, as measured from the valve member axis 210, is substantially equal to the angle 162 defined by the tapered surface 96, as measured from the valve seat axis 84. In an exemplary embodiment, the angle 208 is 50 degrees from the valve member axis 210, and the angle 162 is 50 degrees from the valve seat axis 84.

An angle 214 is defined by the frusto-conical surface 204. As measured from the valve member axis 210, the angle 214 is greater than the angle 208.

An angle 216 (shown most clearly in FIG. 11) is defined by the tapered surface 194 of the seal 184. The angle 216 may be measured from the valve member axis 210. In an exemplary embodiment, the angle 216 is substantially equal to the angle 208 when measured from the valve member axis 210. In an exemplary embodiment, the angle 216 is greater than the angle 208 when measured from the valve member axis 210. In an exemplary embodiment, the angle 216 is substantially equal to, or greater than, the angle 208 when measured from the valve member axis 210. In an exemplary embodiment, the angle 216 is less than, substantially equal to, or greater than, the angle 208 when measured from the valve member axis 210.

In an exemplary embodiment, the valve member 154 is composed of AISI 8620 alloy steel material. In an exemplary embodiment, the valve seat 152 is composed of AISI 8620 alloy steel material. In an exemplary embodiment, the valve seat 152 is composed of AISI 52080 alloy steel material.

The valve member 154 is movable, relative to the valve seat 152 and the fluid end block 18, between a closed position (not shown but described below) and an open position (shown in FIG. 10 and described below).

In an exemplary embodiment, as shown in FIG. 11, the seal 184 includes a circumferentially-extending upper tab 218, which extends upwardly from the channel 188 and encircles the top surface 192 of the valve body 168. A top surface 220 is defined by the tab 218. As shown in FIG. 11, the top surface 220 of the seal 184 and the top surface 192 of the valve body 168 are substantially flush. An annular channel 222 is formed in the tab 218 at the exterior 186 of the seal 184. In several exemplary embodiments, as shown in FIG. 11, the channels 176, 178a, and 178b may be omitted from the valve body 168.

In an exemplary embodiment, the seal 184 is molded in place in the valve body 168. In an exemplary embodiment, the seal 184 is preformed and then attached to the valve body 168. In several exemplary embodiments, the seal 184 is composed of one or more materials such as, for example, a deformable thermoplastic material, a urethane material, a fiber-reinforced material, carbon, glass, cotton, wire fibers, cloth, and/or any combination thereof. In an exemplary embodiment, the seal 184 is composed of a cloth which is disposed in a thermoplastic material, and the cloth may include carbon, glass, wire, cotton fibers, and/or any combination thereof. In several exemplary embodiments, the seal 184 is composed of at least a fiber-reinforced material, which prevents, or at least reduces, delamination. In an exemplary embodiment, the seal 184 has a hardness of 95 A durometer or greater, or a hardness of 69 D durometer or greater. In several exemplary embodiments, the valve body 168 is much harder and/or more rigid than the seal 184.

In an exemplary embodiment, with reference to FIGS. 2, 3, 10, and 11, the inlet valve 54 is omitted from the pump assembly 10 in favor of the inlet valve 150, which is disposed in the fluid passage 38. However, the tapered internal shoulder 43 is omitted from the fluid end block 18, in favor of an axially-facing internal shoulder 224 (shown in FIG. 10), which is defined by the enlarged-diameter portion 38a of the fluid inlet passage 38 of the fluid end block 18. Alternatively, this exemplary embodiment may be described as including the tapered internal shoulder 43, but the taper angle of the tapered internal shoulder 43 is 90 degrees when measured from the axis 42.

When the inlet valve 150 is disposed in the fluid passage 38, the external shoulder 156 of the valve seat 152 is engaged with the internal shoulder 224 of the fluid end block 18. The O-ring 88 (shown in FIG. 3) is disposed in the annular groove 90 and sealingly engages the inside surface 46 of the fluid end block 18. The outside surface 86 of the body 80 of the valve seat 152 of the inlet valve 150 engages the inside surface 46 of the fluid end block 18. In an exemplary embodiment, at least the reduced-diameter portion 38b of the fluid passage 38 is tapered such that its inside diameter decreases along the fluid passage 38 in an axial direction away from the enlarged-diameter portion 38a. In an exemplary embodiment, an interference fit is formed between the outside surface 86 and the inside surface 46, thereby preventing the valve seat 152 from being dislodged from the fluid passage 38. The lower portion of the spring 108 engages the surface 200 of the valve body 168, while the upper portion of the spring 108 engages the valve spring retainer 72. The spring 108 of the inlet valve 150 is thus compressed between the surface 200 and the valve spring retainer 72.

In an exemplary embodiment, with reference to FIGS. 2, 3, 10, and 11, the outlet valve 56 is omitted from the pump assembly 10 in favor of an outlet valve that is identical to the inlet valve 150, and this outlet valve is disposed in the fluid passage 40. However, the tapered internal shoulder 48 is omitted from the fluid end block 18, in favor of an axially-facing internal shoulder (not shown but identical to the shoulder 224), which is defined by the enlarged-diameter portion 40a of the fluid outlet passage 40 of the fluid end block 18. Alternatively, this exemplary embodiment may be described as including the tapered internal shoulder 48, but the taper angle of the tapered internal shoulder 48 is 90 degrees when measured from the axis 42.

The outlet valve, which is identical to the inlet valve 150, is disposed in the fluid passage 40, and engages the fluid end block 18, in a manner that is identical to the manner in which the inlet valve 150 is disposed in the fluid passage 38, and engages the fluid end block 18, with one exception. This one exception involves the spring 108 of the outlet valve that is identical to the inlet valve 150; more particularly, the upper portion of the spring 108 of the outlet valve is compressed against the bottom of the plug 64, rather than being compressed against a component that corresponds to the valve spring retainer 72, against which the upper portion of the spring 108 of the inlet valve 150 is compressed.

In operation, in an exemplary embodiment, with continuing reference to FIGS. 1-11, the plunger 32 reciprocates within the bore 34, reciprocating in and out of the pressure chamber 36. That is, the plunger 32 moves back and forth horizontally, as viewed in FIG. 2, away from and towards the fluid passage axis 42. In an exemplary embodiment, the engine or motor (not shown) drives the crankshaft (not shown) enclosed within the housing 16, thereby causing the plunger 32 to reciprocate within the bore 34 and thus in and out of the pressure chamber 36.

As the plunger 32 reciprocates out of the pressure chamber 36, the inlet valve 150 is opened. More particularly, as the plunger 32 moves away from the fluid passage axis 42, the pressure inside the pressure chamber 36 decreases, creating a differential pressure across the inlet valve 150 and causing the valve member 154 to move upward, as viewed in FIGS. 2, 3, and 10, relative to the valve seat 152 and the fluid end block 18. As a result of the upward movement of the valve member 154, the spring 108 is compressed between the valve body 168 and the valve spring retainer 72, the seal 184 disengages from the tapered surface 96, and the inlet valve 150 is thus placed in its open position. Fluid in the fluid inlet passage 22 flows along the fluid passage axis 42 and through the fluid passage 38 and the inlet valve 150, being drawn into the pressure chamber 36. To flow through the inlet valve 150, the fluid flows through the bore 83 of the valve seat 152 and along the valve seat axis 84. During the fluid flow through the inlet valve 150 and into the pressure chamber 36, the outlet valve (which is identical to the inlet valve 150 as described above) is in its closed position, with the seal 184 of the valve member 154 of the outlet valve engaging the tapered surface 96 of the valve seat 152 of the outlet valve. Fluid continues to be drawn into the pressure chamber 36 until the plunger 32 is at the end of its stroke away from the fluid passage axis 42. At this point, the differential pressure across the inlet valve 150 is such that the spring 108 of the inlet valve 54 is not further compressed, or begins to decompress and extend, forcing the valve member 154 of the inlet valve 150 to move downward, as viewed in FIGS. 2, 3, and 10, relative to the valve seat 152 and the fluid end block 18. As a result, the inlet valve 150 is placed in, or begins to be placed in, its closed position, with the seal 184 sealingly engaging, or at least moving towards, the tapered surface 96.

As the plunger 32 moves into the pressure chamber 36 and thus towards the fluid passage axis 42, the pressure within the pressure chamber 36 begins to increase. The pressure within the pressure chamber 36 continues to increase until the differential pressure across the outlet valve (which is identical to the inlet valve 150) exceeds a predetermined set point, at which point the outlet valve opens and permits fluid to flow out of the pressure chamber 36, along the fluid passage axis 42 and through the fluid passage 40 and the outlet valve, and into the fluid outlet passage 24. As the plunger 32 reaches the end of its stroke towards the fluid passage axis 42 (i.e., its discharge stroke), the inlet valve 150 is in, or is placed in, its closed position, with the seal 184 sealingly engaging the tapered surface 96.

The foregoing is repeated, with the reciprocating pump assembly 10 pressurizing the fluid as the fluid flows from the fluid inlet passage 22 and to the fluid outlet passage 24 via the pressure chamber 36. In an exemplary embodiment, the pump assembly 10 is a single-acting reciprocating pump, with fluid being pumped across only one side of the plunger 32.

In an exemplary embodiment, during the above-described operation of the reciprocating pump assembly 10 with the inlet valve 150 and the outlet valve that is identical to the inlet valve 150, the shape of the seal 184 provides improved contact pressure against the tapered surface 96, thereby providing a better seal in the closed position. In particular, in an exemplary embodiment, the surface 194 provides improved contact pressure against the tapered surface 96. In an exemplary embodiment, the combination of the surface 194 and the bulbous protrusion 190 provides improved contact pressure against the tapered surface 96.

In an exemplary embodiment, when the inlet valve 150 is in the closed position, at least the surface 194 seals against the tapered surface 96, and at least the surface 206 of the valve body 168 contacts the tapered surface 96 of the valve seat 152. In several exemplary embodiments, the contact between the surfaces 206 and 96 is steel-to-steel contact, which may be susceptible to damage and wear. However, the combination of the frusto-conical surfaces 204 and 206 greatly reduces the maximum steel contact pressure between the surfaces 206 and 96, greatly reducing damage and wear. In several exemplary embodiments, specifying the angle 162 at 50 degrees from the axis 84 (or 40 degrees from horizontal), and the angle 208 at 50 degrees from the axis 210 (or 40 degrees from horizontal), reduces the maximum steel contact pressure. In several exemplary embodiments, the steel/urethane ratio reduces the maximum steel contact pressure. In several exemplary embodiments, the ratio of the contact area of the valve body 168 against the surface 96, to the contact area of the seal 184 against the surface 96, reduces the maximum steel contact pressure.

In an exemplary embodiment, when the inlet valve 150 is in the closed position, the steel-to-steel contact between the surfaces 206 and 96 results in maximum stress in the valve body 168 of the valve member 154, and/or in the seat body 80 of the valve seat 152. However, the combination of the frusto-conical surfaces 204 and 206 greatly reduces this maximum stress. In several exemplary embodiments, the steel/urethane ratio reduces the maximum stress. In several exemplary embodiments, the ratio of the contact area of the valve body 168 against the surface 96, to the contact area of the seal 184 against the surface 96, reduces the maximum stress.

Comparing the valve body 100 of FIG. 6 with the valve body 168 of FIG. 10, the filling in of the valve body 168 with material, to define the surfaces 204 and 206, increases strength and reduces turbulence. In several exemplary embodiments, specifying the angle 162 at 50 degrees from the axis 84 (or 40 degrees from horizontal), and the angle 208 at 50 degrees from the axis 210 (or 40 degrees from horizontal), provides for better fluid flow and contact area.

In several experimental exemplary embodiments, experimental finite element analyses were conducted on an Experimental Baseline Embodiment of an inlet valve and an Experimental Exemplary Embodiment of the inlet valve 150 illustrated in FIG. 10. The Experimental Baseline Embodiment was similar in design and configuration to the inlet valve 128 illustrated in FIG. 6, except that the tapered external shoulder 91 and thus the frusto-conical surface 92 were omitted; instead, the Experimental Baseline Embodiment included an external shoulder identical to the external shoulder 156 of the inlet valve 150, and thus included an axially-facing and circumferentially-extending surface identical to the surface 158 of the inlet valve 150. During the experimental finite element analyses, the Experimental Baseline Embodiment and the Experimental Exemplary Embodiment of the inlet valve 150 were of the same valve size to work in the same size of fluid end block 18, and were subject to the same operational parameters (pressure, force loading, etc.).

Figure 12:
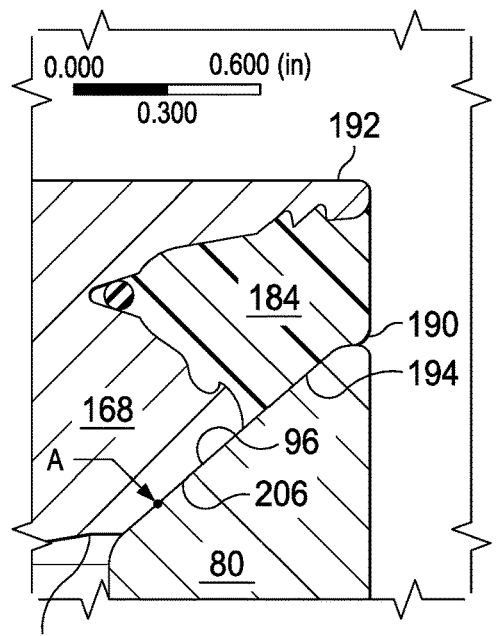
FIG. 12 is a view of experimental steel contact pressures experienced by a finite element model of the valve of FIG. 10, according to an exemplary experimental embodiment.

In an exemplary experimental embodiment, FIG. 12 is a view of experimental steel contact pressures experienced by a finite element model of the Experimental Exemplary Embodiment of the inlet valve 150 of FIG. 10, according to an exemplary experimental embodiment. The maximum steel contact pressure between the valve body 168 and the seat body 80 was found to be in the vicinity of point A in FIG. 12, with a value of about 60 ksi. The equivalent Experimental Baseline Embodiment had a maximum steel contact pressure of about 244 ksi. Thus, the inlet valve 150 provides at least a 75% reduction in maximum steel contact pressure between the valve body 168 and the seat body 80. This was an unexpected result. The portion of the surface area of the surface 96 adapted to undergo steel-to-steel contact was about doubled (2× to 2.2×), yet this doubling provided a 75% reduction in maximum steel contact pressure, rather than just a 50% reduction as might have been expected. Thus, the 75% reduction in maximum contact pressure was an unexpected result.

Figure 13:
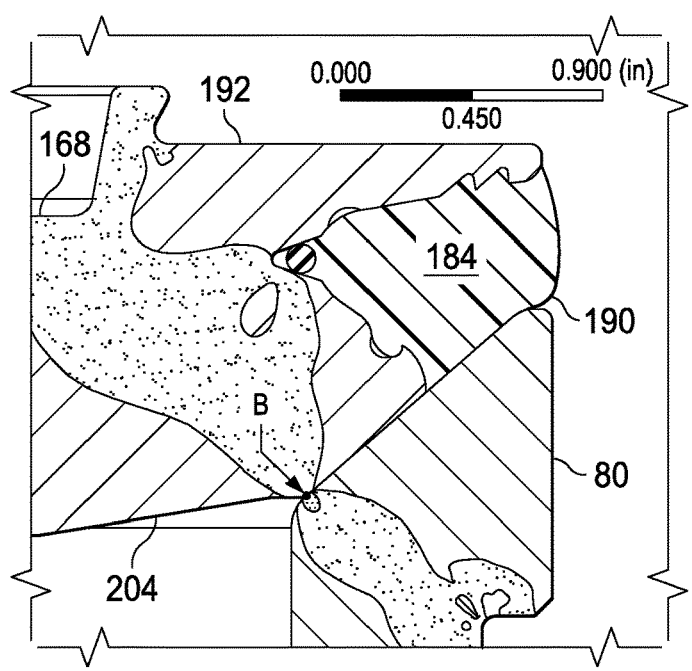
FIG. 13 is a view of experimental stresses experienced by a finite element model of the valve of FIG. 10, according to an exemplary experimental embodiment.

In an exemplary experimental embodiment, FIG. 13 is a view of experimental stresses experienced by a finite element model of the Exemplary Experimental Embodiment of the inlet valve 150 of FIG. 10, according to an exemplary experimental embodiment. The maximum stress due to the contact between the valve body 168 and the seat body 80 was found to be in the vicinity of point B in FIG. 13, with a value of about 68 ksi. The equivalent Experimental Baseline Embodiment had a maximum stress of about 130 ksi. Thus, the inlet valve 150 provides at least a 48% reduction in maximum stress.

Figure 14:
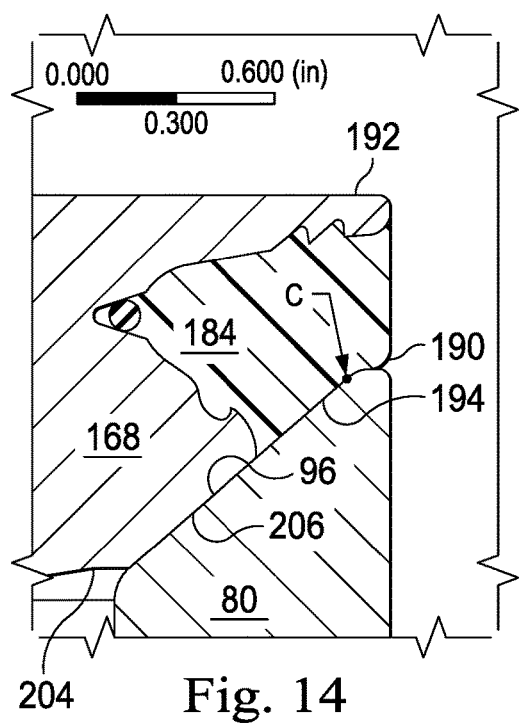
FIG. 14 is a view of experimental urethane contact pressures experienced by a finite element model of the valve of FIG. 10, according to an exemplary experimental embodiment.

In an exemplary experimental embodiment, FIG. 14 is a view of experimental urethane contact pressures experienced by a finite element model of the Exemplary Experimental Embodiment of the inlet valve 150 of FIG. 10, according to an exemplary experimental embodiment. The maximum urethane contact pressure provide by the seal 184 against the surface 96 was found to be in the vicinity of point C in FIG. 14, and was 500 psi higher than the maximum urethane contact pressure of the equivalent Experimental Baseline Embodiment.

In an exemplary experimental embodiment, the contact area between the seal 184 and the surface 96 of the Exemplary Experimental Embodiment of the inlet valve 150 was 6.388 in$^2$, and the contact area between the surface 206 and the surface 96 of the Exemplary Experimental Embodiment was 6.438 in$^2$; and the contact area between the seal 184 and the surface 96 of the Experimental Baseline Embodiment was 7.166 in$^2$, and the contact area between the surface 206 and the surface 96 of the Experimental Baseline Embodiment was 3.176 in$^2$.

In an exemplary embodiment, the contact area between the seal 184 and the surface 96 of the inlet valve 150 is 6.388 in$^2$ (e.g., urethane contact), and the contact area between the surface 206 and the surface 96 of the inlet valve 150 is 6.438 in$^2$ (e.g., steel contact). In an exemplary embodiment, the steel/urethane contact ratio of the inlet valve 150 is 6.438/6.388, or about 1. In an exemplary embodiment, the steel/urethane contact ratio of the inlet valve 150 is 6.82/6.22, or about 1.1. In an exemplary embodiment, the steel/urethane contact ratio ranges from about 0.9 to about 1.2. In an exemplary embodiment, the ratio of the contact area between the surface 206 and the surface 96 of the inlet valve 150, to the contact area between the seal 184 and the surface 96 of the inlet valve 150, is about 1, about 1.1, or ranges from about 0.9 to about 1.2.

In an exemplary embodiment, as illustrated in FIGS. 15-18, a valve member is generally referred to by the reference numeral 230 and includes a central disk-shaped central base 232, which defines an outside circumferentially-extending convex surface 234. A valve body 236 extends axially upwards from the base 232, along a valve member axis 237. In an exemplary embodiment, the valve member axis 237 is aligned, or coaxial, with the valve seat axis 84 shown in FIG. 10. Thus, in several exemplary embodiments, the valve member axis 237 is aligned, or coaxial, with the fluid passage axis 42 shown in FIG. 10. The valve body 236 also extends radially outward from the valve member axis 237.

Figure 17:
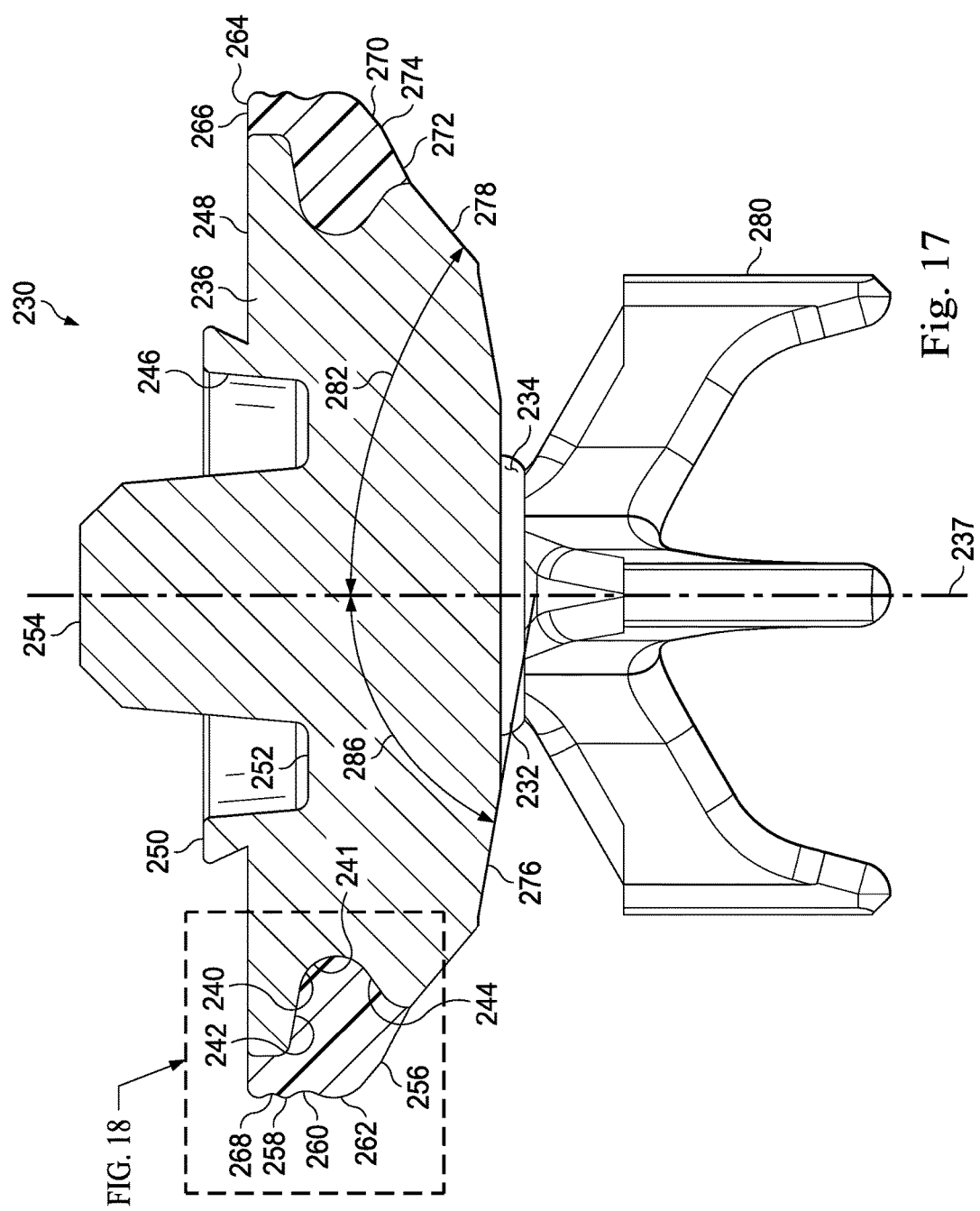
FIG. 17 is a sectional view of the valve member of FIGS. 15 and 16 taken along line 17-17 of FIG. 16, according to an exemplary embodiment.
Figure 18:
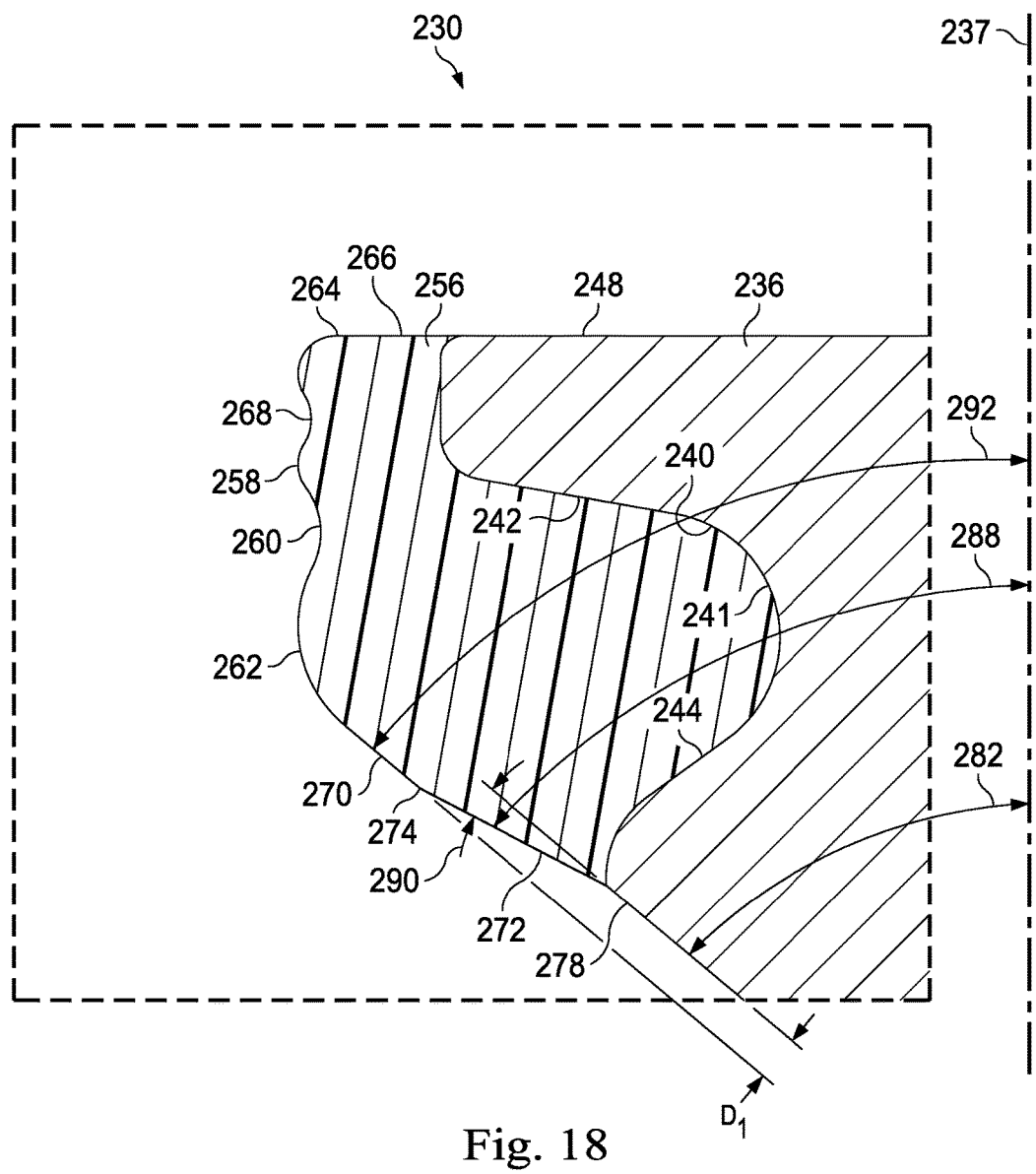
FIG. 18 is an enlarged view of a portion of FIG. 17, according to an exemplary embodiment.

As shown in FIGS. 17 and 18, an outside annular cavity 240 is formed in the valve body 236 and defines a concave surface 241. A generally tapered and circumferentially-extending surface 242, which extends angularly downward to the concave surface 241, is defined by the outside annular cavity 240. A generally tapered and circumferentially-extending surface 244, which extends angularly upward to the concave surface 241, is also defined by the outside annular cavity 240.

Figure 15:
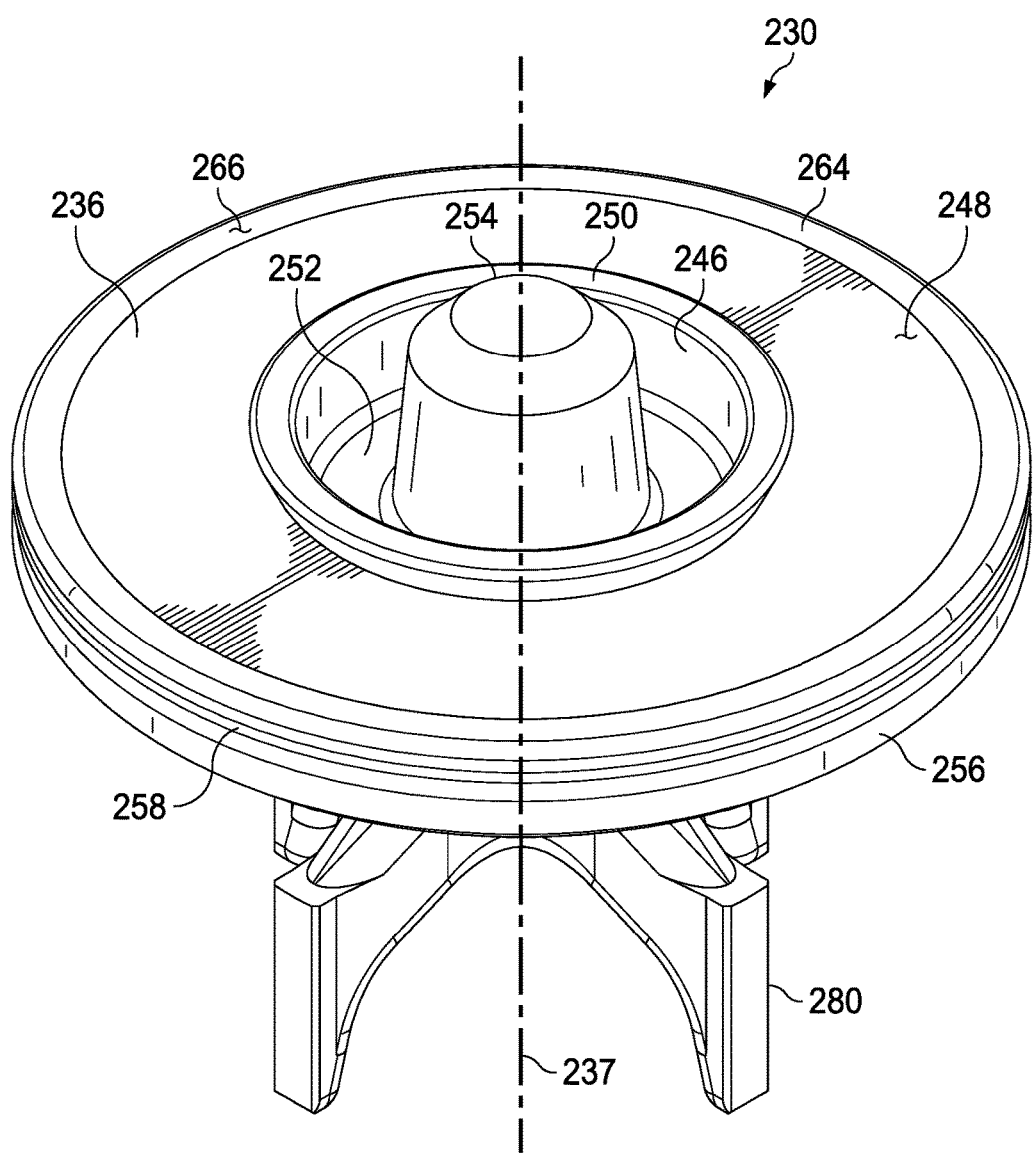
FIG. 15 is a perspective view of a valve member according to an exemplary embodiment.
Figure 16:
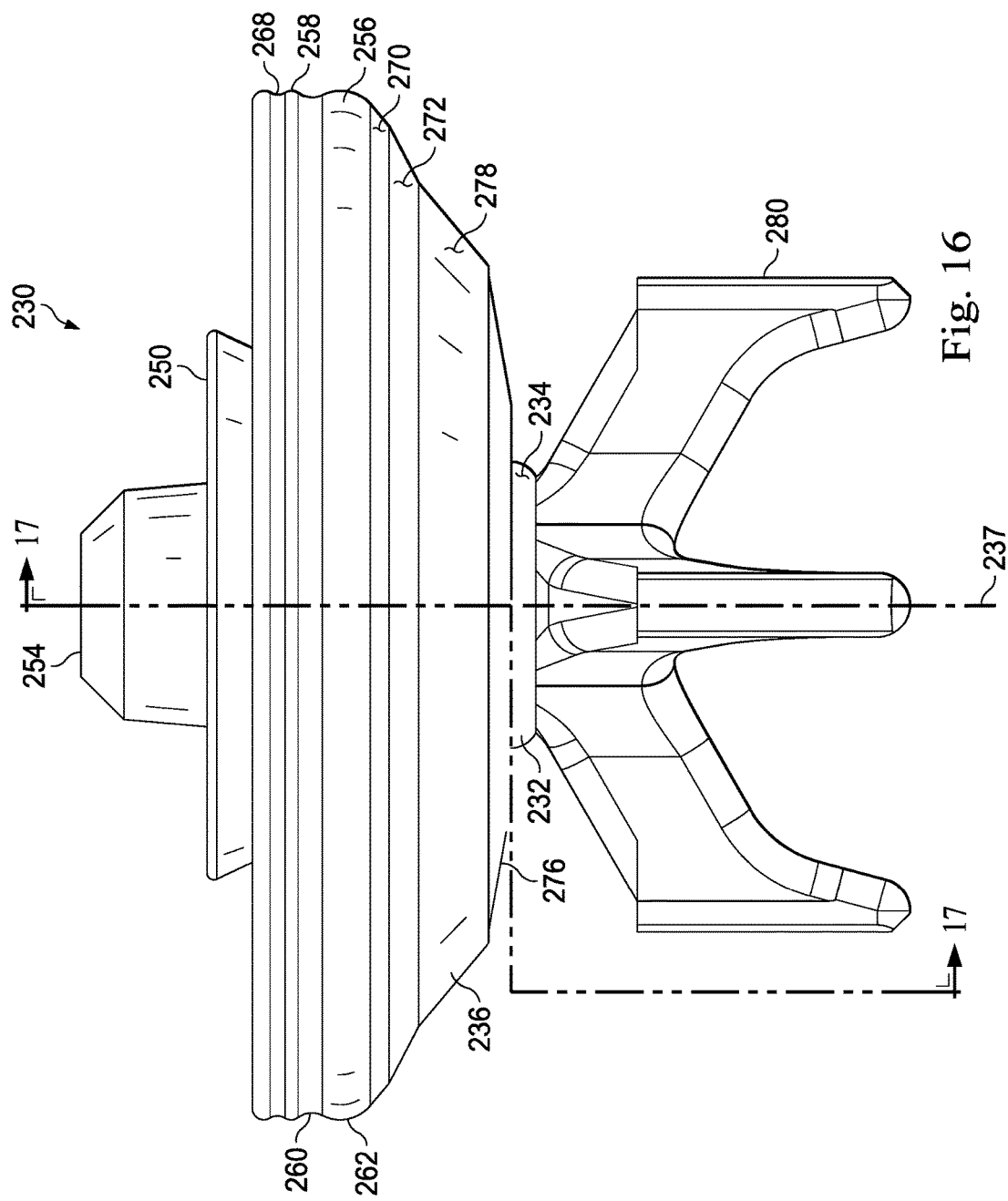
FIG. 16 is an elevational view of the valve member of FIG. 15.

As shown in FIGS. 15 and 17, the valve body 236 includes an annular channel 246, about which a top surface 248 circumferentially extends. An annular ridge 250 is adjacent the channel 246, and is radially positioned between the channel 246 and the top surface 248. An axially-facing surface 252 is defined by the channel 246, and a protrusion 254 extends axially upwards from the surface 252 and out of the channel 246. In an exemplary embodiment, the surface 252 is engaged with a lower end portion of a spring, such as the spring 108 of FIG. 3. In an exemplary embodiment, the protrusion 254 extends within a lower end portion of a spring, such as the spring 108 of FIG. 3.

A seal 256 extends within the outside annular cavity 240, and is adapted to sealingly engage a tapered surface of a valve seat, such as the tapered surface 96 of the valve seat 152 of FIG. 10. In an exemplary embodiment, the seal 256 is composed of urethane. In an exemplary embodiment, the extension of the seal 256 within the cavity 240 facilitates in securing the seal 256 to the valve body 236. The seal 256 defines an outside circumferentially-extending exterior 258. An annular channel 260 is formed in the exterior 258. The seal further includes an annular bulbous protrusion 262. The channel 260 is positioned vertically between the top surface 248 of the valve body 236 and the bulbous protrusion 262. In an exemplary embodiment, the bulbous protrusion 262 is positioned adjacent the channel 260. In an exemplary embodiment, the channel 260 is positioned vertically between the top surface 248 and the bulbous protrusion 262, and the bulbous protrusion 262 is adjacent the channel 260.

The seal 256 also includes a circumferentially-extending upper tab 264, which extends upwardly from the channel 260 and encircles the top surface 248 of the valve body 236. A top surface 266 is defined by the tab 264. As shown in FIG. 17, the top surface 266 of the seal 256 and the top surface 248 of the valve body 236 are substantially flush. An annular channel 268 is formed in the tab 264 at the exterior 258 of the seal 256. In an exemplary embodiment, the annular channel 268 is positioned vertically between the top surface 266 of the seal 256 and the annular channel 260. In an exemplary embodiment, the annular channel 268 is positioned vertically between the top surface 266 of the seal 256 and the bulbous protrusion 262.

As shown most clearly in FIGS. 17 and 18, frusto-conical surfaces 270 and 272 are defined by the seal 256. In several exemplary embodiments, the frusto-conical surfaces 270 and 272 may be characterized as first and second tapered and circumferentially-extending surfaces, respectively. The frusto-conical surface 270 extends angularly downward from the bulbous protrusion 262, the extension of the frusto-conical surface 270 ending at, or proximate, the frusto-conical surface 272. The frusto-conical surface 272 extends angularly downward from the frusto-conical surface 270 ending at, or proximate, the valve body 236. An annular contact portion 274 is defined at the intersection between the frusto-conical surface 270 and the frusto-conical surface 272. The contact portion 274 includes at least a portion of the frusto-conical surface 270. In an exemplary embodiment, the contact portion 274 includes at least respective portions of the frusto-conical surfaces 270 and 272.

In several exemplary embodiments, the seal 256 is a unitary structure and thus the exterior 258, the upper tab 264, the channel 268, the channel 260, the bulbous protrusion 262, and the surface 266, including the frusto-conical surfaces 270 and 272, as well as the respective portions of the seal 256 extending within the channel 240, are integrally formed.

In several exemplary embodiments, the seal 256 is a unitary structure of urethane, and thus the exterior 258, the upper tab 264, the channel 268, the channel 260, the bulbous protrusion 262, and the surface 266, including the frusto-conical surfaces 270 and 272, as well as the respective portions of the seal 256 extending within channel 240, are integrally formed.

The valve body 236 defines a frusto-conical surface 276, which extends angularly upwardly from the base 232. A frusto-conical surface 278 is also defined by the valve body 236, the frusto-conical surface 278 extending angularly between the frusto-conical surface 276 of the valve body 236 and the frusto-conical surface 272 of the seal 256.

A plurality of circumferentially-spaced legs 280 extend angularly downward from the base 232, and are adapted to slidably engage an inside surface of a seat body of a valve seat, such as the inside surface 85 of the seat body 80 of the valve seat 152 of FIG. 10. In several exemplary embodiments, the plurality of legs 280 may include two, three, four, five, or greater than five, legs 280.

An angle 282 is defined by the frusto-conical surface 278. The angle 282 may be measured from the valve member axis 237. In an exemplary embodiment, the angle 282, as measured from the valve member axis 237, is substantially equal to the angle 162 defined by the tapered surface 96, as measured from the valve seat axis 84, as shown in FIG. 10. In an exemplary embodiment, the angle 282 is about 50 degrees from the valve member axis 237, and the angle 162 is about 50 degrees from the valve seat axis 84. In an exemplary embodiment, the angle 282 is substantially equal to, or greater than (e.g., 51 degrees, 52 degrees, 53 degrees, 54 degrees, 55 degrees, or more), the angle 162 of FIG. 10 when measured from the valve member axis 237. In an exemplary embodiment, the angle 282 is less than (e.g., 49 degrees, 48 degrees, 47 degrees, 46 degrees, 45 degrees, or less), substantially equal to, or greater than, the angle 162 when measured from the valve member axis 237.

An angle 286 is defined by the frusto-conical surface 276. As measured from the valve member axis 237, the angle 286 is greater than the angle 282. In an exemplary embodiment, the angle 286 is about 70 degrees when measured from the valve member axis 237. In an exemplary embodiment, the angle 286 ranges from about 60 degrees to about 85 degrees when measured from the valve member axis 237. In an exemplary embodiment the angle 286 ranges from about 65 degrees to about 80 degrees.

An angle 288 (shown most clearly in FIG. 18) is defined by the frusto-conical surface 272 of the seal 256. The angle 288 may be measured from the valve member axis 237. In an exemplary embodiment, the angle 288 is greater than the angle 282 when measured from the valve member axis 237. In an exemplary embodiment, the angle 282 is about 62.5 degrees. The angles 282 and 288 define an angle 290 therebetween. In an exemplary embodiment, the angle 290 is about 12.5 degrees. In an exemplary embodiment, the angle 290 ranges from about 0 degrees to about 25 degrees. In an exemplary embodiment, the angle 290 ranges from about 5 degrees to about 20 degrees. In an exemplary embodiment, the angle 290 ranges from about 10 degrees to about 15 degrees.

An angle 292 is defined by the frusto-conical surface 270 of the seal 256. The angle 292 may be measured from the valve member axis 237. In an exemplary embodiment, the angle 292 is substantially equal to the angle 282 when measured from the valve member axis 237. In an exemplary embodiment, the angle 292 is less than the angle 288 when measured from the valve member axis 237. As a result, as indicated by the reference numeral $D_1$, the contact portion 274 is offset a distance $D_1$ from the frusto-conical surface 278 in a direction perpendicular to the frusto-conical surface 278. In an exemplary embodiment, the offset distance $D_1$ is about 0.06 inches. In an exemplary embodiment, the offset distance $D_1$ ranges from about 0.04 inches to about 0.08 inches. In an exemplary embodiment, the offset distance $D_1$ ranges from greater than 0 inches to about 0.1 inches. In an exemplary embodiment, the frusto-conical surfaces 270 and 278 are spaced in parallel relation and the parallel spacing therebetween defines the offset distance D.

In an exemplary embodiment, the valve member 230 is adapted and sized to be used with an SPM SP4 full open well service seat.

In an exemplary embodiment, the valve member 230 is composed of AISI 8620 alloy steel material.

In an exemplary embodiment, the valve member 230 is movable, relative to a valve seat, such as the valve seat 152 of FIG. 10, and a fluid end block, such as the fluid end block 18 of FIG. 10, between a closed position (not shown but described below) and an open position (not shown but described below). In such embodiments, the valve seat 152 is offset from the valve member 230 such that the tapered surface 96 is offset a distance (not shown) from the valve member 230.

In an exemplary embodiment, the seal 256 is molded in place in the valve body 236. In an exemplary embodiment, the seal 256 is preformed and then attached to the valve body 236. In an exemplary embodiment, the seal 256 is bonded to the valve body 236. As noted above, in an exemplary embodiment, the seal 256 is composed of urethane. In several exemplary embodiments, the seal 256 is composed of one or more materials such as, for example, a deformable thermoplastic material, a urethane material, a fiber-reinforced material, carbon, glass, cotton, wire fibers, cloth, and/or any combination thereof. In an exemplary embodiment, the seal 256 is composed of a cloth which is disposed in a thermoplastic material, and the cloth may include carbon, glass, wire, cotton fibers, and/or any combination thereof. In several exemplary embodiments, the seal 256 is composed of at least a fiber-reinforced material, which prevents, or at least reduces, delamination. In an exemplary embodiment, the seal 256 has a hardness of 95 A durometer or greater, or a hardness of 69 D durometer or greater. In several exemplary embodiments, the valve body 236 is much harder and/or more rigid than the seal 256.

In an exemplary embodiment, the valve member 154 of FIGS. 10 and 11 is omitted in favor of the valve member 230. In operation, in such embodiments, with continuing reference to FIGS. 1-18, the plunger 32 reciprocates within the bore 34, reciprocating in and out of the pressure chamber 36. That is, the plunger 32 moves back and forth horizontally, as viewed in FIG. 2, away from and towards the fluid passage axis 42. In an exemplary embodiment, the engine or motor (not shown) drives the crankshaft (not shown) enclosed within the housing 16, thereby causing the plunger 32 to reciprocate within the bore 34 and thus in and out of the pressure chamber 36.

As the plunger 32 reciprocates out of the pressure chamber 36, the inlet valve 150 is opened. More particularly, as the plunger 32 moves away from the fluid passage axis 42, the pressure inside the pressure chamber 36 decreases, creating a differential pressure across the inlet valve 150 and causing the valve member 230 to move upward, relative to the valve seat 152 and the fluid end block 18. As a result of the upward movement of the valve member 230, the spring 108 is compressed between the valve body 236 and the valve spring retainer 72, the seal 256 disengages from the tapered surface 96, and the inlet valve 150 is thus placed in its open position. Fluid in the fluid inlet passage 22 flows along the fluid passage axis 42 and through the fluid passage 38 and the inlet valve 150, being drawn into the pressure chamber 36. To flow through the inlet valve 150, the fluid flows through the bore 83 of the valve seat 152 and along the valve seat axis 84. During the fluid flow through the inlet valve 150 and into the pressure chamber 36, the outlet valve 56 (which is identical to the inlet valve 150 as described above) is in its closed position, with the seal 256 of the valve member 230 of the outlet valve 56 engaging the tapered surface 96 of the valve seat 152 of the outlet valve 56. Fluid continues to be drawn into the pressure chamber 36 until the plunger 32 is at the end of its stroke away from the fluid passage axis 42. At this point, the differential pressure across the inlet valve 150 is such that the spring 108 of the inlet valve 150 is not further compressed, or begins to decompress and extend, forcing the valve member 230 of the inlet valve 150 to move downward relative to the valve seat 152 and the fluid end block 18. As a result, the inlet valve 150 is placed in, or begins to be placed in, its closed position, with the seal 256 sealingly engaging, or at least moving towards, the tapered surface 96.

As the plunger 32 moves into the pressure chamber 36 and thus towards the fluid passage axis 42, the pressure within the pressure chamber 36 begins to increase. The pressure within the pressure chamber 36 continues to increase until the differential pressure across the outlet valve 56 exceeds a predetermined set point, at which point the outlet valve 56 opens and permits fluid to flow out of the pressure chamber 36, along the fluid passage axis 42 and through the fluid passage 40 and the outlet valve 56, and into the fluid outlet passage 24. As the plunger 32 reaches the end of its stroke towards the fluid passage axis 42 (i.e., its discharge stroke), the inlet valve 54 is in, or is placed in, its closed position, with the seal 256 sealingly engaging the tapered surface 96.

In an exemplary embodiment, the configuration of the seal 256 provides improved sealing engagement with the tapered surface 96, thereby providing an improved seal when the inlet valve 150 and/or the identical outlet valve 56 are in respective closed positions. In particular, in an exemplary embodiment, the offset distance $D_1$ of the contact portion 274 ensures that at least the annular contact portion 274 sealingly engages the tapered surface 96 as the valve member 230 moves downward relative to the valve seat 152. More particularly, the offset distance $D_1$ ensures that, as the valve member 230 moves downward, the annular contact portion 274 will contact the tapered surface 96 before the frusto-conical surface 278, ensuring the sealing engagement between the seal 256 and the surface 96. In an exemplary embodiment, the offset distance $D_1$ of the contact portion 274 ensures that at least the contact portion 274 sealingly engages the tapered surface 96 as the valve member 230 moves downward relative to the valve seat 152. In an exemplary embodiment, as the valve member 230 moves downward relative to the valve seat 152, the contact portion 274 engages the tapered surface 96 before other surfaces of the valve member 230. For example, the contact portion 274 engages the surface 96 before the frusto-conical surface 278, before the frusto-conical surface 272, and/or before the frusto-conical surface 270 engages the tapered surface 96. In an exemplary embodiment, the angle 290 ensures that at least the contact portion 274 sealingly engages the tapered surface 96 as the valve member 230 moves downward relative to the valve seat 152. In an exemplary embodiment, the difference between the angle 292 and the angle 288 and the difference between the angle 282 and the angle 288 ensure that at least the contact portion 274 sealingly engages the tapered surface 96 as the valve member 230 moves downward relative to the valve seat 152.

In an exemplary embodiment, as the valve member 230 moves downward relative to the valve seat 152, initially, the contact portion 274 sealingly engages the tapered surface 96; as noted above, at least a portion of frusto-conical surface 270, or at least respective portions of the frusto-conical surfaces 270 and 272 sealingly engage the tapered surface 96. As the valve member 230 continues to move downward relative to the valve seat 152, the seal 256 deforms radially from the contact portion 274. As a result, in an exemplary embodiment, at least respective additional portions of the frusto-conical surfaces 270 and 272 also sealingly engage the surface 96.

The foregoing is repeated, with the reciprocating pump assembly 10 pressurizing the fluid as the fluid flows from the fluid inlet passage 22 and to the fluid outlet passage 24 via the pressure chamber 36. In an exemplary embodiment, the pump assembly 10 is a single-acting reciprocating pump, with fluid being pumped across only one side of the plunger 32.

In several exemplary embodiments, the valve member 78 of FIG. 3 is omitted in favor of the valve member 230. In several exemplary embodiments, the valve member 230 is used with any of the valve seats, including, but not limited to, the valve seat 76 and the valve seat 128. In several exemplary embodiments, the valve member 230 is used with other valve seats having configurations different from that of the valve seat 76 and/or the valve seat 128. In several exemplary embodiments, the valve member 230 is used with any of the inlet and outlet valves, including the inlet valve 54, the inlet valve 128, the outlet valve 56, and/or other differently configured inlet and outlet valves.

Figure 19:
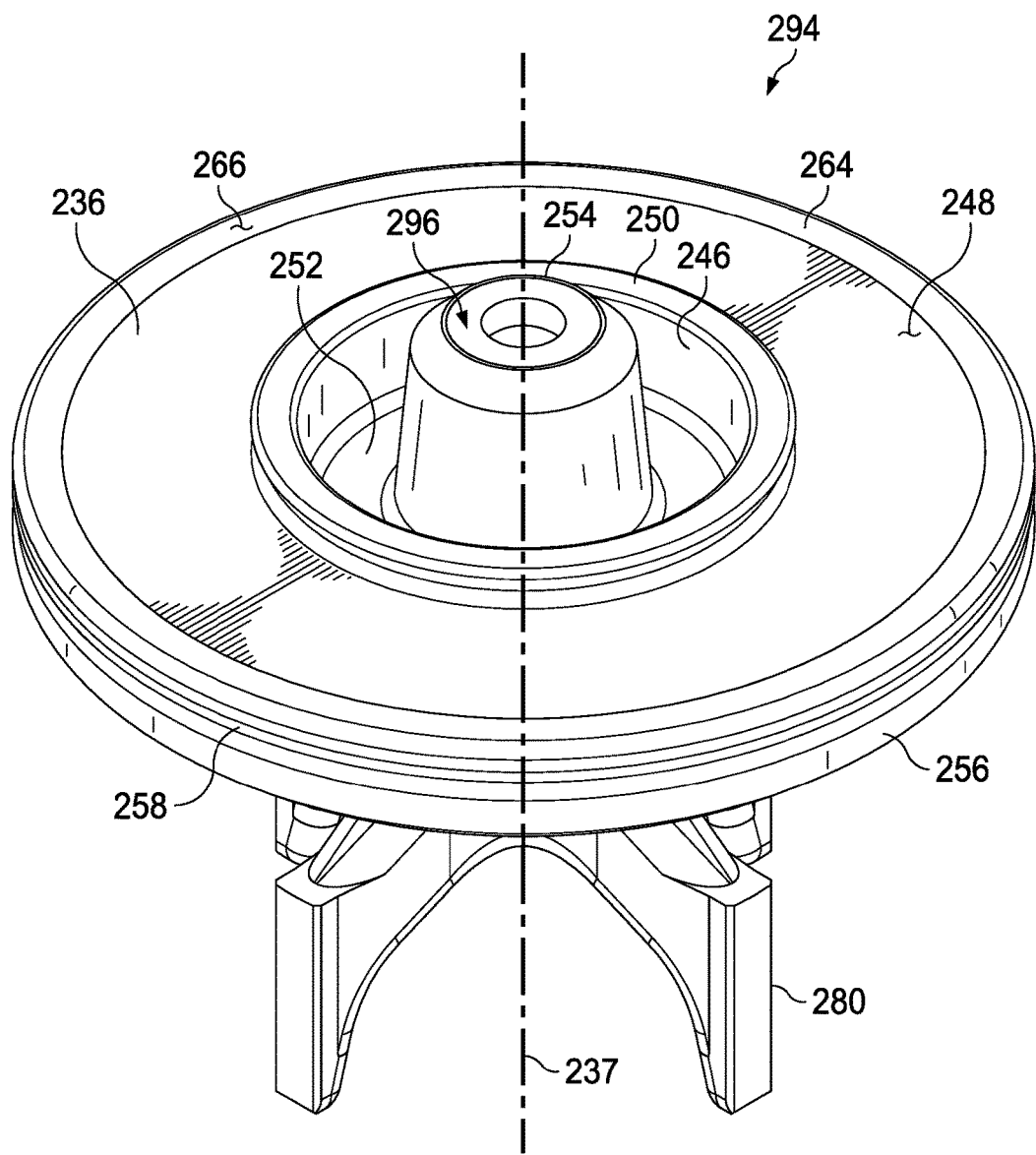
FIG. 19 is a perspective view of a valve member according to an exemplary embodiment.
Figure 20:
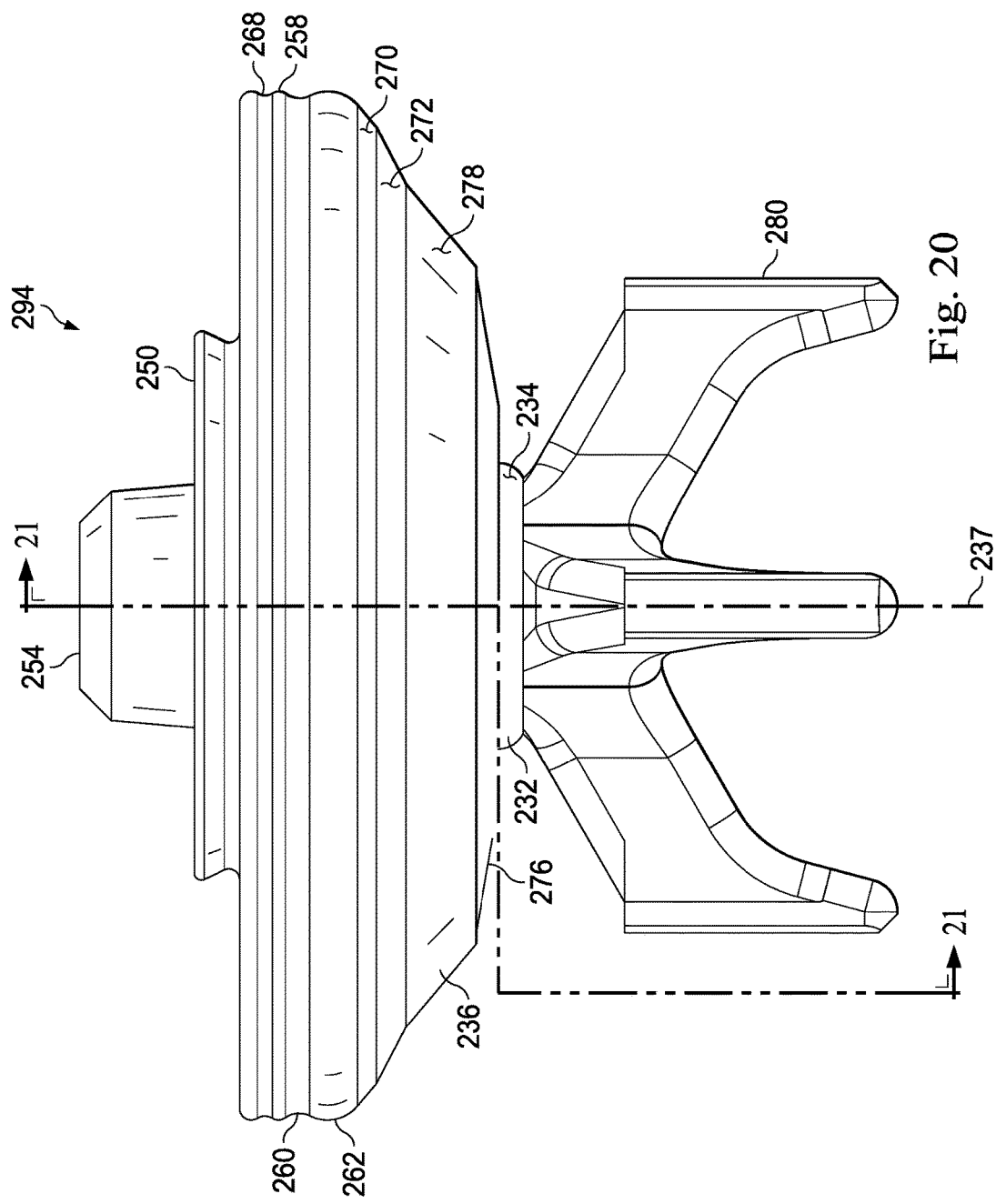
FIG. 20 is an elevational view of the valve member of FIG. 19.
Figure 21:
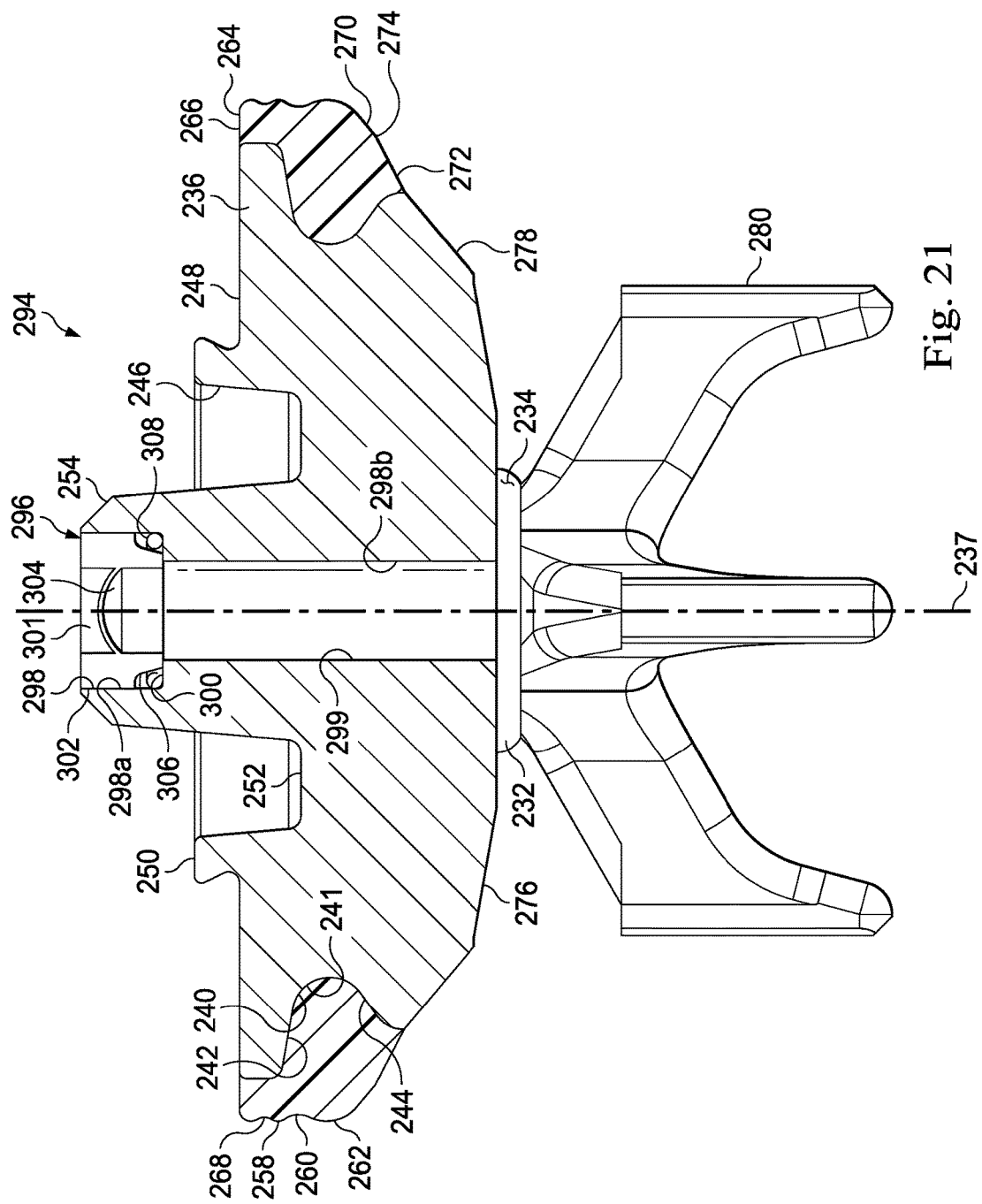
FIG. 21 is a sectional view of the valve member of FIGS. 19 and 20 taken along line 21-21 of FIG. 20, according to an exemplary embodiment.
Figure 22:
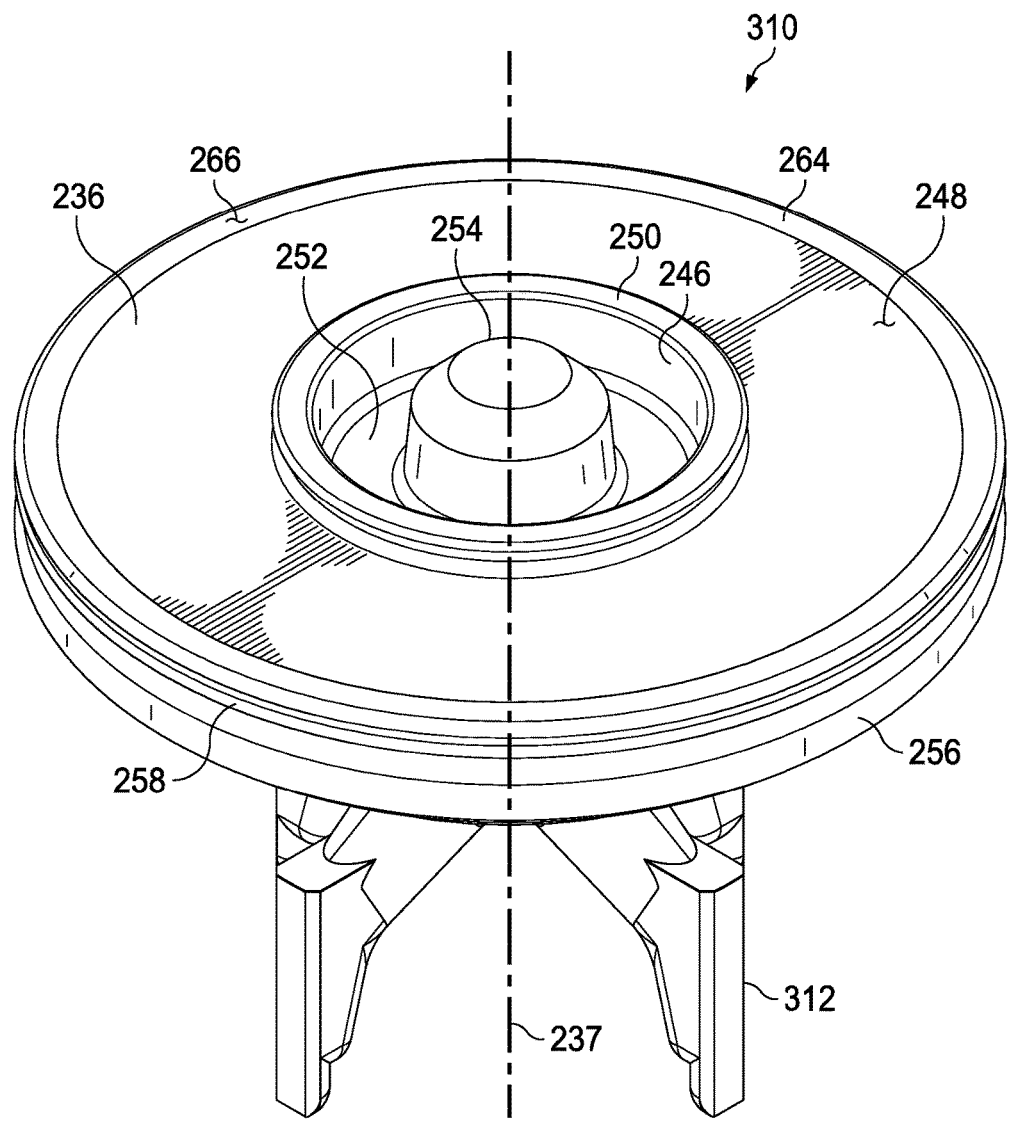
FIG. 22 is a perspective view of a valve member according to an exemplary embodiment.
Figure 23:
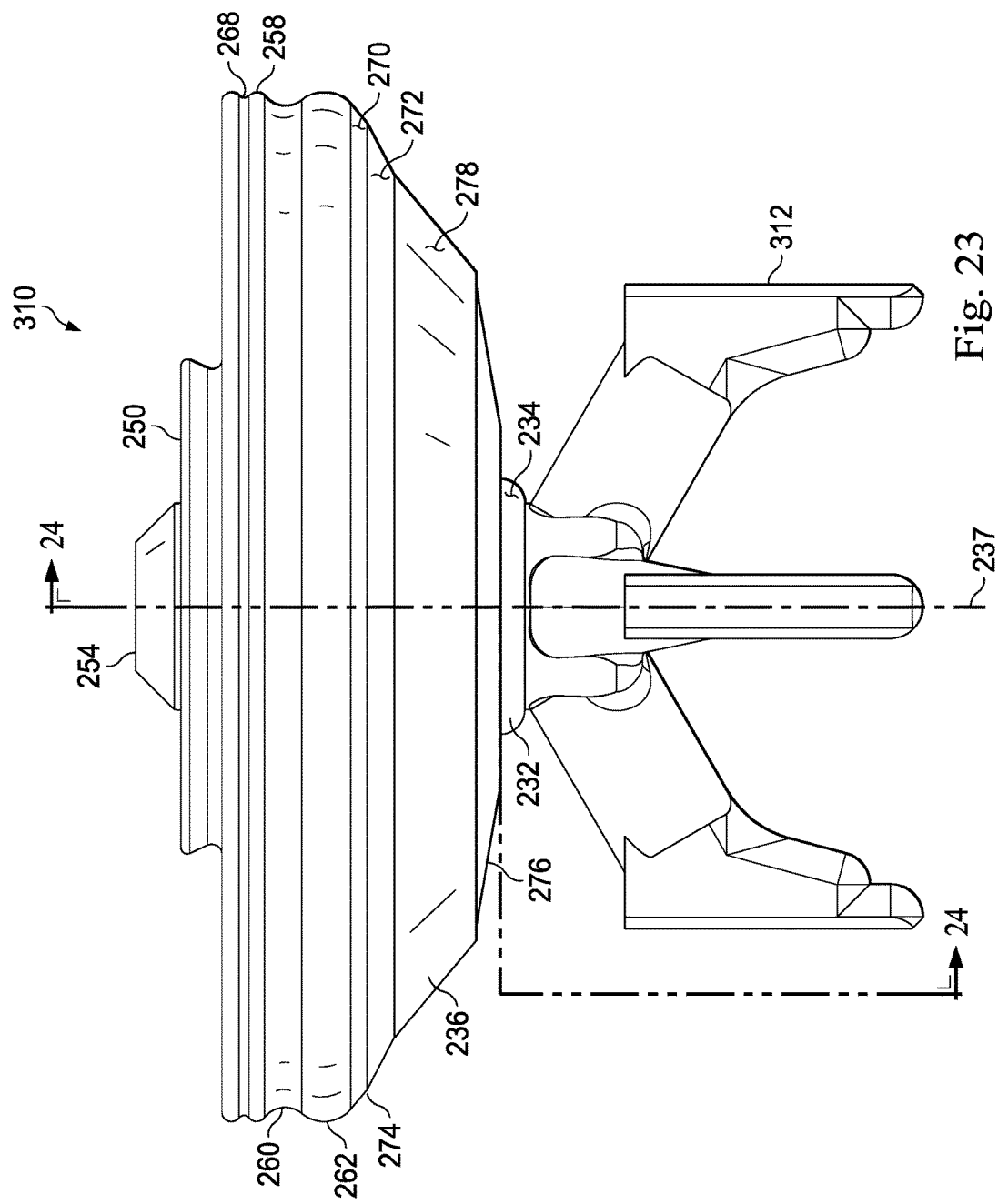
FIG. 23 is an elevational view of the valve member of FIG. 22.
Figure 24:
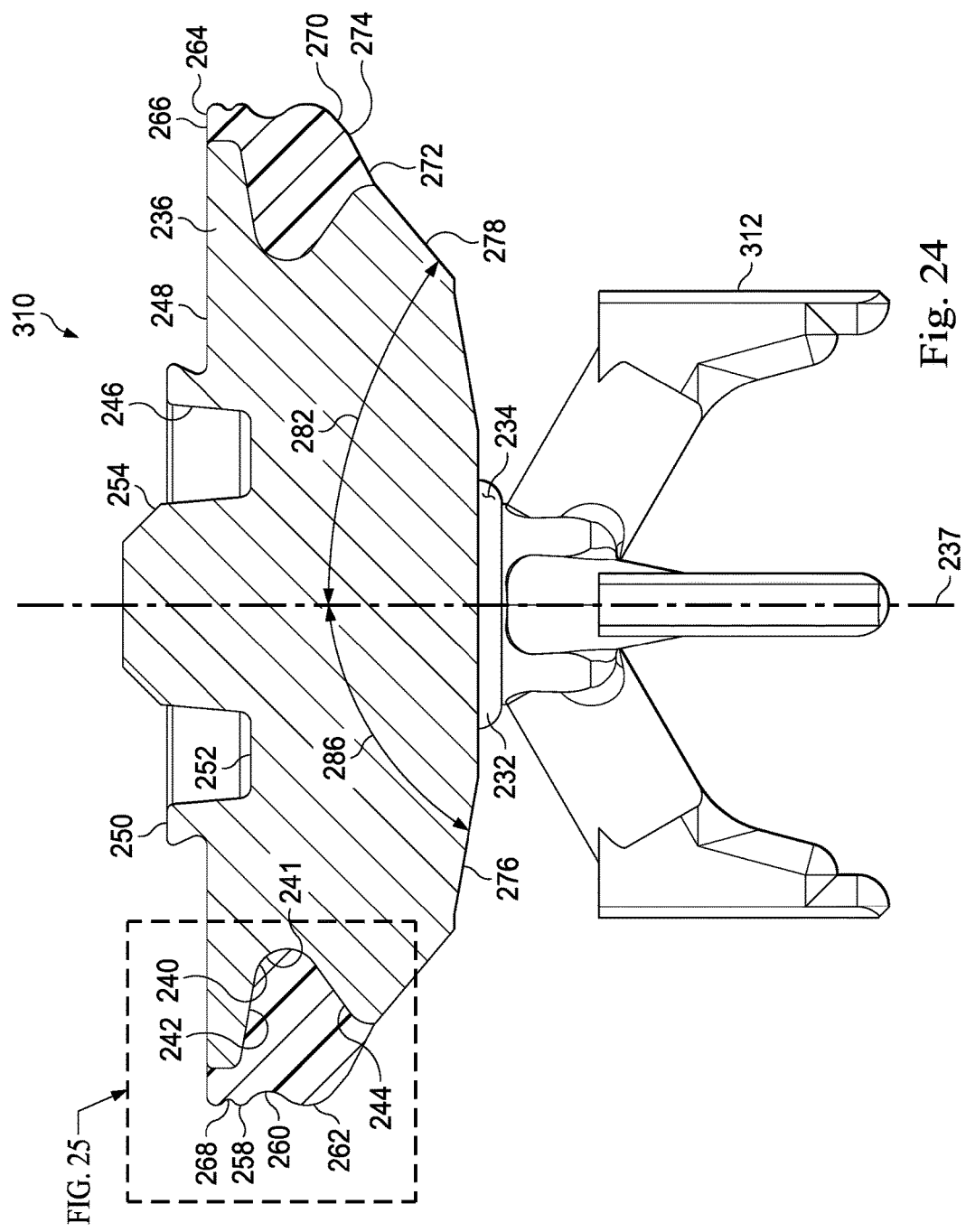
FIG. 24 is a sectional view of the valve member of FIGS. 22 and 23 taken along line 24-24 of FIG. 23, according to an exemplary embodiment.
Figure 25:
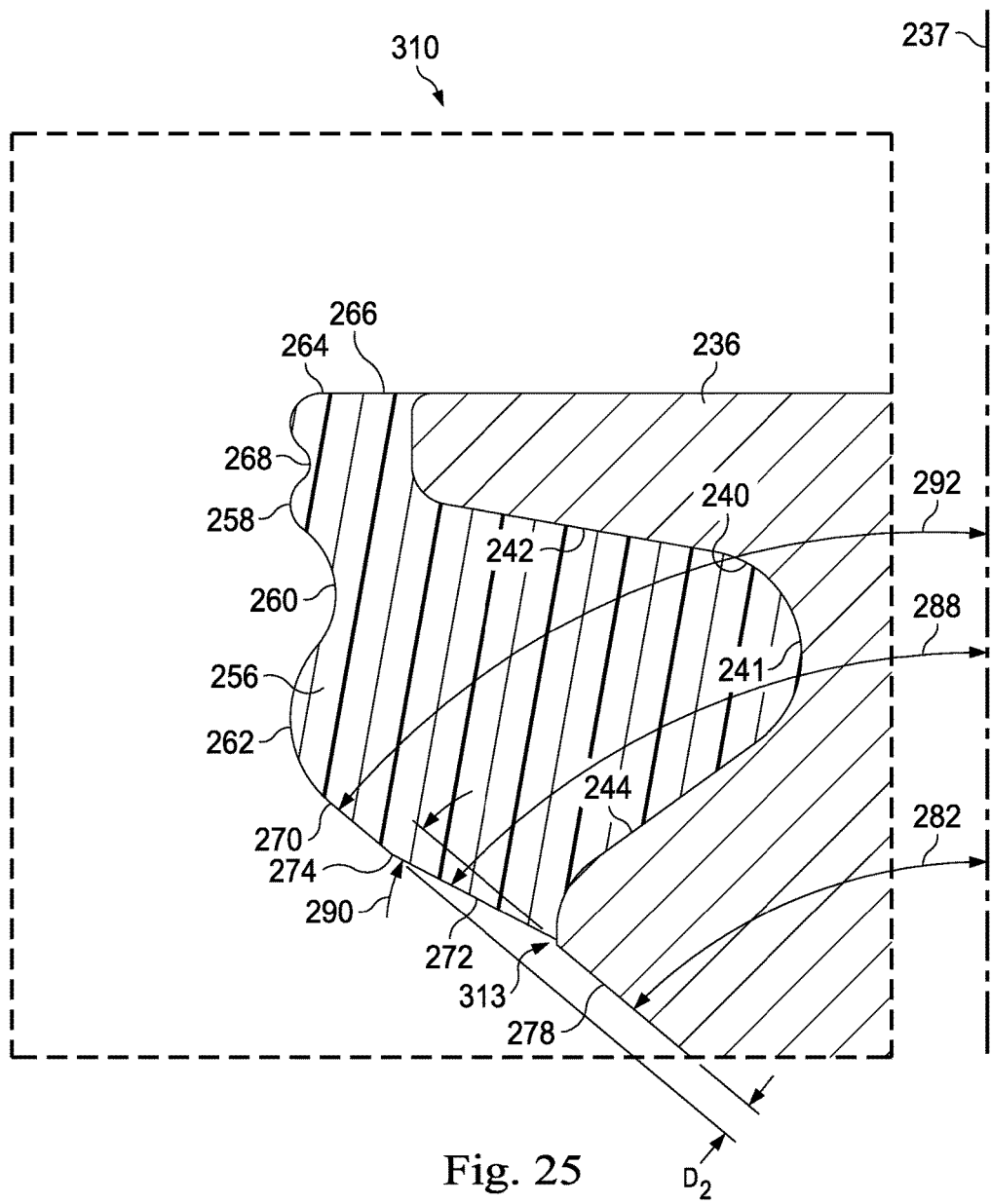
FIG. 25 is an enlarged view of a portion of FIG. 24, according to an exemplary embodiment.

In an exemplary embodiment, as illustrated in FIGS. 19-21, a valve member is generally referred to by the reference numeral 294 and includes several parts that are identical to corresponding parts of the valve member 230, which identical parts are given the same reference numerals. As shown in FIGS. 19 and 21, the valve member 294 includes a rupture disc assembly 296.

As shown most clearly in FIG. 21, a counterbore 298 is formed in the valve body 236, and is generally coaxial with the valve member axis 237. The counterbore 298 extends all the way through the valve body 236. The counterbore 298 includes an enlarged-diameter portion 298a and a reduced-diameter portion 298b. The reduced-diameter portion 298b defines a fluid passage 299 extending axially through the valve body 236. The counterbore 298 defines an internal shoulder 300.

The rupture disc assembly 296 is disposed in the enlarged-diameter portion 298a of the counterbore 298. The rupture disc assembly 296 includes a rupture disc 301, which includes an annular mounting portion 302 and a domed rupture portion 304 about which the mounting portion 302 circumferentially extends. The mounting portion 302 is disposed in the enlarged-diameter portion 298a of the counterbore 298 and engages the internal shoulder 300. The mounting portion 302 includes an annular channel 306 formed in an end portion thereof that engages the internal shoulder 300. One or more annular seals 308 extend within the annular channel 306 and sealingly engage at least the mounting portion 302 and the internal shoulder 300.

In several exemplary embodiments, any of the valve members 78, 154, or 230 are omitted in favor of the valve member 294. In several exemplary embodiments, the valve member 294 is used in an inlet valve, such as the inlet valve 150 of FIGS. 10 and 11. In several exemplary embodiments, operation of the pump assembly 10 with the valve member 294 is substantially identical to the operation of the pump assembly 10 with the valve member 230, as discussed above with regard to FIGS. 15-18, except for the added operation of the rupture disc assembly 296. More particularly, in operation, with reference to FIGS. 1-21, as the plunger 32 moves into the pressure chamber 36, the inlet valve 150 is in its closed position and a fluid pressure is exerted in at least an axial direction generally downwards along the fluid passage axis 42 on the rupture disc 301 of the rupture disc assembly 296. The sealing engagement between the one or more annular seals 308 and at least the mounting portion 302 and the internal shoulder 300 prevents, or at least resists, the fluid from flowing from the pressure chamber 36, around the rupture disc 301, and thus back into the fluid inlet passage 22. During the operation of the pump assembly 10, if the fluid pressure within the pressure chamber 36 reaches or exceeds an acceptable predetermined value, causing a predetermined pressure differential across the rupture disc 301, the rupture portion 304 of the rupture disc 301 ruptures. As a result, the fluid passage 299 is in fluid communication with the pressure chamber 36 via the fluid inlet passage 38, and the rupture disc assembly 296 permits fluid to flow from the pressure chamber 36, through the fluid inlet passage 38, through the mounting portion 302 and thus back into at least the fluid inlet passage 22 and out of the pump assembly 10. This fluid flow reduces or relieves the pressure within the pump assembly 10. During operation, in several exemplary embodiments, after the rupture disc 301 ruptures, the diameter of the rupture portion 304 is less than the reduced-diameter portion 298a of the counterbore 298 thus increasing the likelihood that shrapnel from the ruptured rupture disc 301 will flow downward and out of the counterbore 298 without creating a pressure spike.

In several exemplary embodiments, the valve member 294 is used in an outlet valve, such as the outlet valve 56 or any other outlet valve. In such embodiments, the operation of the pump assembly 10 with the valve member 294 is substantially identical to the operation of the pump assembly 10 with the valve member 230, as discussed above with regard to FIGS. 15-18, except for the operation of the rupture disc assembly 296. In operation, with reference to FIGS. 1-21, fluid in the pressure chamber 36 flows along the fluid passage axis 42 and through the fluid passage 40 and the outlet valve 56, and into the fluid outlet passages 40 and 24. A fluid pressure is exerted on the rupture disc 301 of the rupture disc assembly 296 in at least an axial direction generally downwards from the fluid outlet passage 40 and/or the fluid outlet passage 24 along the fluid passage axis 42. The sealing engagement between the one or more annular seals 308 and at least the mounting portion 302 and the internal shoulder 300, prevents, or at least resists, the fluid from flowing around the rupture disc 300, and thus into the fluid passage 299 and back into at least the pressure chamber 36. In an exemplary embodiment, the outlet valve 56 is in its closed position and thus the sealing engagement of the seal 256 and the surface 96 also prevents, or at least resists, the fluid from flowing around the seal 256 and back into at least the pressure chamber 36. If the fluid pressure exerted on the rupture disc 301 reaches or exceeds a predetermined pressure value, causing a predetermined pressure differential across the rupture disc 301, the rupture portion 304 of the rupture disc 301 ruptures. As a result, the fluid passage 299 is in fluid communication with the fluid outlet passage 40, and the rupture disc assembly 296 permits fluid to flow from the fluid outlet passage 40 and/or the fluid outlet passage 24, through the rupture disc assembly 296 and thus back into at least the pressure chamber 36. This fluid flow reduces or relieves the pressure within the pump assembly 10. During operation, in several exemplary embodiments, after the rupture disc 301 ruptures, the diameter of the rupture portion 304 is less than the reduced-diameter portion 298a of the counterbore 298 thus increasing the likelihood that shrapnel from the ruptured rupture disc 301 will flow downward and out of the counterbore 298 without creating a pressure spike.

As a result, the rupture disc assembly 296, whether in use in an inlet valve or an outlet valve, such as inlet valve 150 and/or outlet valve 56, or any other inlet and/or outlet valve, operates to relieve pressure within the pump assembly 10, preventing a further increase in pressure so as to prevent or otherwise substantially reduce the likelihood of damage to the pump assembly 10, one or more other components of the pump assembly, and/or any system(s) and/or component(s) in fluid communication therewith.

In an exemplary embodiment, as illustrated in FIGS. 22-25, a valve member is generally referred to by the reference numeral 310 and includes several parts that are identical to corresponding parts of the valve member 230, which identical parts are given the same reference numerals. In several exemplary embodiments, the components of the valve member 310 are sized such that the valve member 310 is sized and adapted for use in larger inlet valves and outlet valves and/or larger fluid passages. For example, in several exemplary embodiments, the dimensions of parts of the valve member 310 are greater than the dimensions of the corresponding parts of the valve member 230. In an exemplary embodiment, the respective radii of the channels 268 and 260 are increased. In an exemplary embodiment, other dimensions are adjusted such as, for example, the height of the protrusion 254, the diameter of the seal 256, and the diameter of the valve body 236. In several exemplary embodiments, the height of the valve member 310 is greater than the height of the valve member 230.

The valve member 310 includes a plurality of circumferentially-spaced legs 312 extending from the base 232 and away from the valve body 236. In an exemplary embodiment, the legs 312 are larger than the legs 280 of FIGS.

15-21. For example, the legs 312 may be longer in length, thicker in width, and/or greater in diameter than the legs 280. In an exemplary embodiment, the legs 312 are adapted to slidably engage an inside surface of a larger seat body than, for example, the seat body 80 of FIG. 10. In an exemplary embodiment, the legs 312 are sized to slidably engage a seat body having an inner diameter of about 3.13 inches. In an exemplary embodiment, the legs 312 are sized to slidably engage a seat body having an inner diameter ranging in size from about 3 inches to about 4 inches. In an exemplary embodiment, the legs 312 are sized to slidably engage a seat body having an inner diameter ranging in size from about 3 inches to about 5 inches. In several exemplary embodiments, the various dimensions, including at least the radii, diameter, length, and/or height of the components of the valve member 310 are adjusted such that the valve member 310 is configured for use in valve seats and fluid passages having increased dimensions. For example, in an exemplary embodiment, the valve member 310 is configured for use with an SPM SP5 full open well service seat.

In several exemplary embodiments, the valve body 236 defines a step 313 at the intersection of the frusto-conical surface 278 of the valve body 236 with the frusto-conical surface 272 of the seal 256. During the operation of the valve member 310, the step 313 prevents, or at least reduces, bulging of the seal 156 into the region between the frusto-conical surface 278 and the tapered surface 96 of the seat body 80.

In an exemplary embodiment, the operation of the valve member 310 is substantially identical to the operation of the valve member 230 and therefore will not be described in detail.

Figure 26:
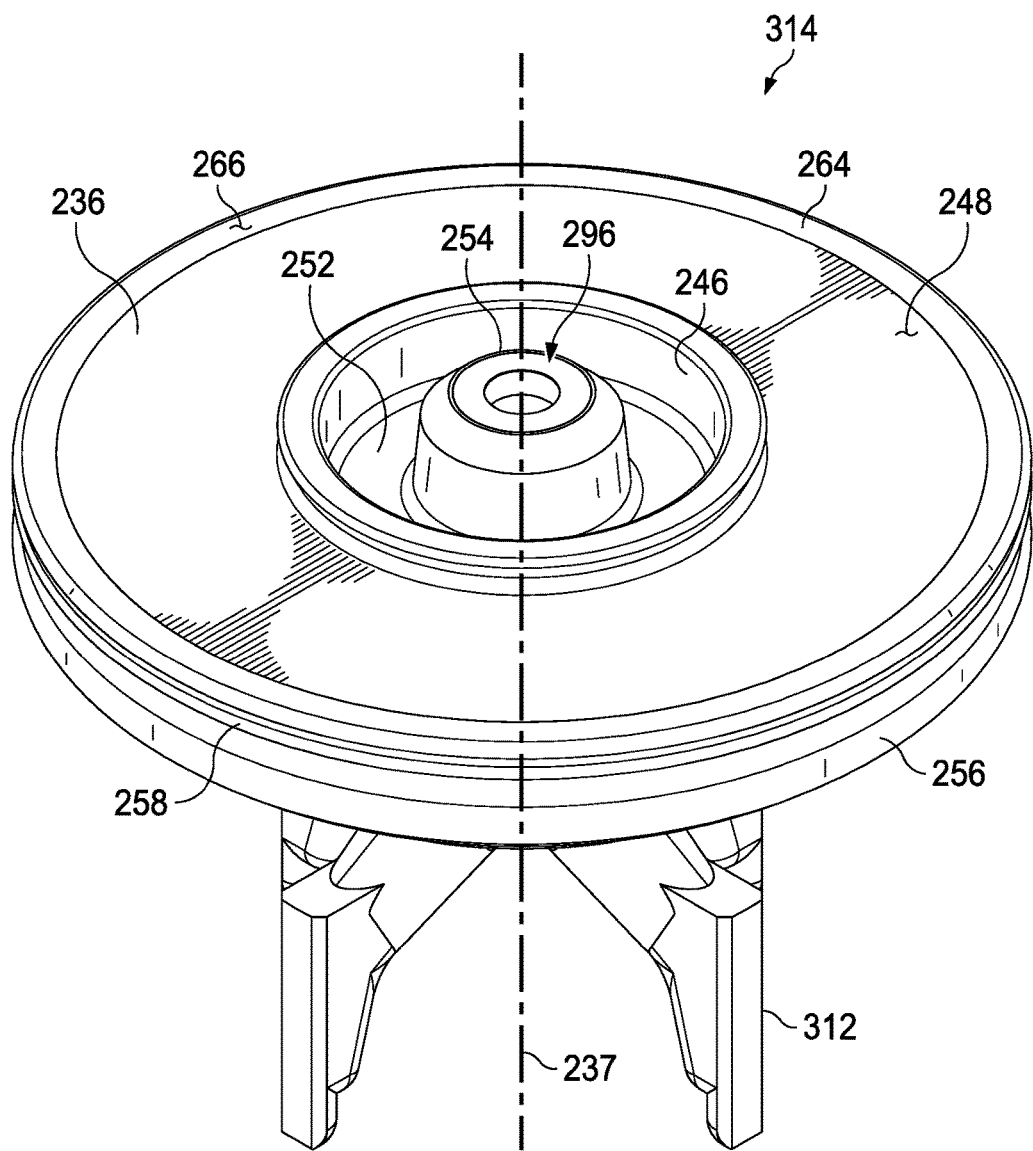
FIG. 26 is a perspective view of a valve member according to an exemplary embodiment.
Figure 27:
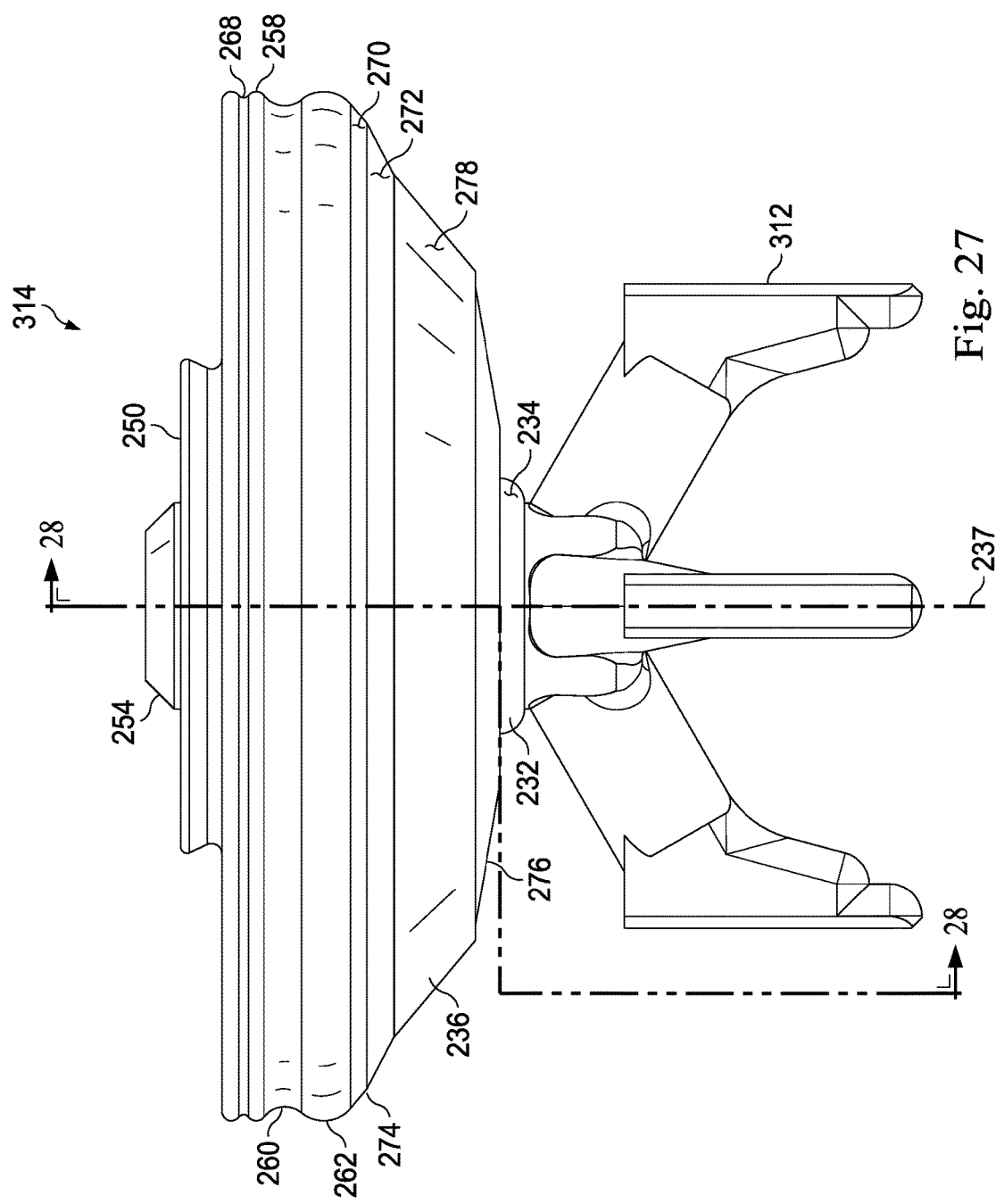
FIG. 27 is an elevational view of the valve member of FIG. 26.
Figure 28:
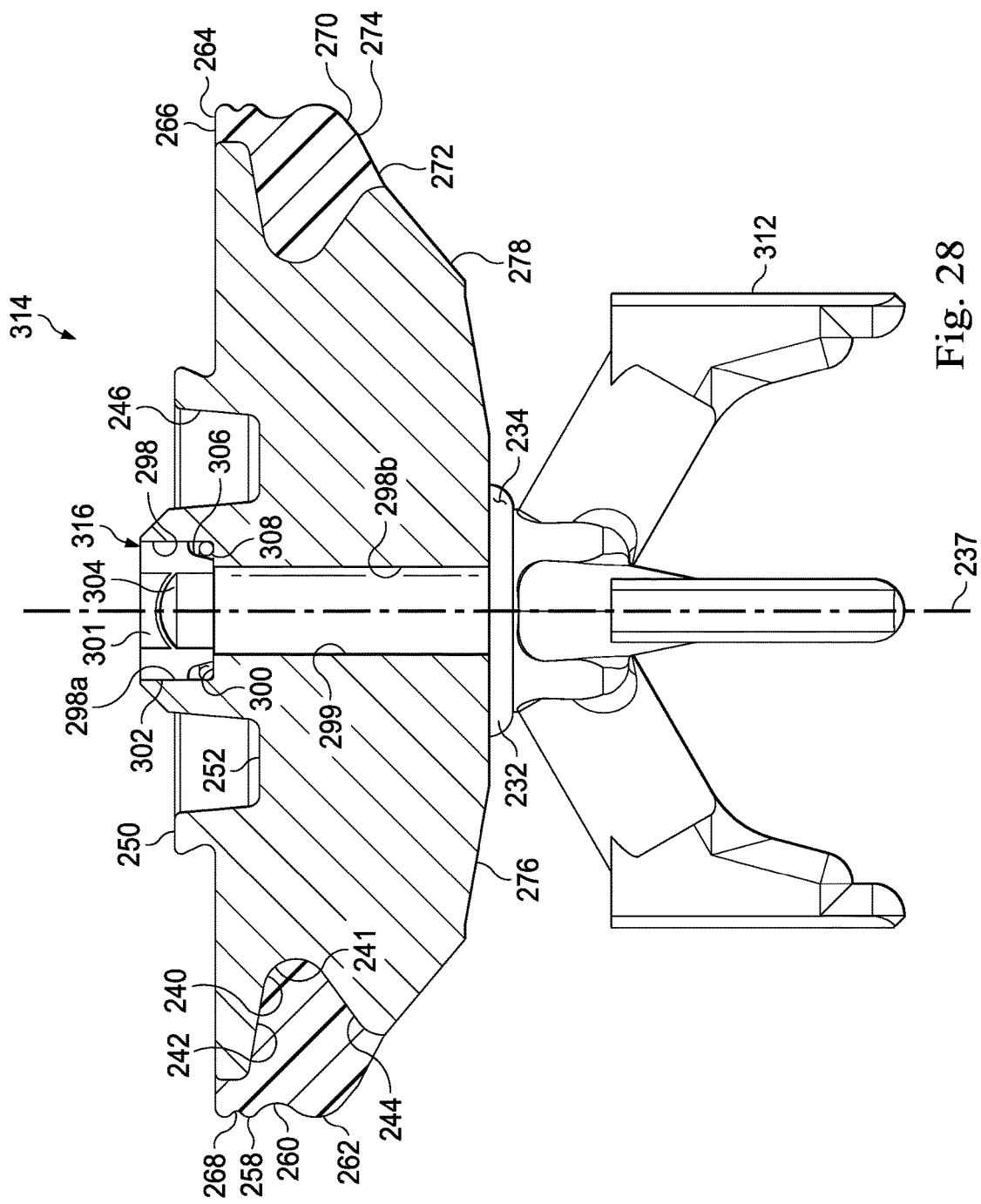
FIG. 28 is a sectional view of the valve member of FIGS. 26 and 27 taken along line 28-28 of FIG. 27, according to an exemplary embodiment.

In an exemplary embodiment, as illustrated in FIGS. 26-28, a valve member is generally referred to by the reference numeral 314 and includes several parts that are identical to corresponding parts of the valve member 310, which identical parts are given the same reference numerals. The valve member 314 also includes a rupture disc assembly 316, which includes several parts that are identical to corresponding parts of the rupture disc assembly 296 of the valve member 294, which parts are given the same reference numerals, except that the corresponding parts of the rupture disc assembly 316 are sized in accordance with the increased dimensions of the valve member 314, as discussed above. The rupture disc assembly 316 therefore will not be described in further detail.

In an exemplary embodiment, the operation of the valve member 314 is substantially identical to the operation of the valve member 294 and therefore the operation of the valve member 314 will not be described in further detail.

Figure 29:
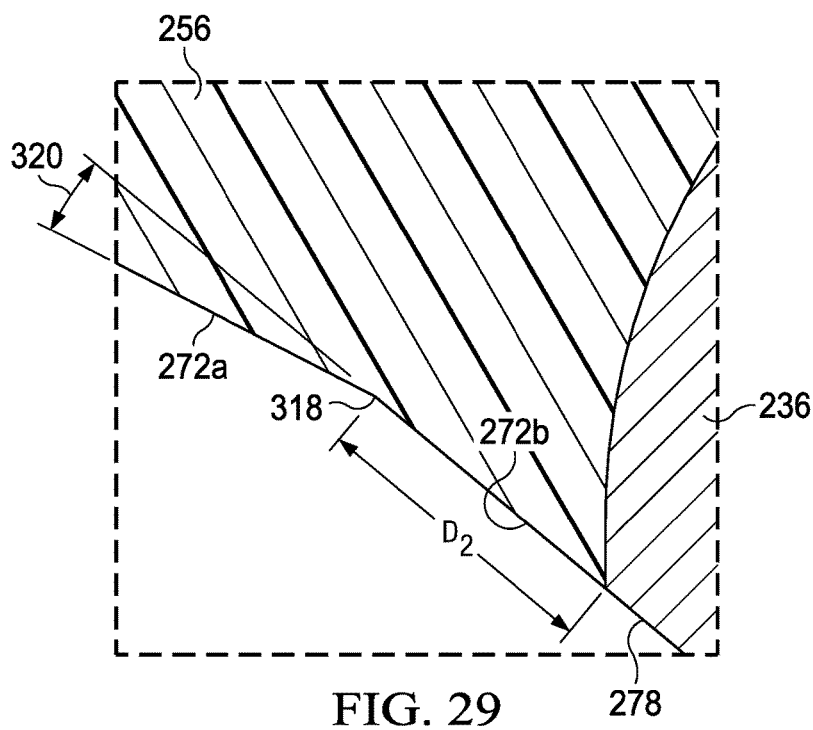
FIG. 29 is an enlarged sectional view of a valve member, according to an exemplary embodiment.

In an exemplary embodiment, as illustrated in FIG. 29, the frusto-conical surface 272 of the seal 256 is omitted in favor of a pair of frusto-conical surfaces 272a and 272b. The frusto-conical surface 272a extends angularly downward from the frusto-conical surface 270 (not visible in FIG. 29). Thus, the annular contact portion 274 is defined at the intersection between the frusto-conical surface 270 and the frusto-conical surface 272a. Similarly, the frusto-conical surface 272b extends angularly downward from the frusto-conical surface 272a ending at, or proximate, the frusto-conical surface 278 of the valve body 236. An annular inflection portion 318 is defined at the intersection between the frusto-conical surface 272a and the frusto-conical surface 272b.

An angle 320 is defined between the frusto-conical surface 272a and the frusto-conical surface 278 of the valve body 236. In an exemplary embodiment, the angle 320 is about 12.5 degrees. In an exemplary embodiment, the angle 320 ranges from about 0 degrees to about 25 degrees. In an exemplary embodiment, the angle 320 ranges from about 5 degrees to about 20 degrees. In an exemplary embodiment, the angle 320 ranges from about 10 degrees to about 15 degrees. An angle (not shown) is defined by the frusto-conical surface 272b of the seal 256. The angle defined by the frusto-conical surface 272b may be measured from the valve member axis 237. In an exemplary embodiment, the angle defined by the frusto-conical surface 272b is substantially equal to the angle 282 (shown in FIG. 25) defined by the frusto-conical surface 278 when measured from the valve member axis 237.

As indicated by the reference numeral $D_2$, the frusto-conical surface 272b extends for a distance $D_2$ beyond the frusto-conical surface 278 of the valve body 236. Thus, the annular inflection portion 318 is spaced from the frusto-conical surface by the distance $D_2$. In an exemplary embodiment, the configuration of the seal 256 (i.e., the frusto-conical surfaces 272a and 272b and the annular inflection portion 318) provides improved manufacturing characteristics.

Figure 30:
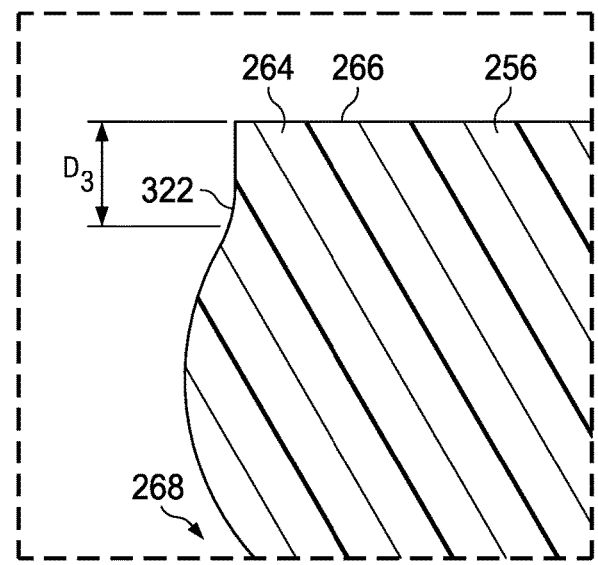
FIG. 30 is another enlarged sectional view of a valve member, according to an exemplary embodiment.

In an exemplary embodiment, as illustrated in FIG. 30, the circumferentially-extending upper tab 264 of the seal 256 defines a concave annular surface 322 positioned above the annular channel 268 (as viewed in FIG. 30) and adjoining the top surface 266. The concave annular surface 322 extends vertically for a distance $D_3$ between the top surface 266 and the annular channel 268. In another exemplary embodiment, the circumferentially-extending upper tab 218 of the seal 184 includes the concave annular surface 322. In an exemplary embodiment, the configuration of the seal 256 (i.e., the concave annular surface 322) provides improved manufacturing characteristics.

In several exemplary embodiments, the valves 54, 56, 128, and 150, or the components thereof, such as the valve seats 76, 129, and 152 and the valve members 78, 154, 230, 294, 310, and 314 may be configured to operate in the presence of highly abrasive fluids, such as drilling mud, and at relatively high pressures, such as at pressures of up to about 15,000 psi or greater. In several exemplary embodiments, instead of, or in addition to being used in reciprocating pumps, the valves 54, 56, 128, and 150, or the components thereof, such as the valve seats 76, 129, and 152 and the valve members 78, 154, 230, 294, 310, and 314, may be used in other types of pumps and fluid systems. Correspondingly, instead of, or in addition to being used in reciprocating pumps, the fluid end block 18 or features thereof may be used in other types of pumps and fluid systems.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A valve member for a reciprocating pump assembly, the valve member comprising:
    a valve body comprising a first frusto-conical surface, the valve body defining an outside annular cavity formed therein; and
    a seal extending within the outside annular cavity, the seal comprising:
        a first tapered and circumferentially-extending surface adapted to sealingly engage a tapered surface of a valve seat of the reciprocating pump assembly;
        an annular bulbous protrusion from which the first tapered and circumferentially-extending surface angularly extends, the first tapered and circumferentially-extending surface extending between the annular bulbous protrusion and the first frusto-conical surface of the valve body;
        a channel formed exteriorly in the seal and positioned between the annular bulbous protrusion and a top surface of the valve body; and
        a circumferentially-extending tab extending upwardly from the channel and encircling the top surface of the valve body.

2. The valve member of claim 1, wherein the valve member defines a first axis adapted to be coaxial with a second axis defined by the valve seat;
    wherein the first frusto-conical surface of the valve body defines a first angle, as measured from the first axis; and
    wherein the tapered surface of the valve seat defines a taper angle, as measured from the second axis, the taper angle being substantially equal to the first angle.

3. The valve member of claim 2, wherein the valve body further comprises a second frusto-conical surface, the first frusto-conical surface of the valve body extending angularly between the second frusto-conical surface of the valve body and the first tapered and circumferentially-extending surface of the seal; and
    wherein the second frusto-conical surface of the valve body defines a second angle, as measured from the first axis, the second angle being greater than the first angle.

4. The valve member of claim 1, wherein the valve body and the seal define first and second surface areas, respectively, adapted to contact the tapered surface of the valve seat; and
    wherein a ratio of the first surface area to the second surface area ranges from about 0.9 to about 1.2.

5. The valve member of claim 1, wherein an offset distance is defined between the first frusto-conical surface of the valve body and at least a portion of the first tapered and circumferentially-extending surface of the seal, the offset distance extending in a direction that is perpendicular to at least the first frusto-conical surface of the valve body.

6. The valve member of claim 5, wherein the first frusto-conical surface of the valve body defines a first angle, as measured from a first axis defined by the valve member, the first axis being adapted to be coaxial with a second axis defined by the valve seat;
    wherein the at least a portion of the first tapered and circumferentially-extending surface of the seal defines a second angle, as measured from the first axis, the second angle being substantially equal to the first angle; and
    wherein the first and second angles are substantially equal to a taper angle defined by the tapered surface of the valve seat and measured from the second axis.

7. The valve member of claim 1, wherein the seal further comprises:
    a second tapered and circumferentially-extending surface extending angularly between the first tapered and circumferentially-extending surface of the seal and the first frusto-conical surface of the valve body; and
    an annular contact portion defined by an intersection between the first and second tapered and circumferentially-extending surfaces, the annular contact portion comprising at least a portion of the first tapered and circumferentially-extending surface.

8. The valve member of claim 7, wherein the first frusto-conical surface of the valve body defines a first angle, as measured from a first axis defined by the valve member, the first axis being adapted to be coaxial with a second axis defined by the valve seat;
    wherein the first and second tapered and circumferentially-extending surfaces of the seal define second and third angles, respectively, as measured from the first axis, the second angle being less than the third angle and substantially equal to the first angle.

9. The valve member of claim 1, wherein the valve body further defines a counterbore formed along a first axis of the valve body, the first axis being adapted to be coaxial with a second axis defined by the valve seat, the counterbore defining an enlarged diameter portion, a reduced-diameter portion, and an internal shoulder in the valve body, the reduced-diameter portion defining a fluid passage; and
    wherein the valve member further comprises a rupture disc disposed in the enlarged-diameter portion of the counterbore and engaging the internal shoulder of the valve body.

10. The valve member of claim 1, wherein a top surface of the circumferentially-extending tab is substantially flush with the top surface of the valve body.

11. A valve member for a reciprocating pump assembly, the valve member comprising:
   a valve body comprising a first frusto-conical surface, the valve body defining an outside annular cavity formed therein; and
   a seal extending within the outside annular cavity, the seal comprising:
      a first tapered and circumferentially-extending surface defining a first acute angle and being adapted to sealingly engage a tapered surface of a valve seat of the reciprocating pump assembly; and
      a second tapered and circumferentially-extending surface defining a second acute angle and extending angularly between the first tapered and circumferentially-extending surface of the seal and the first frusto-conical surface of the valve body;
   wherein the valve member defines a first axis from which the first and second acute angles are measured, the first acute angle being measured in a first angular direction from the first axis, the second acute angle being measured in a second angular direction from the first axis, said second angular direction being the same as the first angular direction; and
   wherein an offset distance is defined between the first frusto-conical surface of the valve body and at least a portion of the first tapered and circumferentially-extending surface of the seal, the offset distance extending in a direction that is perpendicular to at least the first frusto-conical surface of the valve body.

12. The valve member of claim 11, wherein the first frusto-conical surface of the valve body defines a third acute angle, as measured from the first axis defined by the valve member, the first axis being adapted to be coaxial with a second axis defined by the valve seat; and
   wherein the first and third acute angles are substantially equal to a taper angle defined by the tapered surface of the valve seat and measured from the second axis.

13. The valve member of claim 11, wherein the seal further comprises:
   an annular contact portion defined by an intersection between the first and second tapered and circumferentially-extending surfaces, the annular contact portion comprising at least a portion of the first tapered and circumferentially-extending surface.

14. The valve member of claim 13, wherein the first acute angle is less than the second acute angle and substantially equal to the third acute angle.

15. The valve member of claim 11, wherein the seal further comprises:
   an annular bulbous protrusion from which the first tapered and circumferentially-extending surface angularly extends, the first tapered and circumferentially-extending surface extending between the annular bulbous protrusion and the first frusto-conical surface of the valve body; and
   a channel formed in the exterior thereof, the channel being positioned between the annular bulbous protrusion of the seal and a top surface of the valve body.

16. The valve member of claim 11, wherein the first axis of the valve member is adapted to be coaxial with a second axis defined by the valve seat;
   wherein the first frusto-conical surface of the valve body defines a third acute angle, as measured from the first axis; and
   wherein the tapered surface of the valve seat defines a taper angle, as measured from the second axis, the taper angle being substantially equal to the third acute angle.

17. The valve member of claim 16, wherein the valve body further comprises a second frusto-conical surface, the first frusto-conical surface of the valve body extending angularly between the second frusto-conical surface of the valve body and the second tapered and circumferentially-extending surface of the seal; and
   wherein the second frusto-conical surface of the valve body defines a fourth acute angle, as measured from the first axis, the fourth acute angle being greater than the third acute angle.

18. The valve member of claim 11, wherein the valve body and the seal define first and second surface areas, respectively, adapted to contact the tapered surface of the valve seat; and
   wherein a ratio of the first surface area to the second surface area ranges from about 0.9 to about 1.2.

19. The valve member of claim 11, wherein the valve body further defines a counterbore formed along a first axis of the valve body, the first axis being adapted to be coaxial with a second axis defined by the valve seat, the counterbore defining an enlarged diameter portion, a reduced-diameter portion, and an internal shoulder in the valve body, the reduced-diameter portion defining a fluid passage.

20. The valve member of claim 19, further comprising:
   a rupture disc disposed in the enlarged-diameter portion of the counterbore and engaging the internal shoulder of the valve body; and
   an annular seal sealingly engaging at least the rupture disc and the internal shoulder.

* * * * *